United States Patent
Shen et al.

(10) Patent No.: US 10,448,211 B1
(45) Date of Patent: Oct. 15, 2019

(54) ORGANIZING GROUPS OF PHYSICAL OBJECTS USING WIRELESS TAGS

(71) Applicant: Adero, Inc., Goleta, CA (US)

(72) Inventors: Jack J. Shen, Goleta, CA (US); Jeremiah Prousalis, Santa Barbara, CA (US); Adrian Yanes, Santa Barbara, CA (US); Howard Friedenberg, Santa Barbara, CA (US); Kristen Johansen, Santa Barbara, CA (US); Seth Robin, Santa Barbara, CA (US); David Wagner, Santa Barbara, CA (US); Stephanie E. Gerace, Santa Barbara, CA (US); Nathan Kelly, Santa Barbara, CA (US)

(73) Assignee: Adero, Inc., Goleta, CA (US)

( * ) Notice: Subject to any disclaimer, the term of this patent is extended or adjusted under 35 U.S.C. 154(b) by 0 days.

(21) Appl. No.: 16/183,087

(22) Filed: Nov. 7, 2018

(51) Int. Cl.
| | |
|---|---|
| *G06K 7/10* | (2006.01) |
| *G06F 3/0484* | (2013.01) |
| *H04W 4/02* | (2018.01) |
| *H04W 76/14* | (2018.01) |
| *H04B 17/318* | (2015.01) |
| *H04W 4/029* | (2018.01) |
| *G06K 7/14* | (2006.01) |

(52) U.S. Cl.
CPC ........ *H04W 4/023* (2013.01); *G06K 7/10366* (2013.01); *G06K 7/10722* (2013.01); *G06K 7/10881* (2013.01); *G06K 7/1417* (2013.01); *H04B 17/318* (2015.01); *H04W 4/029* (2018.02); *H04W 76/14* (2018.02); *G06F 3/0484* (2013.01)

(58) Field of Classification Search
CPC ..... H04W 4/023; H04W 4/029; H04W 76/14; G06K 7/10366; G06K 7/10881; G06K 7/10722; G06K 7/1417; H04B 17/318; G06F 3/0484
See application file for complete search history.

(56) References Cited

U.S. PATENT DOCUMENTS

| | | | |
|---|---|---|---|
| 10,373,463 B1* | 8/2019 | Herring | G08B 13/2462 |
| 2014/0368334 A1* | 12/2014 | Tian | G01S 5/0289 |
| | | | 340/539.13 |
| 2015/0126234 A1* | 5/2015 | Rodriguez | G08B 13/22 |
| | | | 455/457 |
| 2016/0231372 A1* | 8/2016 | Wootton | G01R 31/021 |
| 2018/0039934 A1* | 2/2018 | Mulaosmanovic | ......... |
| | | | G06K 7/10376 |

* cited by examiner

*Primary Examiner* — Christopher M Brandt
(74) *Attorney, Agent, or Firm* — Brake Hughes Bellermann LLP

(57) ABSTRACT

A method includes: receiving, by a first tag and from a second tag, a first message including an identifier of the second tag, the first and second tags configured for coupling to respective first and second physical objects to organize activities; identifying, by the first tag and based on a proximity measure, the second tag for a pairing process to register the second tag as a child tag of the first tag; and providing, by the first tag, a second message with the identifier to a processing device configured to register the second tag as the child tag of the first tag.

20 Claims, 34 Drawing Sheets

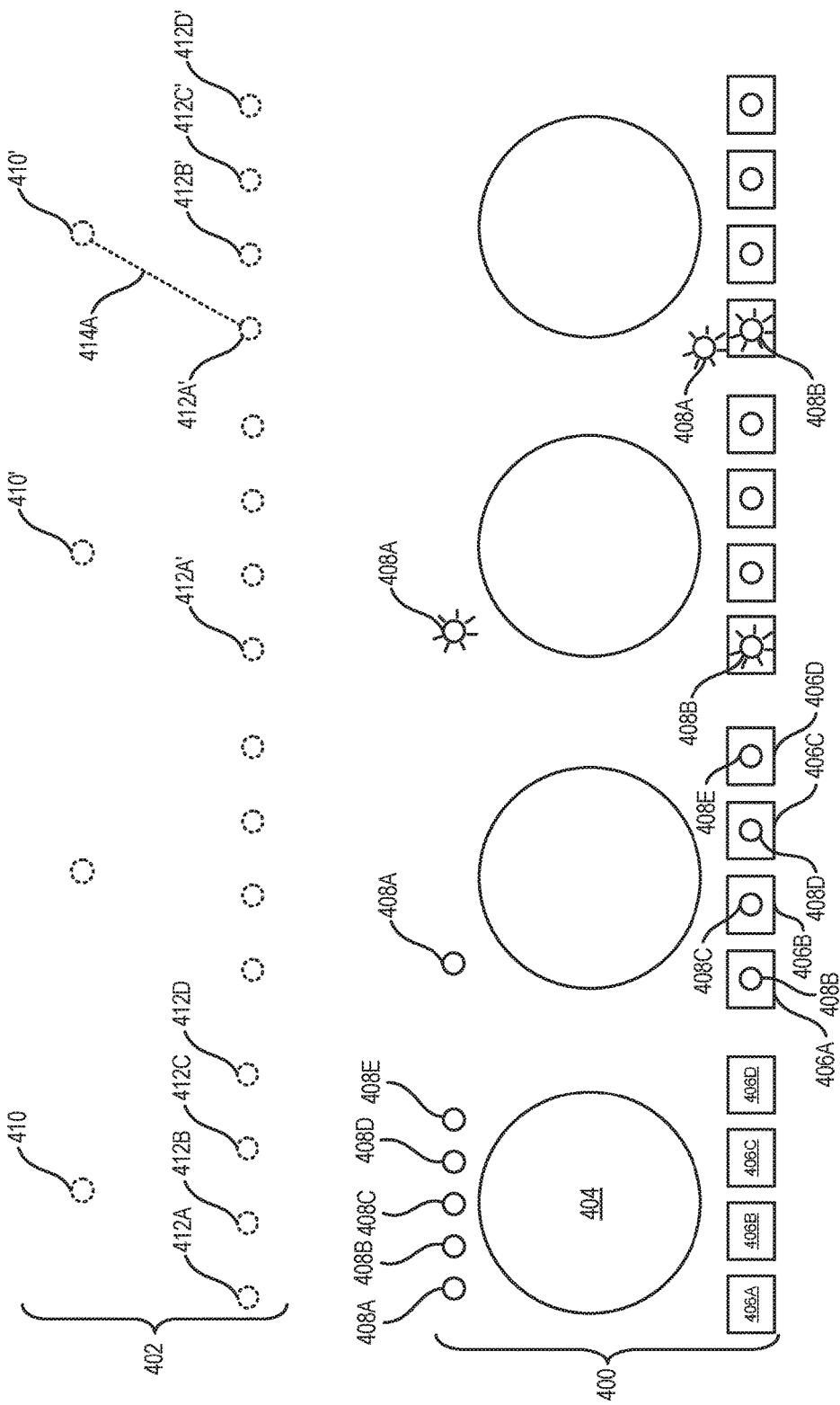

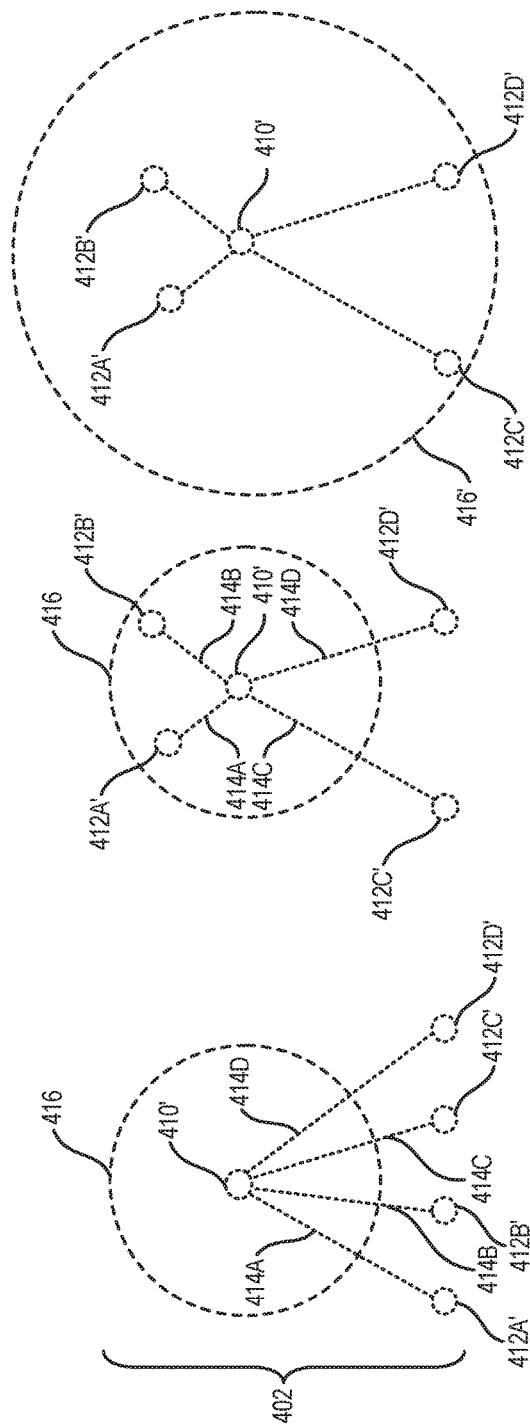
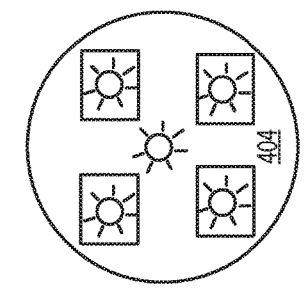
FIG. 4G
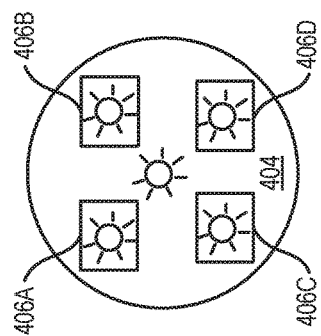
FIG. 4F
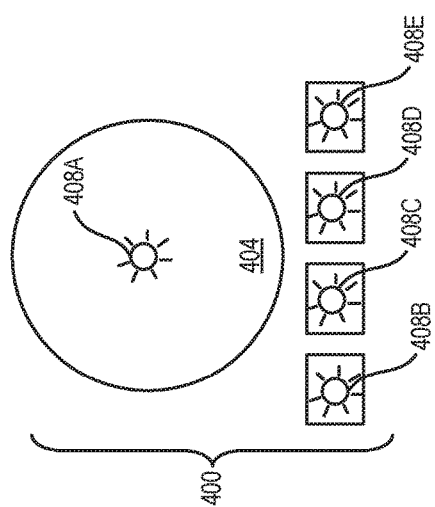
FIG. 4E

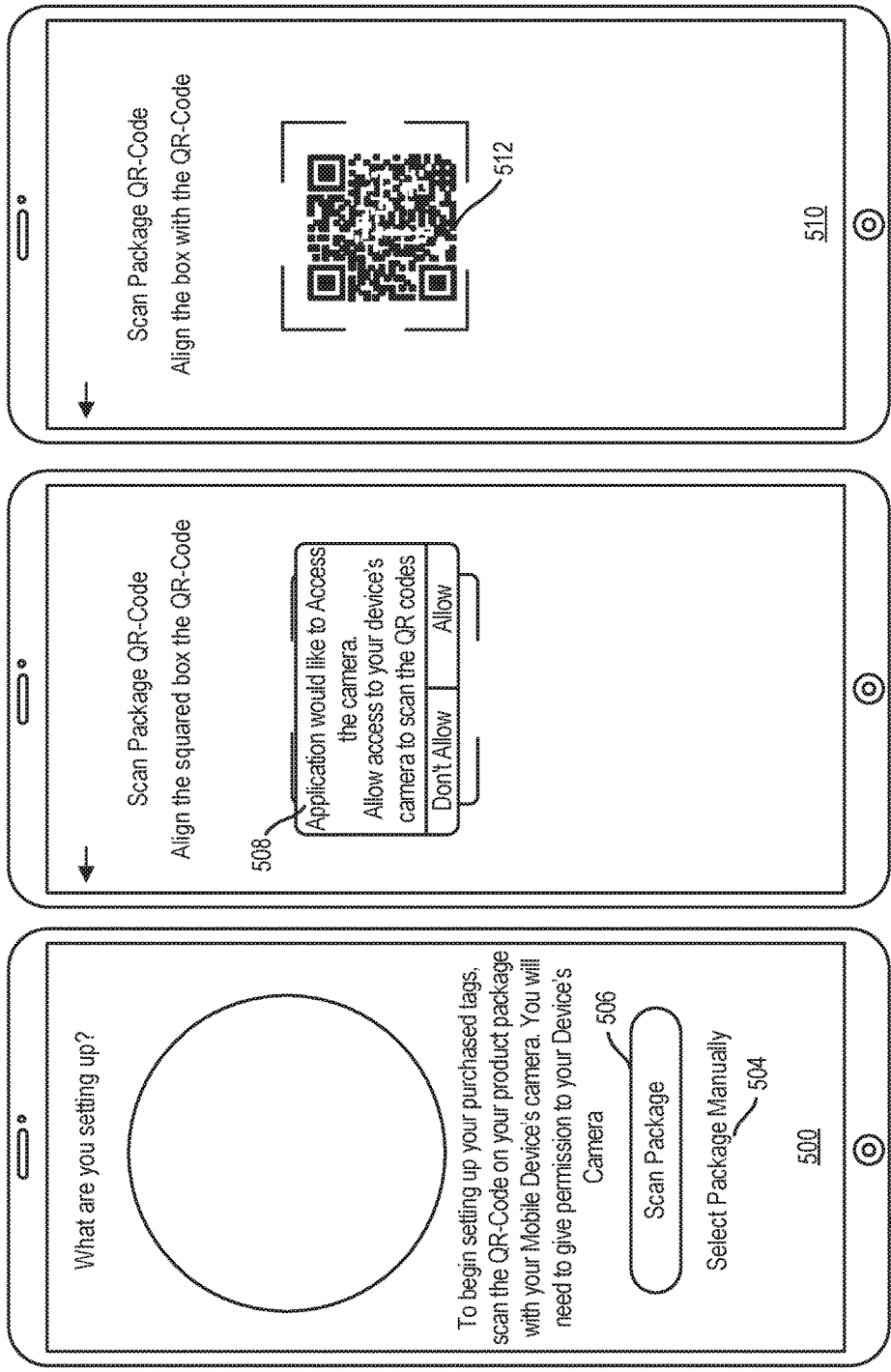

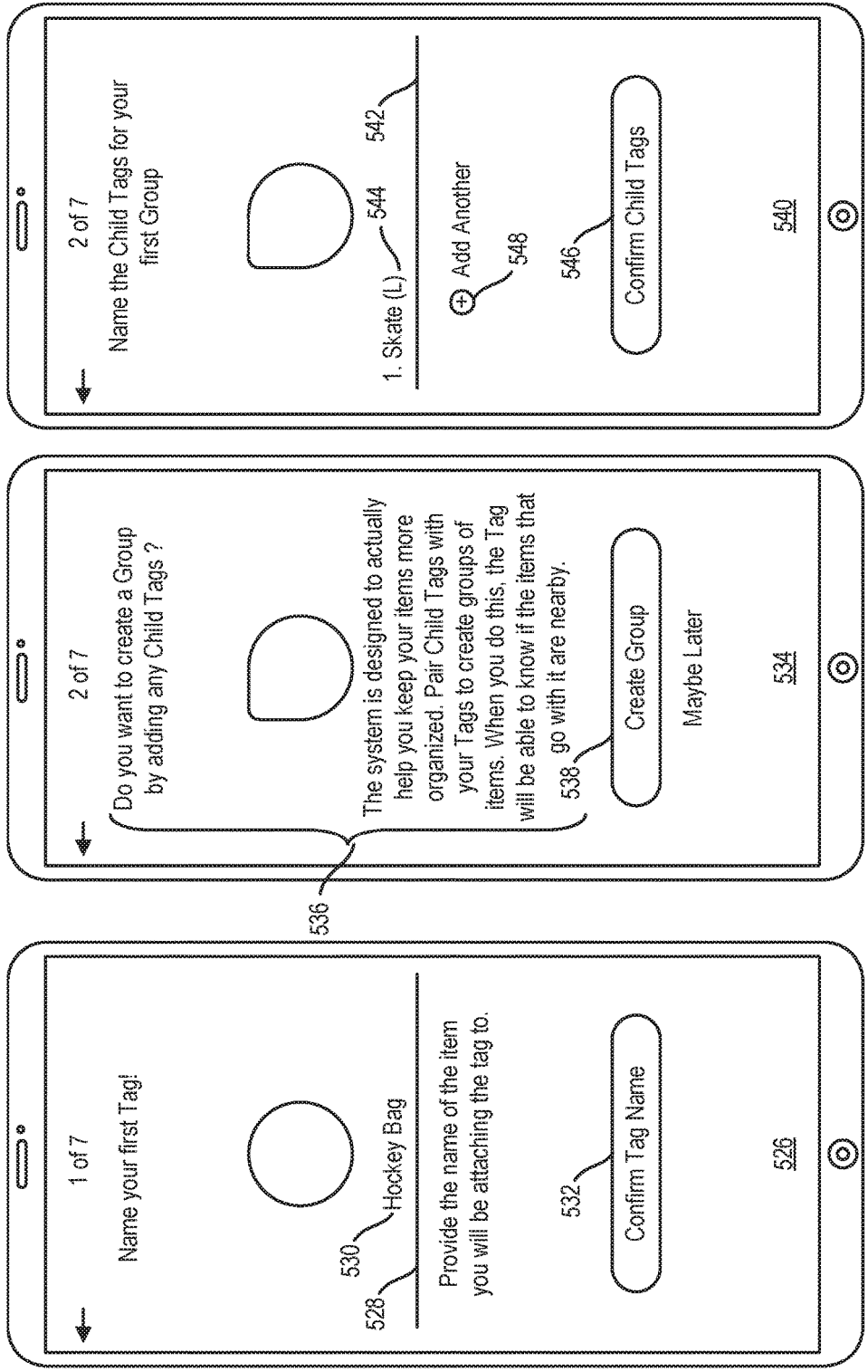

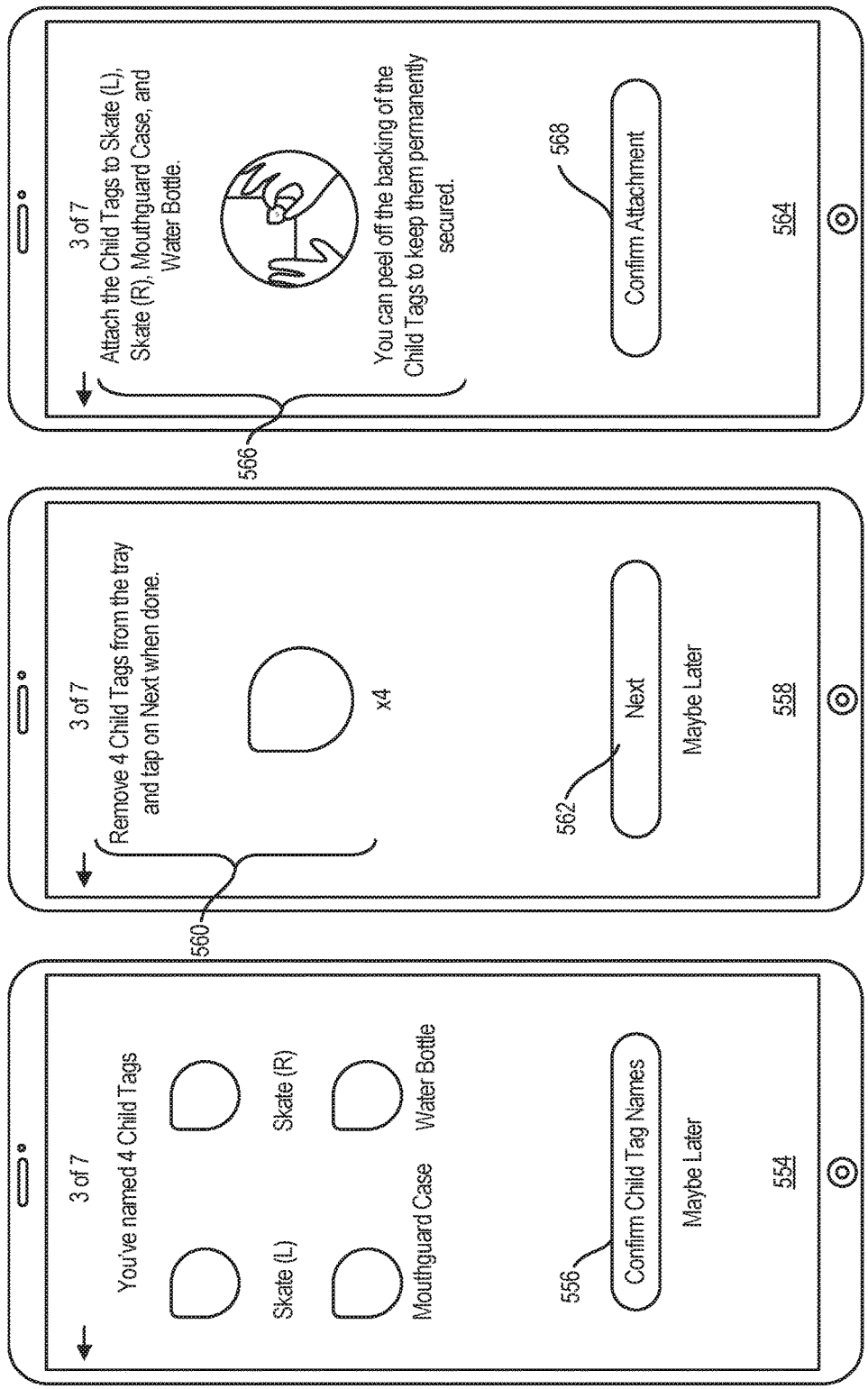

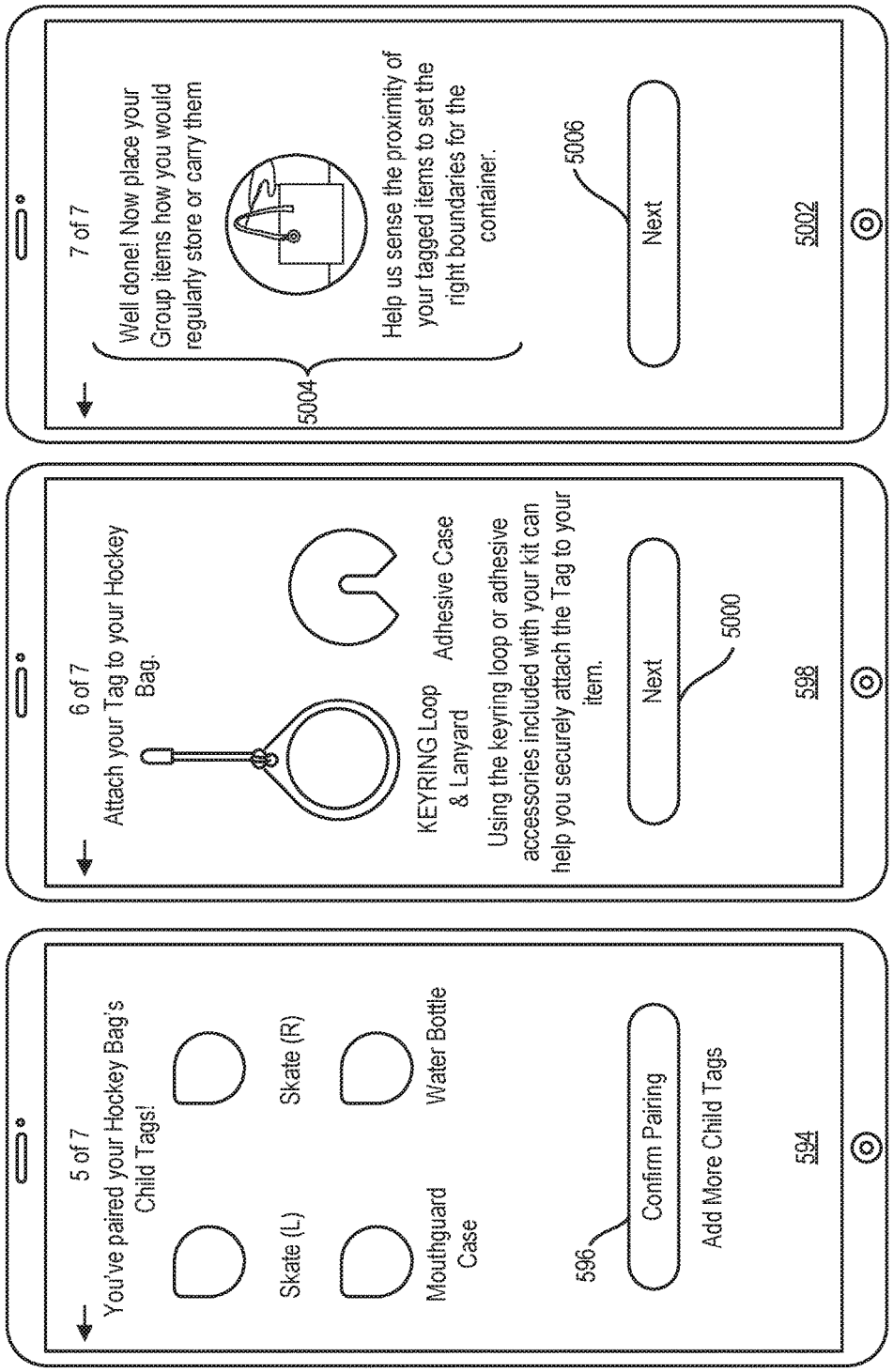

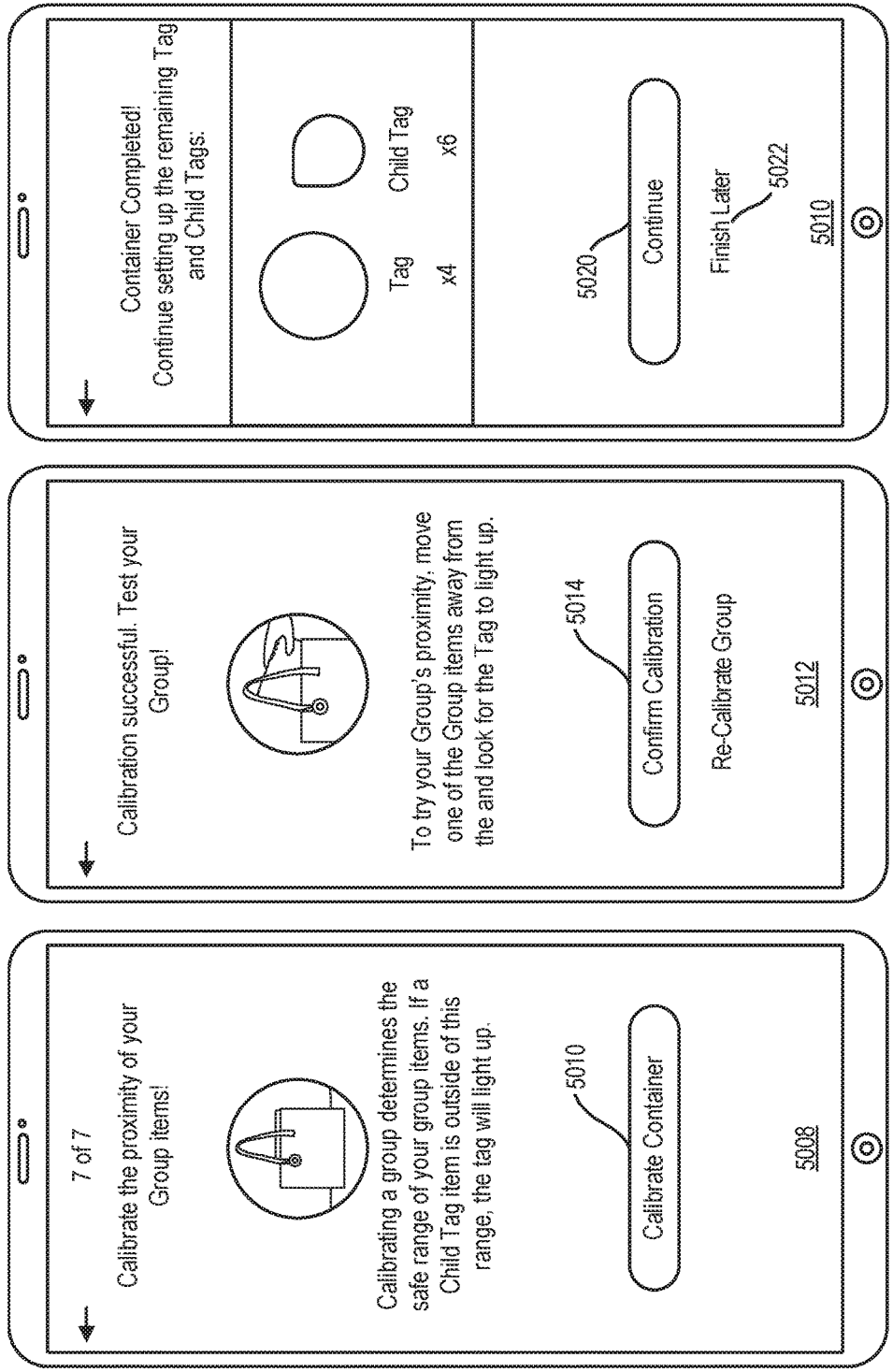

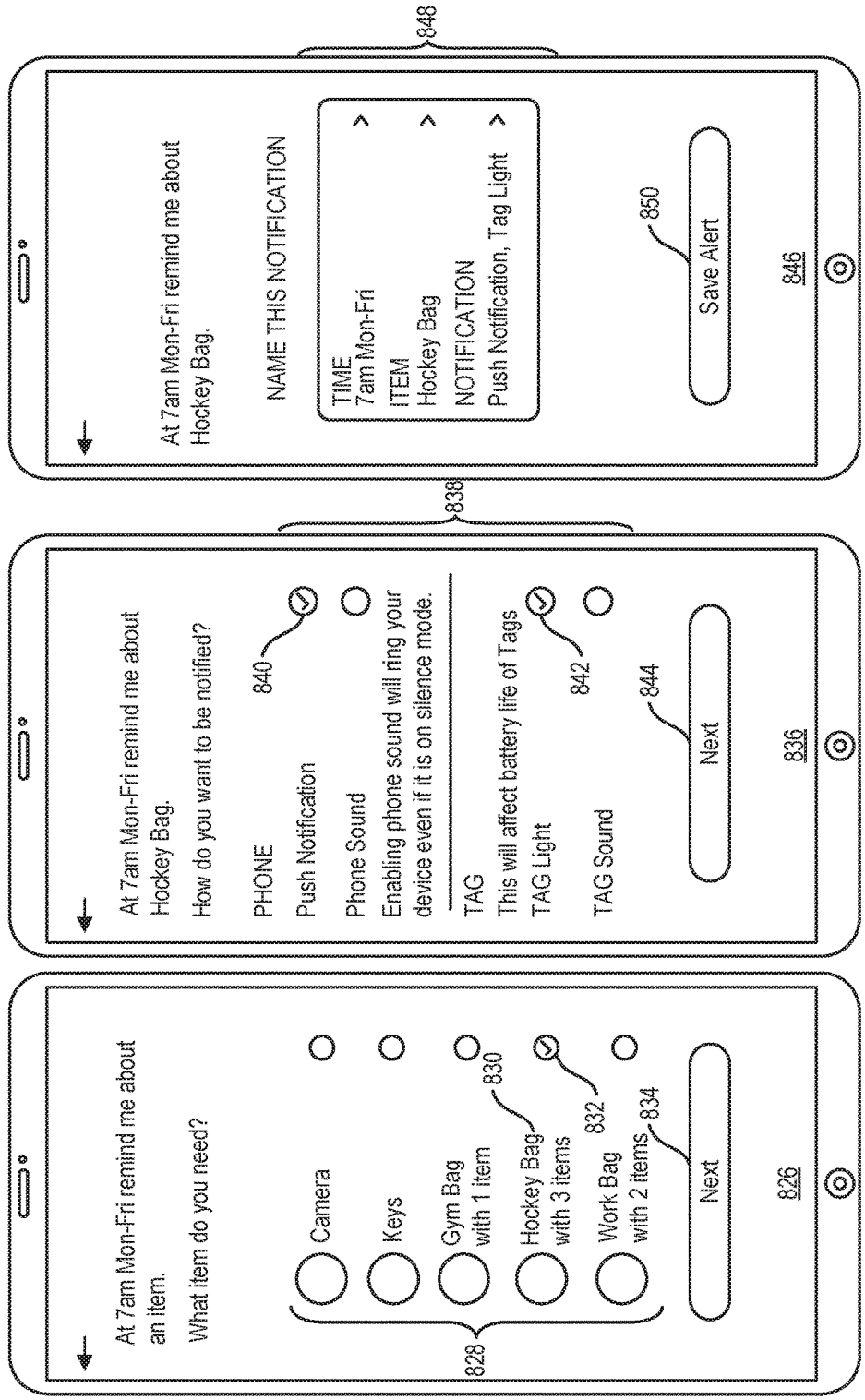

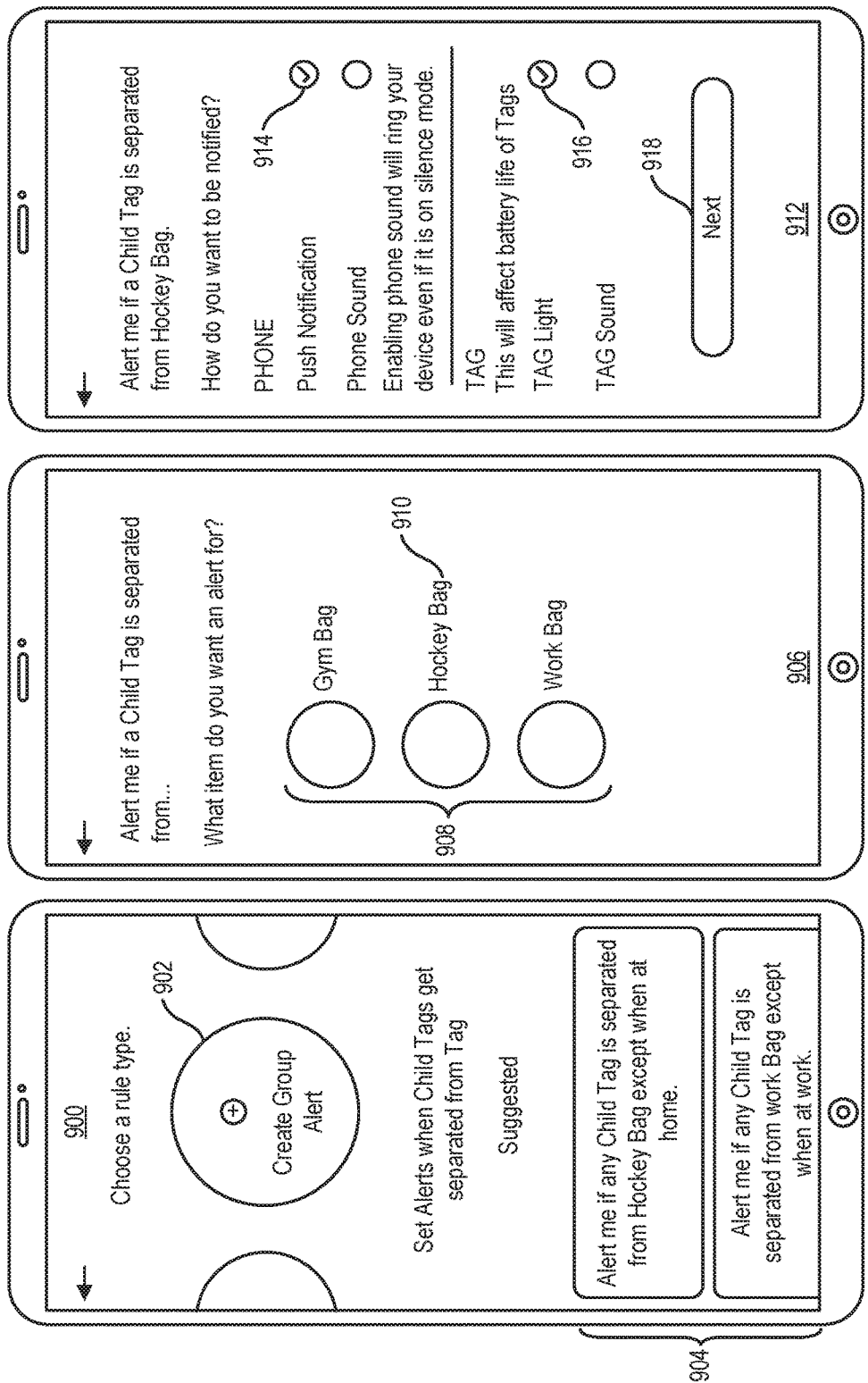

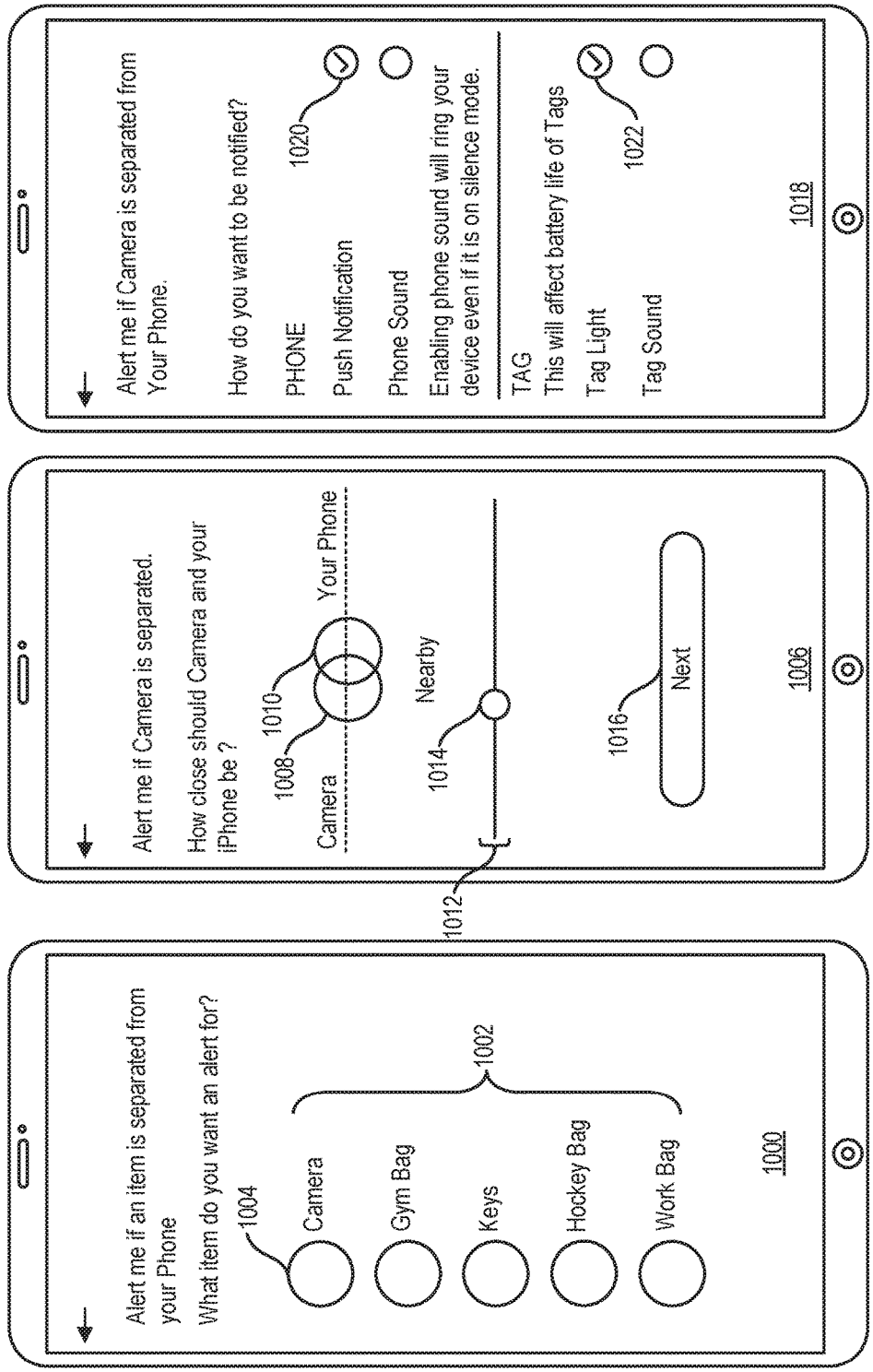

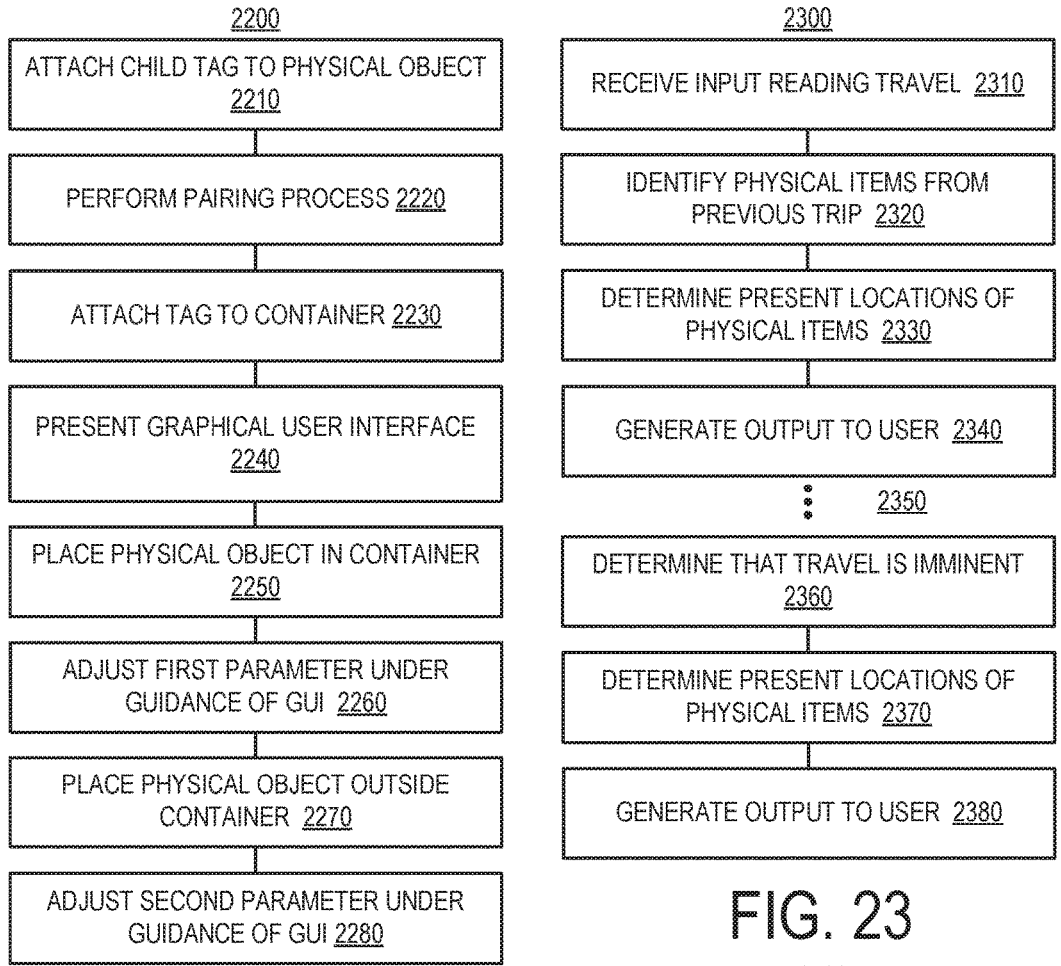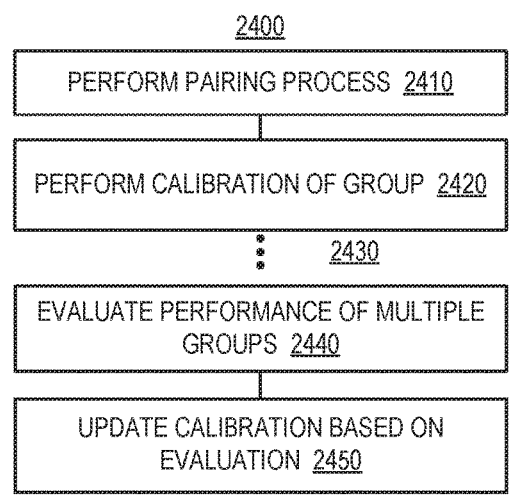

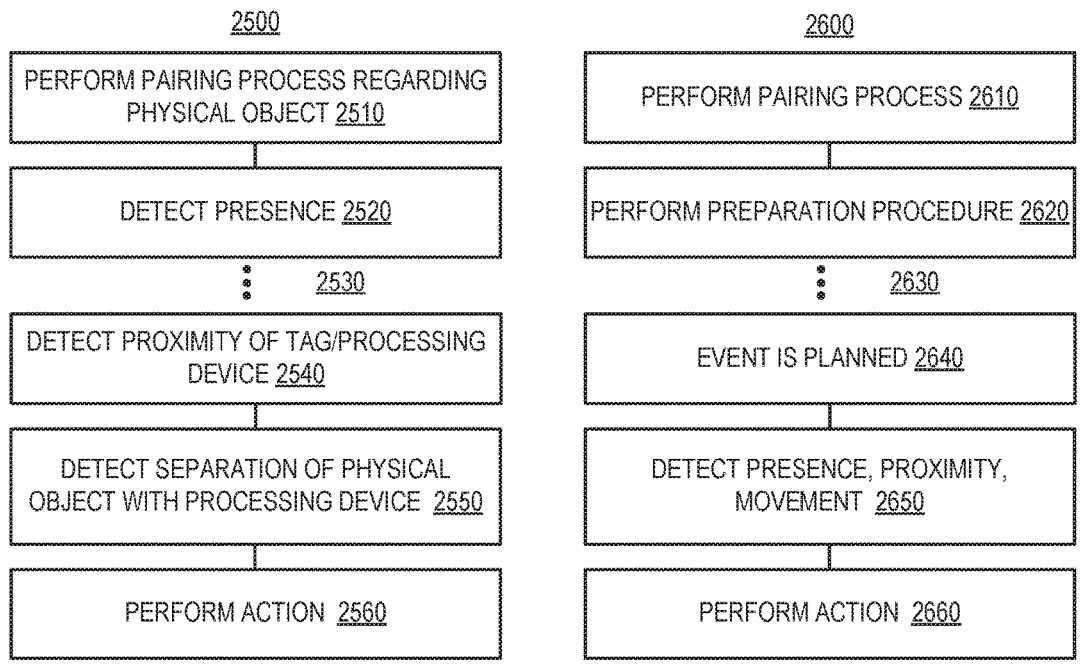
FIG. 25
FIG. 26
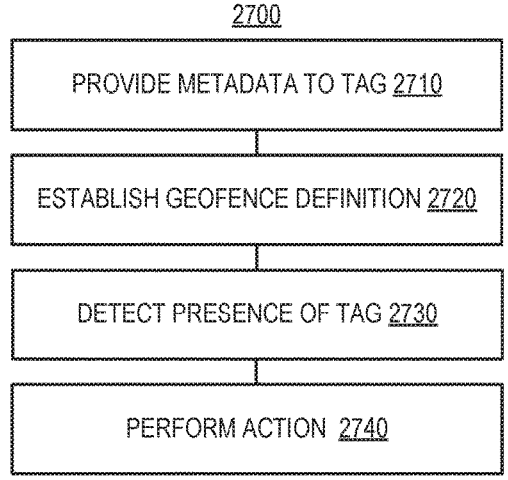
FIG. 27

ORGANIZING GROUPS OF PHYSICAL OBJECTS USING WIRELESS TAGS

CROSS-REFERENCE TO RELATED APPLICATIONS

This patent application relates to the following patent applications filed concurrently herewith ("the related patent applications"):

U.S. patent application Ser. No. 16/183,079, filed Nov. 7, 2018, and entitled "Organizing physical objects using wireless tags."

U.S. patent application Ser. No. 16/183,092, filed Nov. 7, 2018, and entitled "Providing indication to location of physical object using wireless tag."

U.S. patent application Ser. No. 16/183,097, filed Nov. 7, 2018, and entitled "Tag for wirelessly organizing a physical object."

Each one of the related patent applications is incorporated herein by reference in its entirety.

TECHNICAL FIELD

This document relates, generally, to organizing groups of physical objects using wireless tags.

BACKGROUND

The universe of internet-of-things (IoT) devices continues to expand, which can lead to transformation of homes, offices, retail stores, warehouses and public spaces. Smartphones, smart thermostats and smart light bulbs have been introduced. Such devices often have a centralized organization, where the relationship may be defined only between the device and its respective managing device. For example, the system may not have more than those two logical levels of device, and therefore no responsibilities are distributed to lower levels in the system.

SUMMARY

In a first aspect, a method includes: receiving, by a first tag and from a second tag, a first message including an identifier of the second tag, the first and second tags configured for coupling to respective first and second physical objects to organize activities; identifying, by the first tag and based on a proximity measure, the second tag for a pairing process to register the second tag as a child tag of the first tag; and providing, by the first tag, a second message with the identifier to a processing device configured to register the second tag as the child tag of the first tag.

Implementations can include any or all of the following features. The method further comprises performing a proximity calibration between the first and second tags. The first physical object of the first tag is a container capable of containing the second physical object of the second tag, and wherein performing the proximity calibration includes calibrating a first parameter while the second tag is contained in the container, and calibrating a second parameter while the second tag is not contained in the container. The method further comprises presenting, on a graphical user interface of the processing device, a first control for the first parameter, and a second control for the second parameter, the first and second controls operable by a user. The proximity measure between the first and second tags depends on one or more of a received signal strength indicator (RSSI), a connectivity, a latency, a packet error rate, a packet loss, a change in RSSI, a change in connectivity, a change in latency, a change in packet error rate, or a change in packet loss. The method further comprises determining, by the first tag, that the second tag has been separated from the first tag, and performing an action in response to the determination. Performing the action comprises providing a notification to the processing device. Performing the action comprises generating an output from the first tag.

In a second aspect, a tag includes: a processor; a wireless communication component coupled to the processor; and a non-transitory storage medium coupled to the processor and having stored therein instructions that when executed cause the processor to perform operations comprising: receiving, from another tag, a first message including an identifier of the other tag, the tag and the other tag configured for coupling to respective first and second physical objects to organize activities; identifying, based on a proximity measure, the other tag for a pairing process to register the other tag as a child tag of the tag; and providing a second message with the identifier to a processing device configured to register the other tag as the child tag of the tag.

Implementations can include any or all of the following features. The operations further comprise determining that the other tag becomes separated from the tag, and performing an action in response to the determination. The tag further comprises at least one of a speaker or a light, wherein performing the action includes generating an output using at least one of the speaker or the light.

In a third aspect, a non-transitory storage medium has stored therein instructions that when executed cause a processor to generate a graphical user interface comprising: a tag naming view configured for a user to enter a first name to be associated with a first tag as a parent tag; a child-tag naming view configured for the user to enter a second name to be associated with a second tag as a child tag of the first tag, the first and second tags configured for attachment to respective first and second physical objects to organize activities; and a first instruction view for initiation of a pairing process between the first and second tags, wherein in the pairing process the first name is associated with the first tag, and the second name is associated with the second tag.

Implementations can include any or all of the following features. The non-transitory storage medium further comprises a scan view configured for scanning a code associated with the first and second tags. The child-tag naming view is presented after presentation of the tag naming view. The non-transitory storage medium further comprises a second instruction view for attaching the second tag to the second physical object before attaching the first tag to the first physical object. The first instruction view instructs the user to bring the first tag into proximity of the second tag to initiate the pairing process. The non-transitory storage medium further comprises a third instruction view for attaching the first tag to the first physical object after the pairing process. The first tag is paired with multiple second tags, each of the second tags being a child tag of the first tag, the graphical user interface further comprising a status area with respective status indicators for each of the second tags, the status indicators indicating, for the corresponding second tag, whether the second tag is within proximity of the first tag. The graphical user interface further comprises a control to initiate calibration between the first and second tags, wherein the first physical object is a container capable of containing the second physical object, and wherein the calibration includes calibrating a first parameter while the second tag is contained in the container, and calibrating a second parameter while the second tag is not contained in the container. The graphical user interface further comprising a first control for the first parameter, and a second control for the second parameter, the first and second controls operable by the user.

BRIEF DESCRIPTION OF DRAWINGS

FIGS. 4A-G schematically show examples in a physical area and a logical area relating to forming a group.

FIGS. 8A-H show examples of a user interface that can be used for defining time-based notifications.

FIGS. 9A-E show examples of a user interface that can be used for defining separation-based notifications.

FIGS. 10A-C show examples of a user interface that can be used for calibrating separation-based notifications.

FIG. 22 shows an example of a method that relates to calibration of a group that includes a parent tag and a child tag.

FIG. 23 shows an example of a method that relates to organization of physical items for travel.

FIG. 24 shows an example of a method that relates to improving calibration based on evaluated performance of multiple groups.

FIG. 25 shows an example of a method that relates to managing custody of a physical object.

FIG. 26 shows an example of a method that relates to managing preparation of a physical object before use.

FIG. 27 shows an example of a method that relates to controlling access to a geographic area using a tag.

Like reference symbols in the various drawings indicate like elements.

DETAILED DESCRIPTION

Figure 1:
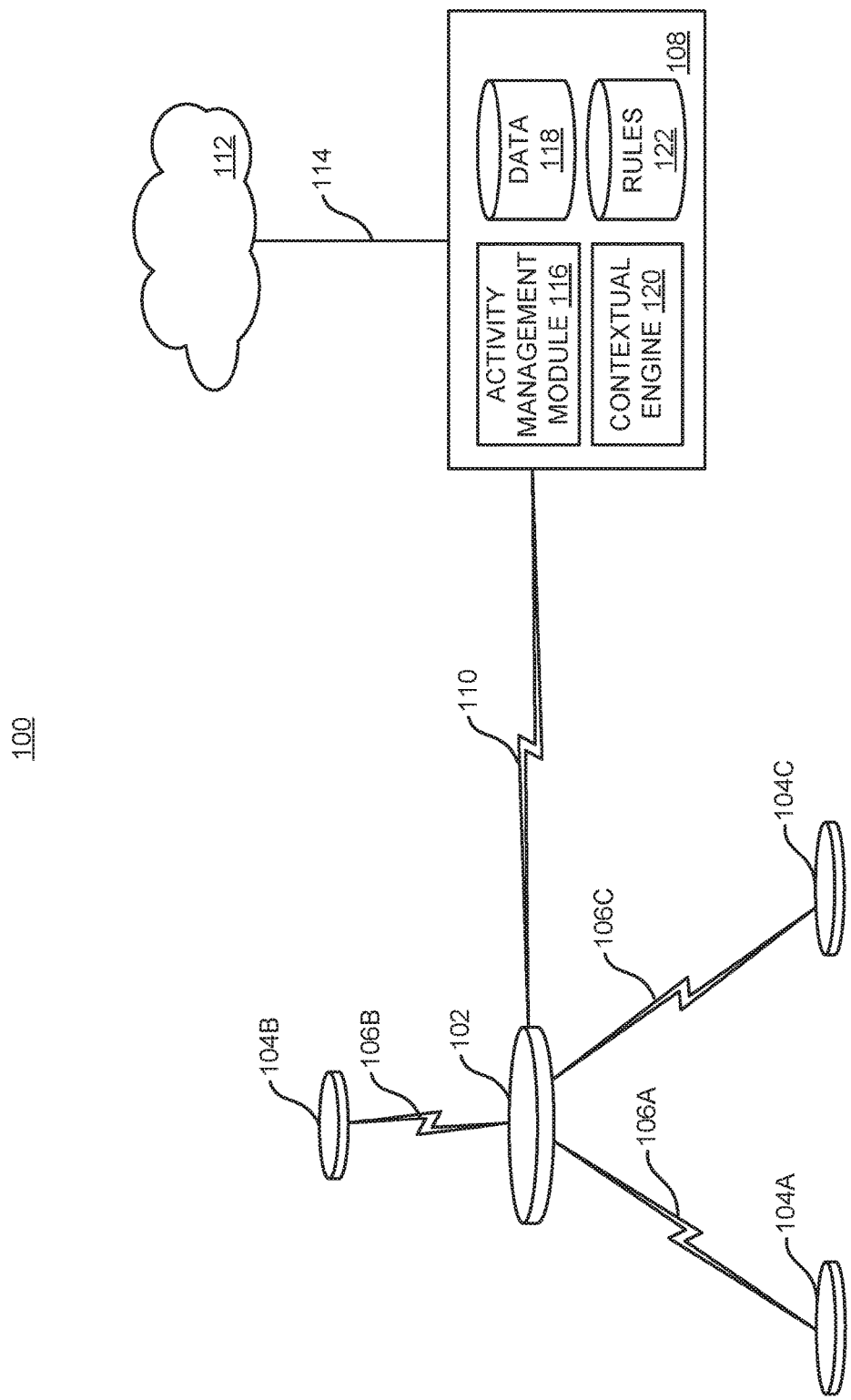
FIG. 1 schematically shows an example operating environment in which a system can organize physical items.

This document includes examples of systems and/or techniques that allow for intelligent organization of a group of multiple physical objects. The organization can relate to the presence, proximity, and/or movement of any of the physical objects. Systems and/or techniques described herein can provide a way for one or more dependent wireless devices, sometimes referred to as "child tags", to maintain a connection with at least one other tag, sometimes referred to as a "parent tag". One example of a system or group of tags may comprise any number of tags which may share one or more relationship or characteristic. In one implementation, an example of such a relationship or characteristic may dynamically change, based on the physical relationships of one or more tags. In such an example, a relationship between tags may be based on the presence or absence of tags within an environment, the relative proximities of one or a plurality of tags to a second or second plurality of tags, or the relative motion or movement of one or a plurality of tags relative to a second or a second plurality of tags. In another implementation, an example of such a relationship or characteristic may be based on a logical structure or hierarchy of managing tags. In such an example, one such example structure could be defined as a "parent-child" relationship where a parent tag and a child tag may have different features, capabilities, responsibilities, or activities. The parent tag(s) and the child tag(s) can collectively be considered a group designated for organizing at least one physical object. For example, organization can be facilitated by synchronized beacons and scans so that the parent tag keeps track of at least the presence, proximity, and movement of the child tag(s). Such organization can at least in some aspects be triggered by movement of either tag. For example, this can be used to trigger an inventory check by the parent tag; this approach can have power conservation advantages; and/or checking can be reduced to situations that are more relevant. Another example of a logic structure can be based on a shared ownership or permissions structure of physical objects. For example, physical objects that are collectively owned, shared to, or otherwise having granted permissions to be accessible can be grouped into one hierarchy.

That is, in an implementation there may be one or more ways to "group" tags or physical objects. A parent-child relationship is one example of an organization of tags, Other forms of organization can be used. In some implementations, tags are dynamically organized into a group based on their physical state within an environment. For example, physical state can include tags present, tags close to each other, a group of tags moving, and/or a group of tags moving away from another group. In some implementations, tags are structurally organized into a group based on logical relationships defined for the tags. For example, a logical relationship can include common owner, shared to another user, parent-child, and/or a container.

In some implementations, grouped tags may be regularly and/or frequently communicating with one another to monitor the status of the system. For example, this can facilitate detection of changes in both the physical relationships of tags within the space, along with the context or structural relationship of the group. For example, this can involve synchronized beacons and scans to maintain an understanding of the presence, proximity, movement, and/or time of tags within an environment. In some implementations, actions can be triggered based on the activity detected within the system. For example, one or a plurality of tags may change its behavior, including, but not limited to, by recalibrating, changing applicable states stored, changing beaconing frequency, changing subscriptions to tags or services, changing power consumption behavior, sending data/commands to cloud or processing device(s), activating a mesh network, and/or sending a command to another device on the wireless or wired network.

More and more physical objects can be provided with sensors, processor capacity, and wireless connectivity. More and more everyday objects such as smart jackets, umbrellas, boxes, shelves, desks and chairs may now follow. An increased intelligence in everyday products can save resources and maximize utility in category after category of physical objects. The development of IoT devices can also create complexity and cognitive overhead for users, whether at home, at work, or elsewhere.

Existing approaches can be associated with one or more of the following characteristics. Only singular and point-to-point interactions may be supported. The approach may have limited universal or standardization of causes and effects (e.g., defined by participant) corresponding to an absence of universal truths. The approach may have limited greater contextual awareness of an environment. The approach may provide an unscalable experience; for example, every time a new component is added, the added benefit is linear. The approach may rely on heavy manual user input and upkeep. Implementations according to the present disclosure can improve or resolve one or more of the above characteristics of existing approaches.

The present disclosure describes examples of a technology platform that can counteract the complexity often observed in IoT proliferation and can be used for optimization and cross communication of these and/or other smart devices. In some implementations, a foundational technology platform/stack can be designed to counteract the complexity of IoT proliferation and harness the power of shared information. For example, item-level data can be securely gathered and shared across all the smart things in an environment (as a baseline system-level understanding) so as to create an intelligent, contextually aware environment. In such an intelligent environment, connected devices can serve as essentially intelligent systems, sharing a unified contextual understanding to inform decisions. In some implementations, such decisions could be singular, group-based, or collective in nature. In the context of such a platform, a range of seamless, end-to-end solutions can be created that solve larger, more challenging customer problems and drive greater benefits and returns on IoT investments.

The present disclosure describes examples of systems and/or techniques that allow things to take care of humans in some regards, rather than the other way around. In order for things to take care of a person, they must first in some sense understand the world in which the person lives and be aware of changes to that world. For example, an umbrella in a person's home can take care of that person by making sure the person is not caught in the rain without the umbrella. In such an example, the umbrella may need to have the intelligence and awareness to take care of that person in a variety of scenarios through various means. For example: the umbrella may need to know when it will likely rain; the umbrella may need to know who will be heading outside today; the umbrella may need to know if another family member took the umbrella; the umbrella may need to know where the umbrella is or where the person needs the umbrella to be; the umbrella may need to know if the person left the umbrella behind at the restaurant; the umbrella may need to know if the person already have the umbrella with him or her, ready to go; the umbrella may need to understand the context surrounding the person's need; and/or the umbrella may need to communicate to the person when it is meaningful to ensure that need is met.

Another example may involve asset management for a business. In this example, the physical object may be a service cart in a hotel; an oscilloscope in a lab; or a toolset on a construction site, to name just a few examples. In such or other scenarios, the physical object may need to know one or more of the following to take care of one or more of the persons involved: for example, who will use it, when it will be used, and how long does that person need to use it for; where it should be returned to for the next use; if another team member took it, and when, or where it is; who has permission to use it; where it currently is; if it was forgotten after last use; Awareness and intelligence are required to understand the context surrounding the user's need; and/or ability to communicate to the person(s) when it is meaningful may be needed. That is, in order for things to truly take care of persons, they need to in a sense be aware of a greater, contextual environment. Some systems and/or techniques described herein illustrate that an environment can be implemented where individual things, locations, and people within the environment share a collective understanding and perspective of what is going on.

The present disclosure describes examples of systems and/or techniques that can simplify a person's life by creating a useful and trusted platform for making the things or other physical objects in that person's life smarter and more helpful. Things can be made smarter, for example, by: Increasing the intelligence of each thing; and/or increasing the intelligence of the system by creating a common platform to optimize the work done by the system. For example, when disparate objects are unified under a shared perspective of the world, it provides the objects within the environment (e.g., a container, a room, a house, a community, or a business) an ability to perform work (e.g., deliver contextualized experiences) that is greater than the sum of its parts.

The present disclosure describes examples of systems and/or techniques allowing physical objects to exist in a shared, contextual intelligent ecosystem. In such an ecosystem the intelligence of individual things, locations, and people within the ecosystem can contribute to and learn from a collective understanding and perspective of what is going on.

Some systems and/or techniques described herein can form a technology framework to create intelligent ecosystems. This can be characterized, for example, as creating a field around each thing, location, or person, which provides a shared common perspective in how they identify, sense, understand, and interact with the world. The field can apply to any wireless device (e.g., a user's mobile phone, a smart object, or a smart location) to allow these devices to gather insight. A foundational technology platform can include, for example, sensors, communication networks, and software, designed to create a shared intelligent, contextually aware platform for a wireless system in home, business, public settings, and/or other environments. A platform may enable developers to harvest the collective intelligence of IoT devices within an environment to deliver seamless, end-to-end customer solutions through coordinating information across multiple smart objects. The platform may facilitate development and sharing of a common, contextualized understanding of occurring activity.

In some implementations, the field and the systems/techniques relating thereto are an additive technology that can increase the capabilities of existing IoT devices to become more contextually aware of the activity around them, and/or coordinate with any or all participating devices within an environment. For example, this can help create more contextually aware environments that share a common understanding of the world and coordinate their work to achieve greater results.

As used herein, a tag is a wireless device with processing capability and configured to be attached to, embedded in, or otherwise coupled to a physical object to facilitate organizing of at least the presence, proximity, and movement of that physical object. The tag can include a wireless communication component that serves to transmit data packets over wireless (e.g., radio) signals from time to time (e.g., as a beacon), or to receive data packets over the signal(s) from another tag and/or from a processing device.

A platform may include multiple tags configured for being attached to, embedded within, or otherwise coupled to respective physical objects. Some tags can be configured to a logical structure such as a grouping or a structural hierarchy wherein one or more tags serve as a "parent tag" to one or more other tags which can be referred to as "child tags". As used herein, a tag is considered a parent tag if it controls the organizing of at least one other tag. As used herein, a tag is a child tag if the organizing of the tag is controlled by at least one other tag. The child tag can have the same or a different (e.g., less complex) configuration of hardware and/or software (e.g., operating system, applications, firmware, etc.) than the parent tag. A processing device can serve to connect with multiple tags (e.g., parent tags), react to information received from them, and issue queries, requests, or other commands to the tags. For example, the processing device may at least in part be implemented in the form of a smartphone and/or tablet executing a particular application or operating system. As another example, the processing device may at least in part be implemented in the form of a dedicated stand-alone device (sometimes referred to as a "hub" in the system). As another example, the processing device can at least in part be implemented in form of one or more remote processing devices (e.g., a cloud solution. In some implementations, an intelligence engine can be implemented on one or more processing devices in the cloud. For example, the intelligence engine may contextualize one or more activities with external factors such as time of day, nature of interaction, location of interaction, weather and external conditions, and/or permissions and relationships between entities (e.g., tags, physical objects, and/or persons) to create experiences that leverage the collective understanding of the system.

The tag may include processing components to facilitate its communication with other parts of the system. The tag may be provided with context that is relevant to the tag and/or its physical object, and/or for surrounding tags and/or objects. In some implementations, such additional context may be provided through queries to other tags, devices, aspects of the system; input responses from one or more users; sensors or detection of environmental aspects, changes or variations of activity occurring such as presence or absence of expected/unexpected devices, anticipated or unanticipated occurring events or activities, or state changes in the devices internal awareness, or the duration of any number of such example activities. For example, the context and the tag's processing capability may allow the tag to phrase, or formulate responses to, queries including, but not limited to: What is the physical object? Who is the owner of the physical object? What other physical objects are located nearby the physical object? What is the relationship of the physical object to those other physical objects? Which of the physical objects is closest to the physical object? What physical objects are moving? Where is the physical object? What is the state of the environment in which the physical object is located? Is the physical object in a safe zone (e.g., a relative or absolute location where certain activities are permitted)? Other physical objects that have been assigned to the physical object, are they present? Has a schedule been set for the physical object? What time is it? In the physical object moving? Is the physical object lost? Should the tag ring? Should the tag send a notification? Should the tag light up? Should the tag adjust its beacon frequency?

Some systems and/or techniques described herein can be used for turning connected devices into aware systems. These systems can gather information about their environment at a given time and adapt behaviors accordingly. Generally, a system can include one or more hardware devices that may include wireless components (e.g., radios), and software. The hardware devices may facilitate gathering of data and performing of actions in the world, the wireless component(s) may allow for communication and data transmission between devices, and the software (sometimes referred to as an intelligence engine) can organize and contextualize the information gathered from, and optimize the actions performed by, the one or more hardware devices. In some implementations, the systems and/or techniques may facilitate connected devices (e.g., tags) to understand one or more of: the presence, proximity, motion, duration of presence, duration of proximity, duration of motion, and/or more of other connected devices in the system.

An entity can add contextual purpose on top of such awareness technology to create unique experiences. The technology can be combined with additional data sets (e.g., rules) to create experiences relating to "groups" (e.g., use of a parent tag to monitor one or more child tags associated with physical objects) and provide intelligent organization. The technology can be used for providing localization service that helps a user find and item; for example, the system can give an indication relating to the unknown location that may help the user in their search. Other examples of experiences include personal organization, home organization, security, inventory management, asset and access control, or logistics experiences.

FIG. 1 schematically shows an example operating environment in which a system 100 can organize physical items. The system 100 can be used with one or more other examples described elsewhere herein. The system 100 can be implemented using one or more examples described herein with reference to FIG. 28.

The system 100 include at least one tag 102 and/or at least one tag 104A-C. In some implementations, multiple instances (i.e., a plurality) of the tag 102 can be used, and here only one instance of the tag 102 is shown for simplicity. The tags 102 and 104A-C can be configured to be attached to, mounted on, or otherwise coupled to, respective physical objects which are not shown for simplicity. For example, the tag 102 may be attached to a sports bag and tags 104A-C may be attached to a baseball glove, a baseball cap, and a bat, respectively. Communication between the tag 102 and one or more of the tags 104A-C may occur by way of sending data packets over respective wireless signals 106A-C. In some implementations, the wireless signals 106A-C include beacon signals and the tag 102 is configured for receiving and recognizing the wireless signals 106A-C. For example, the tag 102 can be considered a parent tag with regard to one or more of the tags 104A-C. As another example, one or more of the tags 104A-C can be considered a child tag with regard to the tag 102. In some implementations, at least one instance of the tag 102 can serve as a child tag to another instance of the tag 102. In some implementations, at least one instance of the tag 104A can serve as a child tag to another instance of the tag 104A. In this example, the tag 102 can be considered to be at a first level of a hierarchy (e.g., as a parent tag), and the tags 104A-C can be considered to be at a second level of the hierarchy (e.g., as child tags). In some implementations, more levels than two can be used in a hierarchy.

For example, each of the tags 104A-C can be assigned to an item that a person carries in their purse to serve as a tracker for that item, and the tag 102 can be defined to correspond to the purse itself, to facilitate organizing and performance of actions based on whether the group of the tags 104A-C represented by the tag 102 is presently intact, or whether one or more of the tags 104A-C is deemed not to be within the group.

The system 100 includes a processing device 108 that can be implemented using one or more examples described with reference to FIG. 28. In some implementations, the processing device 108 may be implemented by one or more processors executing instructions stored in one or more instances of computer-readable storage medium. For example, a processor can execute instructions stored in a memory to instantiate and operate the processing device 108. Communication between the tag 102 and the processing device 108 can occur by way of at least one wireless signal 110. In some implementations, one or more of the tags 104A-C can communicate directly with the processing device 108.

The processing device 108 can be implemented as a single physical component, or can be distributed over multiple physical components. In some implementations, the processing device 108 may include a mobile electronic device (e.g., a smartphone, tablet, watch, wearable device, and/or laptop). In some implementations, the processing device 108 may include a dedicated stand-alone device (e.g., a hub in the system 100).

The processing device 108 can communicate directly and/or via a network with one or more other components within the system 100, outside the system 100, or both. In some implementations, the processing device 108 may participate in group management (e.g., of the tag 102 and/or the tags 104A-C), notification management (e.g., to a user by way of the tag 102 and/or tags 104A-C, or another user interface, such as the display device 2838 in FIG. 28), software updates (e.g., of the tag 102 and/or the tags 104A-C), power management (e.g., of the tag 102 and/or the tags 104A-C), and/or artificial intelligence (e.g., to control the tag 102 and/or the tags 104A-C, and/or to control responses to scenarios involving it or them).

The system 100 can include or make use of one or more remote processing devices, here referred to as clouds 112. The cloud 112 can be implemented using one or more examples described with reference to FIG. 28. Communication between the processing device 108 and the cloud 112 may occur by way of at least one signal 114. The signal 114 can be a wireless signal and/or a wired signal and here schematically illustrates a data network connection between devices. The signal 114 can be sent through one or more networks, including, but not limited to, a local network and/or the internet. In some implementations, the processing device 108 or components thereof can be implemented at least in part by the cloud 112. In some implementations, the tag 102 and/or at least one of the tags 104A-C can communicate directly with the cloud 112.

Activity can be monitored and managed in the system 100. Activity can include, but is not limited to, one or more aspects of presence, proximity, movement, or concentration, and/or the duration of any such presence, proximity, movement, or concentration. Activity monitoring and management in the system 100 can occur by way of the processing device 108 and/or the cloud 112. Here, an activity management module 116 is shown as part of the processing device 108 for purpose of illustration only. The activity management module 116 can accumulate data 118 to facilitate and/or in performing such activity management. For example, the data 118 is stored in a computer-readable medium. For example, data can be stored as state variables on a processing device.

The system 100 can be configured according to one or more levels. In some implementations, the processing device 108 and at least the tag 102 can be considered an item level in the system 100. For example, the item level can facilitate system awareness of at least the presence, proximity and movement of the physical item(s) associated with the tag(s) 102. In some implementations, a group level in the system 100 can include the item level just mentioned and one or more of the tags 104A-C. For example, the group level can facilitate that the tag 102 serves as the parent of the tag(s) 104A-C and monitors the at least the presence, proximity and movement of the physical item(s) associated with the tag(s) 104A-C. In some implementations, a home level in the system 100 can include the group level just mentioned and one or more connected components, including, but not limited to a hub in the system 100, a router, a digital assistant, and/or a smart lightbulb. For example, the home level can provide and manage awareness about the presence, proximity and movement of the physical item(s) associated with the tag(s) 102 and/or the tag(s) 104A-C in a broader spatial environment, such as in a home, office or other location. In some implementations, a system intelligence level in the system 100 can include the home level just mentioned and one or more cloud services. For example, the cloud service(s) can provide contextual notification based on the presence, proximity or movement recognized within the home level. As another example, the cloud service(s) can provide predictive ability based on data recognized in the system 100 and/or tracked behavior relating to the system 100 and/or the physical objects associated with the tags 102 and/or 104A-C.

Contextualization in the system 100 can occur by way of the processing device 108 and/or the cloud 112. Here, a contextual engine 120 is shown as part of the processing device 108 for purpose of illustration only. The contextual engine 120 can harvest data from one or more sources (e.g., based on detecting the behavior of a nearby device) and use it for contextualization, prediction, and/or to adapt its behavior. Harvested data can include external data, such as calendar information for event data, weather data for weather conditions, or crowd-based data, to name just a few examples. Data can be harvested in one or more ways. In some implementations, each device maintains a state table with various state information about the system. For example, as each device determines a change in the information, the device may update the data in the local state variable and then send the new data to the other devices in the system so that each device maintains a current view of the system.

In some implementations, contextualization can include collection of standardized data from one or more entities in the system 100 (e.g., ultimately from the tag 102 and/or the tags 104A-C), collection of disparate device data (e.g., data that is unexpected or otherwise does not conform to a data standard), and/or performance of system dictated actions (e.g., issuing a notification, modifying a behavior, redistributing one or more system resources). Contextualization can be related to or facilitated by the invocation of one or more rules 122 in the system 100. Solely as illustrative examples, the rule(s) 122 can define, with regard to the tag 102 and/or the tag(s) 104A-C, one or more locations where presence is permitted, required, or is not permitted; one or more objects or persons with which a certain proximity is permitted, required, or is not permitted, one or more characteristics of movement that is permitted, required, or is not permitted; and/or one or more concentrations that is permitted, required, or is not permitted. The rule(s) 122 can specify actions performable by the system 100 under specific circumstances (e.g., to generate a notification or to energize or de-energize a component). For example, the rules 122 are stored in a computer-readable medium.

Contextualization can be based on one or more aspects of environmental understanding. In some implementations, an environmental understanding can include information or input that can be processed (e.g., weather conditions, time-based information, information extracted from a calendar, location, presence and/or activity). For example, notification that one of the tags 104A-C is not currently present in the group represented by the tag 102 can be conditioned on some aspect of the weather information (e.g., whether precipitation is forecast).

Contextualization can lead to a contextual understanding that can be the basis for performing (or deciding not to perform) one or more actions in the system 100. The contextual understanding can facilitate phrasing of, or formulation of responses to, queries along the lines of those exemplified above regarding tags. For example, such queries and/or responses can relate to: What is the primary directive of the physical object to which the tag is coupled? In such an example, the tag (when stationary) may contextualize its primary directive as reporting the presence or proximity of tags around it. In another example, the tag's primary directive may be to report whether movement is detected by the first tag or a secondary tag around it. In another example, the tag (if lost) may contextualize its primary directive as needing to communicate via a processing device it's current location to the owner. In another example, the tag (when sufficiently powered or continuously charged, may contextualize it's primary directive as responsible for greater processing and contextualization of the system: to shoulder the processing and power burden so that other tags will have a lesser burden. What is the tag's confidence level for accuracy? In such an example, a tag may choose to communicate or withhold communicating one of it's directives or queries until more information is gathered from the environment, such as greater points of data to confirm accuracy of data. Is the tag/physical object safe? For example, the tag may sense the concentration of recognized tags or devices within its proximity to determine whether or not it is with the owner or authorized user, or whether it is still within presence of known entities. For example, if a tag no longer sees any recognized devices, it may contextualize this as being "lost" and change its behavior. Is the tag/physical object in a safe zone? For example, if a tag has the awareness of a familiar or safe location such as the owner or authorized user's home or office, the tag may choose to communicate at a lower interval frequency as to conserve power consumption over time. Is the tag/physical object in distress? For example, if the tag detects an absence of recognized devices nearby, or any combination of environmental activities is contextualized as unacceptable (increase in temperature, presence of unauthorized devices, change in acceptable weather, etc.) the tag may choose to communicate the relevant information to the relevant party. Is the physical object needed? Is the physical object where the system needs the physical object to be? For example, if there is an event that requires the presence of a certain physical device at a certain location or a certain time, the tag may choose to inform a relevant user of its current location to prepare ahead of the event. Who or what is the physical object with (e.g., taking into account proximity and/or duration)? Is the physical object with an object and/or person that the physical object needs to be with? For example, in a scenario where a physical object must be in an authorized location or with an authorized person, an alarm may sound if the object was removed from the presence of the authorized location or authorized user. Did the physical object change its location? For example: if a physical object is "lost", and the primary directive is to "be found", the tag may contextualize the action required as to report a new location every time there has been a detected movement or location change. However, in such an example, if the object has not moved or meaningfully moved, the object may not need to communicate location information as frequently to conserve its power consumption. Should the tag communicate anything? For example, in some scenarios, tags may be aware of a greater number of things, activities, or environmental conditions than what is meaningfully relevant to a user or the system. In this contextualization process, the tag is deciding what to do, when, and if an action is even needed.

Figure 2:
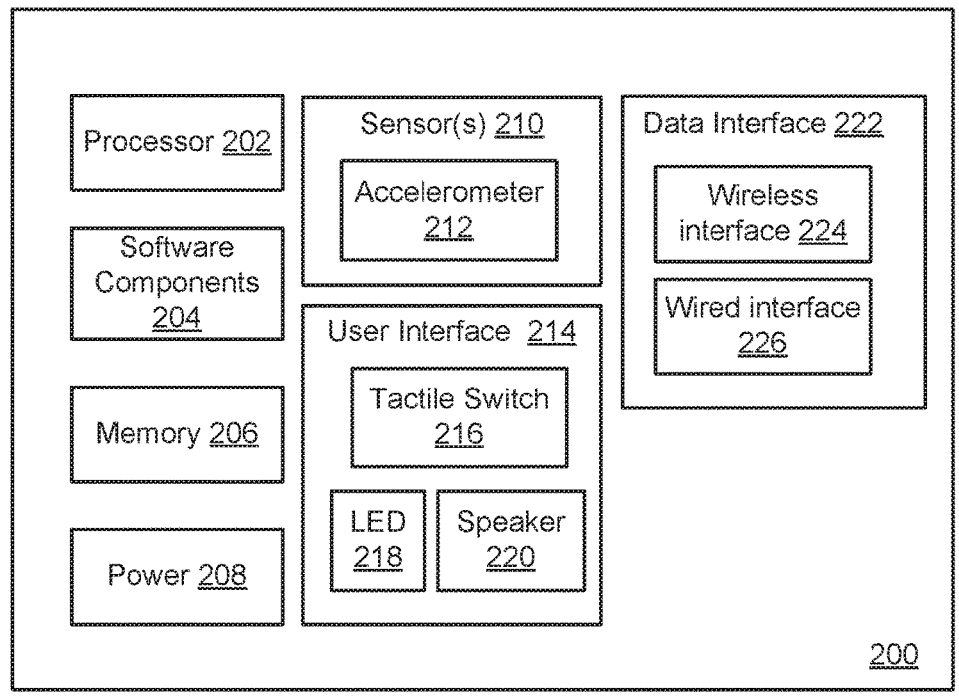
FIG. 2 shows a block diagram of an example of a tag.

FIG. 2 shows a block diagram of an example of a tag 200. The tag 200 can be implemented using one or more examples described with reference to FIG. 28. The tag 200 can be implemented substantially inside a housing that facilitates attachment of the tag 200 to, or otherwise coupling the tag 200 with, a physical object. For example, the housing can include one or more enclosures serving to contain at least some of the components of the tag 200 as a cohesive unit. The tag 102 and/or the tags 104A-C can be implemented using the tag 200. Solely as an example, and without limitation, such housing can have a thickness that is on the order of a few mm, and or a greatest width in any dimension that is on the order of tens of mm. For example, the housing can be an essentially circular disc. An identifier (e.g., a QR code) can be affixed to the housing to aid in identification and/or a setup process.

The tag 200 can be attached to, embedded within, or otherwise coupled to the physical object in one or more ways. For example, the tag 200 can be provided with an adhesive on the housing that couples to a surface on the physical object. As another example, the tag 200 can be provided with a holder that attaches to the tag 200, the holder having a loop (e.g., a keyring) for being coupled to the physical object.

The tag 200 can include at least one processor 202. The processor 202 can be semiconductor-based and can include at least one circuit that performs operations at least in part based on executing instructions. The processor 202 can be a general purpose processor or a special purpose processor.

The tag 200 can include one or more software components 204. The software components 204 can include software (e.g., firmware). In some implementations, the software components 204 includes an activity component 205 that can control one or more aspects of operation by the tag 200. For example, the activity component 205 can include some or all functionality described with reference to the activity management module 116 (FIG. 1) or the contextual engine 120. The software components 204 can be formulated using one or more programming languages that facilitate generation of instructions comprehensible to the processor 202.

The tag 200 can include at least one memory 206. The memory 206 can store information within the tag 200. The memory 206 can be implemented in the form of one or more discrete units. The memory 206 can include volatile memory, non-volatile memory, or combinations thereof.

The tag 200 can include a power supply 208. The power supply 208 can power some or all of the components of the tag 200 or other components not shown. In some implementations, the power supply 208 includes one or more electrochemical cells (e.g., a lithium-ion cell) capable of storing energy in chemical form and allowing consumption of that energy by way of conversion into electrical current. In some implementations, the power supply 208 includes a capacitor capable of storing energy in an electric field. The power supply 208 can be rechargeable (e.g., by external power from a voltage/current source, or from a solar cell) or non-rechargeable. For example, the power supply 208 can be recharged by electrically connecting a power source to physical pins that contact the power supply 208. As another example, the power supply 208 can be recharged wirelessly (e.g., by inductive charging). Kinetic energy harvesting and/or thermal energy harvesting may be used. In some implementations, a near-field communication (NFC) coil can also be used as a charging coil for inductive charging. For example, the power supply 208 can be recharged wirelessly in near proximity (e.g., by inductive coupled charging using internal dedicated coil or reusing an NFC coil for charging). As another example, the power supply 208 can be recharged wirelessly in far field (e.g., by electric field charging) or using energy harvesting techniques from multiple ambient sources, including kinetic or bio-mechanical sources (e.g., a piezo electric generator sensing vibration or thermo-electric generator (TEG) which harvests energy from temperature gradient). In some implementations, ambient backscatter energy may be used to power the tag directly (e.g., in lieu of using an electrochemical cell to store energy).

The tag 200 can include one or more sensors 210. The sensor(s) 210 can be configured to detect one or more characteristics of the environment or other surrounding to which the tag 200 is subjected. The sensor(s) 210 can detect one or more aspects including, but not limited to, moisture, humidity, temperature, pressure, altitude, acoustics, wind speed, strain, shear, magnetic field strength and/or orientation, electric field strength and/or orientation, electromagnetic radiation, particle radiation, compass point direction, or acceleration. Here, for example, the sensor 210 includes an accelerometer 212. For example, the accelerometer 212 may be used to detect if the tag 200 is in motion, and the processor 202 of the tag 200 may decide to change the behavior of the tag 200 based on the motion detected. For example, the beaconing pattern of the wireless interface 224 may be increased when the tag 200 is determined to be moving. As such, the tag 200 can change its behavior (e.g., by operation of the processor 202) based on an output of the sensor(s) 210. Collection of data (e.g., one or more signals) from the sensor(s) 210 can be considered harvesting of information that can be the basis for deterministic behavior, predictive behavior, and/or adaptive behavior in the system in which the tag 200 is implemented.

The tag 200 may include one or more user interfaces 214. The user interface(s) 214 can facilitate one or more ways that a user can make input to the tag 200 and/or one or more ways that the tag 200 can make output to a user. In some implementations, the user interface 214 includes a tactile switch 216. For example, activating the tactile switch can open and close an electric circuit on the tag 200, thus providing input to the tag 200. In some implementations, the user interface 214 includes at least one light-emitting diode (LED) 218. The LED 218 can illuminate using one or more colors to signal a status of the tag 200 or of another tag, and/or to convey an instruction to the user. A red-blue-green LED can be used for the LED 218. In some implementations, the LED 218 can indicate power and/or pairing status during setup of the tag 200. In some implementations, the LED 218 can confirm the presence or absence of one or more child tags. In some implementations, the user interface 214 includes at least one speaker 220. The speaker 220 can emit one or more portions of audio to signal a status of the tag 200 or of another tag, and/or to convey an instruction to the user. For example, the speaker 220 can include an audio piezo buzzer.

The tag 200 may include at least one data interface 222. Here, the data interface 222 is shown as including a wireless interface 224 and a wired interface 226. The data interface 222 can facilitate communication between the tag 200 and at least one component in a system, such as during operation or a software update. For example, the data interface 222 can facilitate the wireless signal 110 (FIG. 1) between the tag 102 and the processing device 108. As another example, the data interface 222 can facilitate one or more of the wireless signals 106A-C between the tag 102 and the tags 104A-C. In some implementations, the data interface 222 can be configured for short-distance communications (e.g., in a personal-area or near-me network). In some implementations, the data interface 222 can be also or instead be configured for longer-distance communications (e.g., in a local-area or wide-area network). For example, and without limitation, the data interface 222 can operate in accordance with the principles of one or more of Bluetooth communication, Bluetooth Low Energy (BLE) communication, Zigbee communication, Wi-Fi communication, Long-Term Evolution (LTE) communication, NFC, Long Range (LoRa) communication, ultra wide band (UWB) communication, radio-frequency identification (RFID) communication, Ethernet, Ethernet over powerline, or Narrow-Band (NB).

The data interface 222 (e.g., the wired interface 226) can make use of physical pins on the tag 200. In some implementations, the physical pins at least partially extend beyond the hull of a housing that contains the tag 200 so that the physical pins can be contacted by another component. In some implementations, the physical pins relating to the data interface 222 can be grouped with physical pins relating to the power supply 208 (e.g., to be used in recharging). For example, the physical pins relating to the data interface 222 can be used to trigger the tag 200 to be ready to receive electrical input on the physical pins relating to the power supply 208.

The tag 200 can include at least one bus or other communication component that facilitates communication between two or more of the processor 202, software components 204, memory 206, sensor(s) 210, user interface 214, and/or data interface 222.

The tag 200 can be implemented as an intelligent device that can be used for personal tracking and organization. The tag 200 can be configured to communicate directly (or indirectly, such as via a network) with one or more instances of the tag 200, such as with a child tag when the tag 200 is considered a parent tag, or with a parent tag when the tag 200 is considered a child tag. The tag 200 can be configured for direct/indirect communication with a processing device (e.g., the processing device 108 in FIG. 1, a third-party IoT device, and/or a cloud server (e.g., the cloud 112 in FIG. 1). The tag 200 can be configured to generate and record state information. For example, the tag 200 can record events that relate to the tag 200 and/or to another tag. The tag 200 can represent a single object (e.g., the physical object to which the tag 200 is attached) or a group of objects (e.g., the physical objects to which respective child tags are attached when the tag 200 is considered a parent tag). The tag 200 can be configured to have one or more relationships with another instance of the tag 200, with a person (e.g., an owner or user), and/or with a location. For example, such relationships can be defined in the rules 122 (FIG. 1).

The tag 200 can be used to organize essentials (e.g., physical objects of significance) and for personal organization. The tag 200 can help a user quickly locate the physical object to which the tag 200 is attached. The tag 200 can serve as a parent tag for one or more child tags (e.g., instances of the tag 200) within a group solution, which can allow for tracking of the presence, proximity, and movement of other physical objects. The tag 200 can serve as a location marker. For example, this can be exploited by a location service designed to provide indications to the location of wireless-enabled devices.

Examples herein mention that a tag can serve as a child tag to another tag, which can be considered the parent tag. In some implementations, the child tag is implemented with all components of the tag 200, optionally with more components. In some implementations, the child tag can have fewer than all of the components of the tag 200. For example, the power supply 208 in the child tag may be non-rechargeable. As another example, the child tag may not have one or more of the sensor(s) 210 (e.g., the accelerometer 212 can be omitted). As another example, the LED 218 in the child tag can be a single-color LED (e.g., white). As another example, the child tag may not have the speaker 220. As another example, the child tag may not have the wired interface 226. For example, no physical data pins may be present on the housing of the child tag.

In operation, the child tag (e.g., including some or all of the components of the tag 200) can be used to organize a range of physical objects, including all everyday essentials that a person may have. The parent tag (e.g., including some or all of the components of the tag 200) can monitor the child tag(s) to which it is connected. As such, the parent tag can indicate the presence of a physical object to which the child tag is attached/coupled based on the child tag's proximity to the parent tag. For example, the parent tag can send a message indicating whether the child tag is within the range of the parent tag or not within the range of the parent tag.

Examples herein illustrate that a tag (e.g., the tag 200) can have an awareness of circumstances. Aspects of the awareness can be categorized as being either internal or external. An internal awareness may pertain to the physical object itself. In some implementations, the internal awareness can be further separated into preset state values and dynamic state values. Preset state values can include, but are not limited to, make, model, manufacturing date, unique identifier (UID), device info, object type, or manufacturer's suggested retail price (MSRP). Dynamic state values can include, but are not limited to, battery level, power consumption, market value, directive, beaconing rate, communications frequency, communications protocol, object relationship logic, owner identity, permissions, internal clock, motion, or orientation.

An external awareness can relate to factors externally related to the physical object. External factors can include, but are not limited to, relative location, geo location, time, sensor data, objects nearby, proximity, relative motion of objects nearby, or duration of any states.

Figure 3:
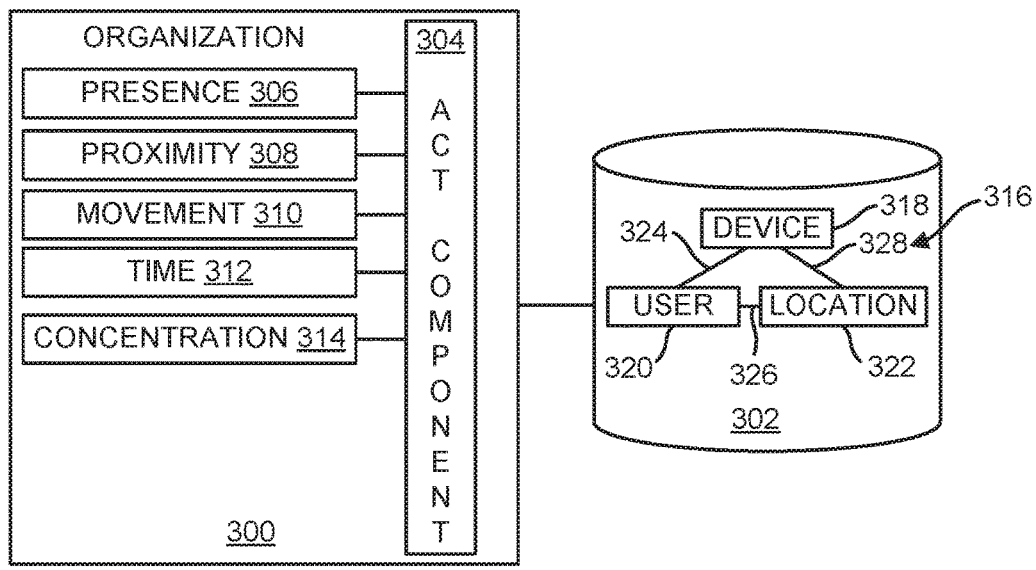
FIG. 3 shows an example of an activity component and a rules repository.

FIG. 3 shows an example of an organization module 300 and a rules repository 302. The organization module 300 and the rules repository 302 can be used with one or more other examples described elsewhere herein. The organization module 300 and the rules repository 302 can be implemented using one or more examples described with reference to FIG. 28. For example, the organization module 300 can be implemented by way of at least one processor executing instructions stored in a computer-readable medium. The rules in the rules repository 302 can relate to relationships including, but not limited to, permissions, groupings, and/or parent-child hierarchies.

The organization module 300 can be implemented in a device such as the tag 200 (FIG. 2), the tags 102 and/or 104A-C (FIG. 1), or in the processing device 108 (FIG. 1), to name just a few examples. Such device(s) can receive wireless signals from one or more items being monitored. For example, the tag 102 when serving as a parent tag can receive the wireless signals 106A-C from the tags 104A-C, respectively, serving as child tags. As another example, the processing device 108 can receive the wireless signal 110 from the tag 102.

The organization module 300 can use the received signal(s) to gain insight into at least the presence, proximity, or movement of the transmitting device, or of a device related to the transmitting device. In some implementations, received signal strength indication (RSSI) can be used as part of such a determination. The RSSI can indicate the power present in the received signal (e.g., the wireless signals 106A-C or the wireless signal 110). In some implementations, relative RSSI can be used. Generally speaking, when the transmitting device is closer to the receiving device, the RSSI tends to be greater because there is more power in the received signal.

The organization module 300 can detect "activity" of a tag, processing device, and/or a third-party IoT device, in any of several senses, including, but not limited to, that the device is present in a system, that the device is proximate to something (e.g., another device, a tag, an object, or a user, according to a proximity measure), and/or that the device is moving, and the organization module 300 can take action if appropriate. The organization module 300 can also or instead detect the "inactivity" of a device and take action if appropriate. As such, the organization module 300 may not merely detect, or respond to, a device's action.

In some implementations, activity can be detected or determined in one or more ways. For example, a tag can send a message when the tag senses (e.g., by an accelerometer) that it is moving. As another example, a first tag can detect that a second tag is moving because the RSSI is decreasing in a predictable manner. As another example, a first tag can detect that a second tag is moving because the RSSI is decreasing and a third tag reports increasing RSSI with the second tag.

In some implementations, time (e.g., duration) can be part of such a determination of activity. In some implementations, a transmitting device may include a timestamp or other time identifier in the transmitted message, and the receiving device can compare the timestamp/identifier with its (internal) clock to determine an amount of time that passed between the sending and the receipt of the wireless signal. For example, the clocks in the transmitting and receiving devices can be synchronized to a master clock, or the receiving device may know how to translate the transmitting device's timestamp into its local time. Internal processing delays (at the transmitting or receiving end) can be accounted for. As another example, the time can be measured from the moment of sending a request for a response until the response is received. The time is a measure of the latency experienced in communication between two devices (e.g., two tags, a parent tag and a child tag, and/or a tag and a processing device). A latency value can be defined based on the time it takes for a signal to reach the receiver. The latency value, moreover, can be used to characterize the distance between the transmitting and receiving devices, which gives an indication as to the relative position of the devices. In some implementations, time may be measured with round trip time (RTT) for estimating distance. For example: the sender sends a message, and based on the time it takes to receive a response, the sender can infer things about link quality and distance. RTT can be used to give information about packet loss, error rate, or number of hops (in the case of a mesh search).

In some implementations, connectivity can be part of such a determination. In some implementations, connectivity can represent whether a device (e.g., a parent tag) is able to communicate with another device (e.g., a child tag). For example, a connectivity parameter can be a binary factor dependent on whether communication is currently established between two devices.

The activity A can also or instead take into account one or more other characteristics. For example, latency can be taken into account (e.g., denoted by L). For example, packet error rate can be taken into account (e.g., denoted by PER). For example, packet loss can be taken into account (e.g., denoted by PL). For example, change in RSSI over time can be taken into account (e.g., denoted by $\Delta$RSSI). For example, change in connectivity over time can be taken into account (e.g., denoted by $\Delta$C). For example, change in latency over time can be taken into account (e.g., denoted by $\Delta$L). For example, change in packet error rate over time can be taken into account (e.g., denoted by $\Delta$PER). For example, change in packet loss over time can be taken into account (e.g., denoted by $\Delta$PL). In some implementations, the activity A can be based on one or more of RSSI, C, L, PER, PL, $\Delta$RSSI, $\Delta$C, $\Delta$L, $\Delta$PER, or $\Delta$PL.

As such, a proximity metric for the distance between devices (e.g., two tags, a parent tag and a child tag, and/or a tag and a processing device) can be defined based on one or more of RSSI, C, L, PER, PL, $\Delta$RSSI, $\Delta$C, $\Delta$L, $\Delta$PER, or $\Delta$, for example as shown for A above. This can be considered a proximity measure that the organization module 300 can use in determining the presence, proximity, and movement of one or more tags. The proximity measure takes into account at least one of RSSI, C, L, PER, PL, $\Delta$RSSI, $\Delta$C, $\Delta$L, $\Delta$PER, or $\Delta$PL, and can optionally take into account also one or more other parameters. The organization module 300 can include an activity (ACT) component 304 that can be responsible for determining and providing a proximity measure (e.g., based on A above). In some implementations, the activity component 205 (FIG. 2) can include one or more aspects of functionality described with reference to the activity component 304.

The organization module 300 can include one or more components that facilitate use of a proximity measure in determining, and reacting to, the activity of one or more tags. In some implementations, the organization module 300 includes a presence component 306 coupled to the activity component 304. For example, the presence component 306 can make use of the proximity measure of the activity component 304 to determine the presence of a tag (e.g., whether the tag 104A (FIG. 1) serving as a child tag is present relative to the tag 102 serving as a parent tag for the tag 104A). As another example, a tag can be deemed present if it is detected by the system, whether the tag is proximate to another tag (e.g., its parent tag) or not. The determination of whether a tag is present can depend on the rules in the rules repository 302, and as such can be different for different physical objects. For example, a wallet labeled with a tag can be deemed present if it is detected as being inside the dwelling of the person who owns the wallet; a wheelbarrow, on the other hand, can be deemed to be present if it is detected by either the system monitoring the owner's house or the corresponding system at the neighbor's house, in that the neighbor may be permitted to borrow the wheelbarrow from the owner's yard.

In some implementations, the organization module 300 includes a proximity component 308 coupled to the activity component 304. For example, the proximity component 308 can make use of the proximity measure of the activity component 304 to determine the proximity of a tag (e.g., how proximate to the tag 104A (FIG. 1) serving as a child tag is relative to the tag 102 serving as a parent tag for the tag 104A).

In some implementations, the organization module 300 includes a movement component 310 coupled to the activity component 304. For example, the movement component 310 can make use of the proximity measure of the activity component 304 to determine the movement of a tag (e.g., how the tag 104A (FIG. 1) serving as a child tag moves relative to the tag 102 serving as a parent tag for the tag 104A).

In some implementations, the organization module 300 includes a time component 312 coupled to the activity component 304. For example, the time component 312 can make use of the proximity measure of the activity component 304 to determine a duration relating to a tag (e.g., how long the tag 104A (FIG. 1) serving as a child tag is present, proximate, and/or moving relative to the tag 102 serving as a parent tag for the tag 104A). As another example, a time as in the time of day at a particular location, can be a factor in applying a rule based on contextualized information.

In some implementations, the organization module 300 includes a concentration component 314 coupled to the activity component 304. For example, the concentration component 314 can make use of the proximity measure of the activity component 304 to determine a concentration of at least one tag (e.g., some or all of the tags 104A-C (FIG. 1) serving as child tags relative to the tag 102 serving as a parent tag for the tags 104A-C). For example, a concentration can be used to provide multi-factor authentication of a user. As another example, a concentration can be used to generate a heat map of a location (e.g., to aid a determination of what type of environment it is).

The activity component 304 can factor in a temporal component in the determination of a proximity measure. In some implementations, one of the rules in the rules repository 302 can define that an alert should be generated if one of the tags 104A-C (FIG. 1) is not present in the group represented by the tag 102. However, if, for example, the tag 104A had been detected as present within the group over an extended period of time and was not detected as undergoing (significant) movement at the time its signal was lost, the activity component 304 can apply a grace period (e.g., on the order of a few or multiple seconds) before generating the alert. For example, this temporal component (e.g., a grace period) can account for the situation where the signal 106A (FIG. 1) from the tag 104A was temporarily blocked and the absence of the signal 106A did not correspond to the tag 104A being missing from the group represented by the tag 102. Also, or instead, another component in the organization module 300 can apply the temporal component to a corresponding determination.

The organization module 300 can take into account contextualized information in determining the activity (e.g., presence, proximity, and/or movement) of any tag, in performing one or more actions in response thereto, or in deciding not to take action. In some implementations, the contextual engine 120 (FIG. 1) or a similar component can serve to contextualize harvested information so that the rules in the rules repository 302 can be applied appropriately.

The tags (e.g., the tag 102 and/or the tags 104A-C in FIG. 1) can be proxies for other devices, users, and/or locations. The rules in the rules repository 302 can reflect such an organization. In some implementations, a rule 316 can reflect one or more of a device 318, a user 320, or a location 322. Moreover, the rule 316 can involve a device-user relationship 324, a user-location relationship 326, and/or a device-location relationship 328. As such, any of a number of relationships can be taken into account when applying the rule(s) in the rules repository 302, and can be reflected in the particular action (or a non-action) taken in response.

The following are examples of information that can be contextualized (e.g., by the contextual engine 120 in FIG. 1) and how the contextual information can be taken into account in applying a rule. Example 1: If the system determines that the weather information includes a forecast of rain, then a processing device (e.g., the user's smartphone or tablet) can issue an alert that the user should not leave the current premises without an umbrella. In some implementations, the system can use the tag coupled to the umbrella (e.g., the tags 102 and/or 104A-C in FIG. 1) to report a current location of the umbrella to the user. For example, the tag coupled to the umbrella can make a predefined output (e.g., a red LED signal, create or play an audio output, etc.).

Example 2

If the system determines, by way of a tag that has been applied to the owner's bicycle, that the bicycle is moving and the current time is 3 a.m. (e.g., a time not conformant with any previously observed use of the bicycle), the system can issue an alert to the user. For example, lights in the storage location (e.g., garage) can be turned on, and/or an alarm can be activated.

Example 3

If the system determines, by way of a tag that has been applied to the owner's dog, that the dog is leaving a predetermined geofence area (e.g., the owner's yard), the system can issue an alert to the user. However, as an intelligent group of tags, if the system also determines, by way of a tag that has been applied to the dog's leash, that the leash is leaving the predetermined geofence area together with the dog, then the system can inhibit alert (e.g., take no action, as it can be inferred that the dog is not escaping but rather is being taken for a walk).

Example 4

If the system determines, from calendar information, that the user is about to embark on a trip, then the system can specify to the user a number of tagged items (e.g., six specific items) that the user brought the last time the user traveled to this location. For example, the tag applied to the respective item can make a predefined output (e.g., a red LED signal).

Example 5

If the system determines, from presence of tags which all belong to some relational group, that the tags are entering or exiting a vicinity (e.g., a user returns home with a processing device, a tag applied to their wallet, a tag applied to their keys, a tag applied to their workbag), a specific activity is occurring (e.g., the user is returning home), a corresponding action can be taken (e.g., the system may ask all tags applied to physical objects within the home to beacon more frequently because the user has returned home).

As such, the contextual engine 120 in FIG. 1 is an example of a contextual engine implemented using a processor (e.g., the processing device 2802 in FIG. 28) executing instructions stored in a memory (e.g., the memory 2804 in FIG. 28), the contextual engine configured to identify an action relating to at least one tag of a plurality of tags (e.g., two or more of the tags 102 and/or 104A-C) based on a proximity measure (e.g., determined by the activity component 304) for the corresponding tag.

The rules 122 in FIG. 1 can be stored in a rules repository accessible to a contextual engine (e.g., to the at least one processor of the contextual engine 120 in FIG. 1), the rules repository having stored therein rules (e.g., the rule 316) regarding respective actions performable by the activity component (e.g., by the at least one processor of the organization module 300), the rules depending on the proximity measure (e.g., determined by the activity component 304) for the at least one of the first plurality of tags, the action identified using the rules.

The contextual engine 120 (FIG. 1) can run in any of multiple environments or contexts. In some implementations, the contextual engine 120 can run in a cloud (e.g., in the cloud 112 in FIG. 1). In some implementations, the contextual engine 120 can run in a processing device (e.g., in the processing device 108 in FIG. 1). The processing device 108 can be a mobile device (e.g., a user's smartphone or a tablet), and/or a substantially stationary device (e.g., a dedicated stand-alone device, which may be considered a hub in the system 100. In some implementations, the contextual engine 120 can run in a tag (e.g., in the tag 102 and/or one of the tags 104A-C in FIG. 1). The contextual engine 120 can operate based on the wireless presence-proximity-movement determination by the activity management module 116, and based on relationships, which can be defined in the rules 122 in FIG. 1, to determine one or more actions. For example, the contextual engine 120 can apply context based on relationships including, but not limited to, permissions (e.g., whether a physical object is allowed to be moving at a particular time), groupings (e.g., whether two or more physical objects are permitted to be proximate to (e.g., to a certain degree of proximity), or separated from, each other), parent-child hierarchies, and/or ownership and/or value of a physical object. Other inputs such as time and/or environmental conditions can be provided to the contextual engine 120.

The contextual engine 120 (FIG. 1) can include, or make use of, a component that makes use of artificial intelligence, machine learning, and/or predictive algorithms. This can allow the contextual engine 120 to observe behavior or other occurrences and adapt its behavior (or that of another component) accordingly. In some implementations, the learning can have a temporal component. For example, the contextual engine 120 can observe that a tag and/or its child tags usually are subject to substantial motion at a particular time of day (e.g., 7.30-8.00 a.m.). To avoid glitches in the way that personal belongings are monitored or managed, the contextual engine 120 can allow for more notifications at the observed time so as to provide more intensive coverage. As another example, the contextual engine 120 can reduce the amount of notifications so as to avoid false or redundant alerts.

FIGS. 4A-G schematically show examples in a physical area 400 and a logical area 402 relating to forming a group. The examples described with reference to the physical area 400 and/or the logical area 402 can be used with one or more other examples described elsewhere herein. In short, the physical area 400 here includes a container 404, physical objects 406A-D, and tags 408A-E.

The examples described with reference to the physical area 400 and/or the logical area 402 can relate to contextual notifications. For example, this can be based on a system having or developing an understanding of the relationships between two or more of the container 404, the physical objects 406A-D, and/or the owner or user of one or more of the foregoing. The examples described with reference to the physical area 400 and/or the logical area 402 can relate to actionable alerts. For example, this can allow a system to take immediate action if something goes wrong relating to a physical object. The examples described with reference to the physical area 400 and/or the logical area 402 can relate to smart rules and reminders. For example, this can allow a person to use a system to personalize his or her experience for one or more specific needs.

Here, some of the tags 408A-E, such as, but not limited to, the tags 408B-E, can be configured to be assigned, as child tags, to one or more other tags of the tags 408A-E, such as, but not limited to, the tag 408A. In some implementations, the tag 408A can be placed in a group mode to enable such assignments. The assignments can be made by way of hardware interactions (e.g., as described in the following) or by interactions with a processing device (e.g., the processing device 108 in FIG. 1). The tag 408A can then report (e.g., to a device elsewhere in the system) what items are within the proximity of the tag 408A (e.g., near the tag 408A, according to some proximity measure). This can allow the tag 408A to monitor the whereabouts of its child tags, and to bring the awareness thereof to one or more other devices in the system. Rules can be set so that a user receives an alarm, alert, or notification if an item is missing. In some implementations, a backpack having a tag can be reported with a status of being safe when contained in a vehicle that has a tag (or that is considered to be an IoT device that serves as a tag). For example, the vehicle may not have been designed as a parent tag of the backpack, but a rule may define the backpack's status as being safe when it is determined to be in proximity to the tag associated with the vehicle. Furthermore, in such an example, the vehicle may serve as a passive group in tracking any contents that have a tag entering or exiting the vehicle. For example, at 7 AM, a user brings five items that have tags into the vehicle (e.g., wallet, backpack, sunglasses, laptop, keys). The system may record that these five items have left the home and entered the vehicle for the user to use during the day. At 5 PM, the user returns to the vehicle to return home. If one or more of the items are not detected by the vehicle, (e.g., the laptop), the system can make a determination that these item(s) are missing and trigger a response (e.g., notify the user that they are about to return home without one of the items they left with in the morning).

In some implementations, tags can self-regulate activities. This can be done as a complement to, or in absence of, external input (e.g., by user, processing device, or hardware/software interaction), to name just two examples. A determination may be coordinated between the tags by a collective intelligence between the tags. In some implementations, a determination by such an intelligence could be based on following example parameters: Example 1. Self-promotion of one or more tags to the parent configuration based on which tag's or tags' physical location is optimal for connectivity for the purpose of reporting status of the system to a processing device, cloud, or other entity. Example 2: Self-promotion of one or more tags to the parent configuration based on which tag(s) has the greatest remaining battery to continue performing related tasks on behalf of the group or system. Example 3: Self-promotion of one or more tags to the parent configuration based on which tag(s) have the most available resources such as processing or storage capability to continue performing related tasks on behalf of the group or system. Other approaches can be used.

In some implementations, the role of the tag 408A can include one or more of the following: The tag 408A can monitor the child tags (e.g., 408B-E) that have been assigned to it; the tag 408A can manage the reporting on the child tags to improve communication cadence and power conservation; the tag 408A can report the presence or absence of the child tag(s) within its wireless range; and/or whereas a processing device can identify the location of the group corresponding to the tag 408A, the tag 408A can be responsible for identifying the contents of the group. One or more exceptions to the reporting order can be made where a child tag can communicate directly with another device, including, but not limited to, that the child tag's message that it is running low on power, or that the child tag is unable to detect and report into a parent tag, can be recognized by a processing device.

Communications between two or more of the tags 408A-E may be done by way of wireless signals. In some implementations, Bluetooth, BLE, Zigbee, Wi-Fi, NFC, LoRa, UWB, RFID, NB and/or LTE communication can be used for signaling between the tag 408A and a processing device (e.g., a smartphone). In some implementations, Bluetooth, Zigbee, Wi-Fi, and/or LTE communication can be used for signaling between two or more of the tags 408A-E. For example, the tag 408A may have a rechargeable battery, whereas the tags 408B-E may have non-rechargeable batteries. In other examples, the tag 408A can be powered by a constantly replenishing power source (e.g., AC power), whereas the tags 408B-E can be powered by a depleting power source (e.g., a battery). In other examples, the tag 408A may have greater capabilities (e.g., greater available memory, greater storage, greater processing capabilities, larger battery, more powerful antenna, etc.), whereas the tags 408B-E can have constraints or limitations on such capabilities. A rechargeable battery may allow the tag 408A to be used for a significant amount of communications (e.g., to the processing device) and data processing when compared to tags 408B-E which, in this example, have non-rechargeable batteries. As another example, the tag 408A having the rechargeable battery may be used to consolidate communication from the tags 408B-E having non-rechargeable batteries to the processing device. This approach can allow the number of connections to the processing device to be kept to a relatively smaller number, because there may be substantially more of the tags 408B-E than of the tag 408A.

In one example, a user may obtain a kit including at least the tags 408A-E and seeks to set up tag monitoring for the physical objects 406A-D with regard to the container 404. In another example, a user obtains tags 408A-E individually and seeks to set up tag monitoring for the physical objects 406A-D with regard to the container 404. For example, the container 404 can be a hockey bag (e.g., a large bag of a flexible material intended to carry equipment used by a hockey player during play or in connection therewith). The container is here schematically shown as a circle but can have any shape, size, and/or volume. As another example, the physical object 406A can be a left skate, the physical object 406B can be a right skate, the physical object 406C can be a mouthguard case, and the physical object 406D can be a water bottle. As such, in this example the tag 408A may be coupled to the hockey bag, the tag 408B may be coupled to the left skate, the tag 408C may be coupled to the right skate, the tag 408D may be coupled to the mouthguard case, and the tag 408E may be coupled to the water bottle. The hockey bag can contain more items in a practical situations but the physical objects 406A-D are being mentioned here for illustrative purposes. The user may have obtained more tags than the tags 408A-E, and/or other devices, but the tags 408A-E are being mentioned here for illustrative purposes.

Figure 5E:
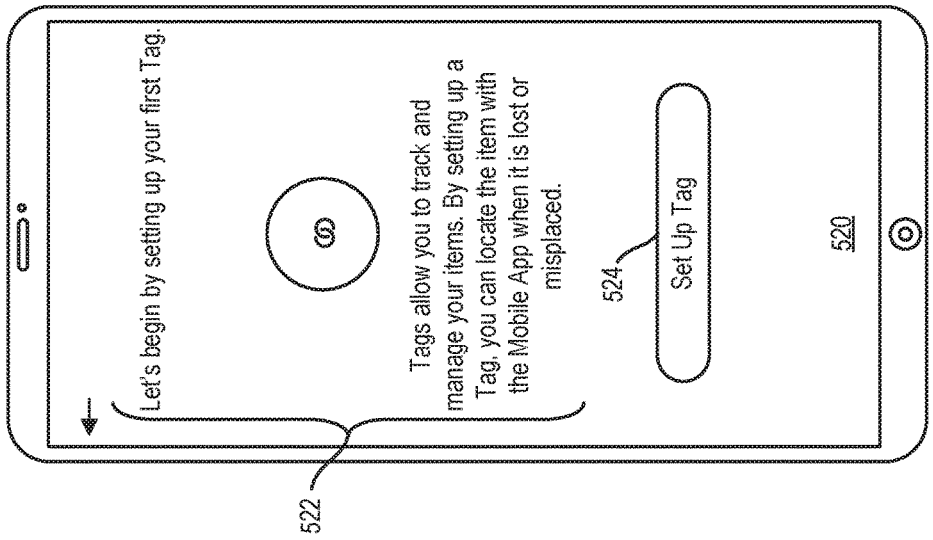
FIGS. 5A-Z show examples of a user interface that can be used in forming a group.

FIGS. 5A-Z show examples of a user interface 500 that can be used in forming a group. Some examples will now be described with reference to FIGS. 4A-G and/or FIGS. 5A-Z. The user interface 500 can be used with one or more other examples described elsewhere herein. The user interface 500 can be a graphical user interface generated on, for example, a processing device 502 (e.g., the processing device 108 in FIG. 1). The processing device 502 is omitted in a remainder of the FIGS. 5A-Z for simplicity. Two or more of the examples shown in FIGS. 5A-Z can occur in a different order than shown in the present illustration.

The user interface 500 can provide a control 504 to select the package manually. In some implementations, this can allow the user to rely on a predefined configuration that may have been associated with the processing device by an electronic communication (e.g., an email message to the user). For example, the electronic communication can contain an identifier for the package based on a previous transaction. The user interface 500 can provide a control 506 to scan a code on the package. For example, this can be used when the user wishes to choose one of multiple packages to set up.

In response to the user activating the control 506, the user interface 500 can provide (FIG. 5B) a communication 508 (e.g., a modal dialog box) that requests permission to use an input device on the processing device 502. For example, the I/O interface 2836 (FIG. 28) can provide a camera.

Figure 5D:
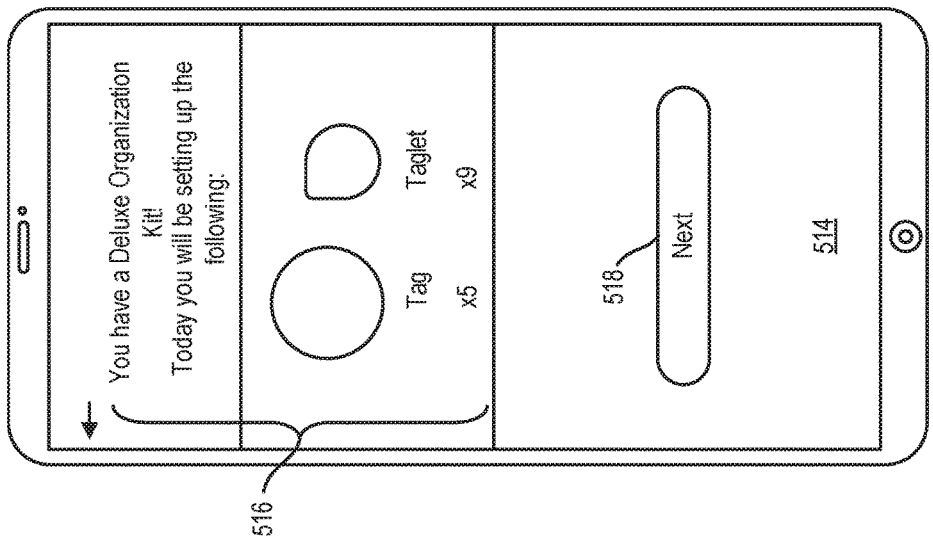

In response to the user authorizing use of the input device, the user interface 500 can provide (FIG. 5C) a scan view 510 of a code 512 on the package containing (at least) the tags 408A-E. Detection of the code 512 can allow the processing device 502 to obtain (e.g., from a server) information about the package that was scanned. Here, the user interface 500 provides (FIG. 5D) an identification view 514 that presents information 516 about the package. For example, the information 516 can include a name and/or description of contents regarding the package. A control 518 can be used to proceed.

In response to the user activating the control 518, the user interface 500 can provide (FIG. 5E) a tag setup initialization view 520. For example, the tag setup initialization view 520 can present information 522 about a tag (e.g., a description of what a tag is and/or does). A control 524 can be used to initialize tag setup. In this example, the tag 408A will be the tag first set up (e.g., as a parent tag) and the tags 408B-E will thereafter be set up (e.g., as child tags).

In response to the user activating the control 524, the user interface 500 can provide (FIG. 5F) a tag naming view 526. For example, the tag naming view 526 includes a text entry control 528 where the user can enter a name 530 for the tag. In this example, the name 530 is "Hockey Bag." The tag naming view 526 can include a control 532 for the user to confirm the tag name.

In response to the user activating the control 532, the system can define, in the logical area 402, a parent tag 410 that corresponds to the tag 408A. The parent tag 410 will here be used for illustrating relationships and other non-tangible circumstances regarding the tag 408A. Also in response to the user activating the control 532, the user interface 500 can provide (FIG. 5G) a group creation view 534. For example, the group creation view 534 can include information 536 regarding child tags or groups. A control 538 can be used to create at least one group.

In response to the user activating the control 538, the system can set, in the logical area 402, the parent tag 410 to a group mode. For example, the parent tag 410 may previously have been in a non-group mode where no other tags are to be assigned to the parent tag 410. Also in response to the user activating the control 538, the user interface 500 can provide (FIG. 5H) a child-tag naming view 540. For example, the child-tag naming view 540 includes a text entry control 542 where the user can enter a name 544 for the child tag. In this example, the name 544 is "Skate (L)," meaning the left skate of a pair of skates. The child-tag naming view 540 can include a control 546 for the user to confirm the child tag(s) if the user is done with child-tag definition. On the other hand, a control 548 can allow the user to add one or more other child tags.

In response to the user activating the control 548, the user interface 500 can provide (FIG. 5I) the child-tag naming view 540 including a text entry control 550 where the user can enter a name 552 for the child tag. In this example, the name 544 is "Skate (R)," meaning the right skate of a pair of skates. The user can continue by activating the control 548 to add one or more other child tags, and enter a name for each one. In response to the user so doing, the user interface 500 can provide (FIG. 5J) the child-tag naming view 540 with the entered name(s). The control 546 can be used for confirming the entered name(s) for the child tag(s).

In response to the user activating the control 546, the user interface 500 can provide (FIG. 5K) a child-tag confirmation view 554 including a control 556 for confirming the child tag(s) that the user has defined. The child-tag confirmation view 554 can identify the defined child tag(s) by name.

In response to the user activating the control 556, the system can define, in the logical area 402, child tags 412A-D that correspond to the tags 408B-E, respectively. The child tags 412A-D will here be used for illustrating relationships and other non-tangible circumstances regarding the tags 408B-E. Also in response to the user activating the control 556, the user interface 500 can provide (FIG. 5L) an instruction view 558. The instruction view 558 can include information 560 instructing the user to obtain (e.g., unpack) the tags 408B-E. A control 562 can be used to proceed.

In response to the user activating the control 562, the user interface 500 can provide (FIG. 5M) an instruction view 564. The instruction view 564 can include information 566 instructing the user to attach the tags 408B-E to the physical objects 406A-D, respectively. In some implementations, the tags 408B-E are designated as child tags, and the user can therefore select any of the tags 408B-E in response to the instruction view 564. In some implementations, any of the tags 408A-E can be configured to serve as a child tag, so the user can select any of the tags 408A-E in response to the instruction view 564. FIG. 4B shows the physical area 400 after the attachment, where the tag 408B is coupled to the physical object 406A, the tag 408C is coupled to the physical object 406B, the tag 408D is coupled to the physical object 406C, and the tag 408E is coupled to the physical object 406D. A tag can be attached using one or more mechanisms, including, but not limited to, adhesive, static cling, magnetic force, a fastener, and/or a dedicated holder for the tag that has a separate attachment mechanism (e.g., a carabiner). A control 568 can be used to proceed. In some implementations, the instruction view 564 (e.g., prompting the user to attach the tags 408B-E to the physical objects 406A-D) can occur at a different time within a process of forming a group. For example, the user may be instructed to attach the tag(s) to the respective physical object(s) before naming the tags (e.g., before using the child-tag naming view 540 in FIGS. 5H-J).

In response to the user activating the control 568, the user interface 500 can provide (FIG. 5N) a pairing initiation view 570. The pairing initiation view 570 can request the user to authorize use of wireless communications with the tags 408A-E. For example, Bluetooth, BLE, Zigbee, Wi-Fi, and/or LTE can be used, to name just some wireless technologies. A control 572 can be used to proceed.

In response to the user activating the control 572, the user interface 500 can provide (FIG. 5O) a communication 574 (e.g., a modal dialog box) that requests permission to use the processing device 502 for wireless communication. For example, the network interface 2842 (FIG. 28) can provide a wireless interface (e.g., including a transmitter, receiver, and/or a transceiver) for one or more wireless protocols.

In response to the user authorizing use of wireless communication, the user interface 500 can provide (FIG. 5P) an instruction view 576. The instruction view 576 can include information 578 instructing the user to pick up any tag and double press to activate the tag. In some implementations, a response from the tag may serve to confirm such user interactions (e.g., an LED turns on, a sound is played, the tag vibrates, etc.) In some implementations, the tag 408A is designated as a parent tag, and the user can therefore select the tag 408A in response to the instruction view 576. In some implementations, any of the tags 408A-E can be configured to serve as a parent tag, so the user can select any of the tags 408A-E in response to the instruction view 576.

The user can make an input using the tactile switch 216 (FIG. 2) on the selected tag. In some implementations, the user double presses the tactile switch 216 on the tag 408A to activate that tag. In some implementations, a response from the tag may serve to confirm such user interactions (e.g., an LED turns on, a sound is played, the tag vibrates, etc.) FIG. 4C schematically shows the tag 408A as having been activated. The parent tag 410 is now represented by a parent tag 410' to indicate that the parent tag 410' corresponds to a physical tag (here, the tag 408A). For example, the tag 408A can use wireless signal 110 (FIG. 1) to indicate to the processing device 502 (e.g., the processing device 108 in FIG. 1) that the tag 408A has been activated.

In response to activation of the tag 408A, the user interface 500 can provide (FIG. 5Q) an information view 580 confirming that the tag 408A corresponds to the first tag that the user defined (i.e., in FIG. 5F). A control 582 can be used to proceed.

In response to activation of the control 582, the user interface 500 can provide (FIG. 5R) an instruction view 583.

The instruction view 583 can include information 584 instructing the user to double press on the tag 408B that has been attached to the physical object 406A. In some implementations, a response from the tag may serve to confirm such user interactions (e.g., an LED turns on, a sound is played, the tag vibrates, etc.) The user can be told the description of the physical object 406 A (here: "Skate (L)") to facilitate that the user will activate the correct child tag.

The user can make an input using the tactile switch 216 (FIG. 2) on the selected child tag. In some implementations, the user double presses the tactile switch 216 on the tag 408B to activate that tag. FIG. 4C schematically shows the tag 408B as having been activated. The child tag 412A is now represented by a child tag 412A' to indicate that the child tag 412A' corresponds to a physical tag (here, the tag 408B). For example, the tag 408B can send one of the wireless signals 106A-C (FIG. 1) in response to being activated (e.g., a beacon signal).

In response to activation of the tag 408B, the user interface 500 can provide (FIG. 5S) an instruction view 586 for initiation of a pairing process. The instruction view 586 can include an information 588 instructing the user to press and hold on the tag 408A and place the tag 408A near (e.g., in the immediate vicinity of, or touching) the tag 408B. FIG. 4D shows the user placing the tag 408A near the tag 408B (e.g., by tapping the tags 408A and 408B together, or by bringing them within a few inches of each other).

The proximity between the tag 408A (currently having its button pressed) and the tag 408B (which had been activated) can initiate the pairing process between the parent tag 410' and the child tag 412A'. In some implementations, the organization module 300 (FIG. 3) can determine a proximity measure based on one of the wireless signals 110A-C (FIG. 1). For example, the activity component 304 (FIG. 3) can define a proximity measure indicating that the tags 408A and 408B are near each other (e.g., touching or almost touching). In some implementations, a response from the tag may serve to confirm such user interactions (e.g., an LED turns on, a sound is played, the tag vibrates, etc.)

As schematically shown in FIG. 4D, the pairing process can define a relationship 414A between the parent tag 410' and the child tag 412A'. The relationship 414A involves the tag 408B being assigned to the tag 408A as a child tag. In response to the relationship 414A being defined, the user interface 500 can provide (FIG. 5T) a confirmation view 590. The confirmation view 590 can indicate to the user that the tag 408B has been assigned to the tag 408A as a child tag. In some implementations, a response from the tag may serve to confirm such user interactions (e.g., an LED turns on, a sound is played, the tag vibrates, etc.) A control 592 can be used to proceed.

In response to activation of the control 592, the user interface 500 can sequentially provide the instruction view 583 (FIG. 5R) for each of the tags 408C-E. The information 584 can then instruct the user to double press on the corresponding tag 408C-E that has been attached to the respective physical object 406B-D, respectively. In each instance, the user can be told the description of the respective physical object 406 B-D (e.g., "Skate (R)," "Mouthguard Case," "Water Bottle," etc.) to facilitate that the user will activate the correct child tags. In some implementations, a response from the tag may serve to confirm such user interactions (e.g., an LED turns on, a sound is played, the tag vibrates, etc.) FIG. 4E schematically shows how also the tags 408C-E have been activated.

In response to activation of each of the respective tag 408C-E, the user interface 500 can provide the corresponding instruction view 586 (FIG. 5S) for initiation of the pairing process with the initiated child tag in a similar way as described above. For example, the pairing process can involve the user pressing and holding on the tag 408A and bringing the tag 408A into (almost) contact with the respective one of the tags 408C-E. As schematically shown in FIG. 4E, the pairing process can define a relationship 414B between the parent tag 410' and the child tag 412C'; the pairing process can define a relationship 414C between the parent tag 410' and the child tag 412D'; and the pairing process can define a relationship 414D between the parent tag 410' and the child tag 412W'. Each of the relationships 414B-D involves the corresponding tag 408C-E being assigned to the tag 408A as a child tag.

In response to all the child tags that were named in the child-tag confirmation view 554 (FIG. 5K)—that is, the tags 408B-E—having been paired with the tag 408A, the user interface 500 can provide (FIG. 5U) a confirmation view 594. The confirmation view 594 can name the child tags using the identifiers provided by the user. A control 596 can be used to proceed.

In response to activation of the control 596, the user interface 500 can provide (FIG. 5V) an instruction view 598 that can instruct the user to attach the tag 408A to the container 404. In some implementations, this operation can be saved until all child tags have been paired so that the tag 408A can be moved freely during the pairing process (e.g., held in the user's hand). The instruction view 598 can indicate available ways of coupling the tag 408A to the container 404, including, but not limited to, by a keyring loop and a lanyard, and/or by adhesive attachment. FIG. 4E schematically shows the tag 408A having been coupled to the container 404. In the logical area 402, the coupling of the tag 408A to the container 404 can correspond to a proximity limit 416 being established for the parent tag 410'. In some implementations, the organization module 300 (FIG. 3) can define the proximity limit 416. At this point, the proximity limit 416 may not yet be calibrated relative to the container 404. A control 5000 in the instruction view 598 can be used to proceed.

In response to activation of the control 5000, the user interface 500 can provide (FIG. 5W) an instruction view 5002. The instruction view 5002 can relate to proximity calibration. In some implementations, the instruction view 5002 can instruct the user to place the physical objects 406A-D inside the container 404. FIG. 4F shows the physical objects 406A-D having been placed in the container 404. For example, this can involve fitting a pair of skates, a mouthguard case, and a water bottle inside a hockey bag. In the logical area 402, this placement can involve the corresponding child tags 412A'-D' maintaining their respective relationships 414A-D with the parent tag 410'.

The activity component 304 (FIG. 3) can define respective proximity measures for the child tags 412A'-D', based on the wireless signals 110A-C (FIG. 1), to indicate the proximity of each such child tag 412A'-D' to the parent tag 410'. Here, the child tags 412A' and 412B' are deemed to be within the proximity limit 416 according to the proximity measures, and the child tags 412C' and 412D' are deemed to be outside the proximity limit 416 according to the proximity measures. As such, using the proximity limit 416 as shown in FIG. 4F, the child tags 412C' and 412D' may currently be considered to not be present within the group defined by the parent tag 410'. The value(s) defining the proximity measure(s) can be stored at the activity component 304, or at the parent tag 410', or both, to name just some examples. The value(s) defining the proximity limit 416 can be stored at the activity component 304, or at the parent tag 410', or both, to name just some examples. A control 5006 in the instruction view 5002 can be used to proceed.

The following examples relate to proximity measures. In some implementations, a proximity limit can be defined based on a baseline of an average of proximity measure values recorded over a predefined time. For example, boxcar averaging can be used. A proximity limit can be updated at the request of the parent tag 410' or the activity component 304, to name just two examples. In some implementations, a proximity measure can be determined based on an average of one or more of RSSI, C, L, PER, PL, ΔRSSI, ΔC, ΔL, ΔPER, or ΔPL, recorded over a predefined time. For example, boxcar averaging can be used. In some implementations, a proximity limit can correspond to an RSSI of 20 decibel (dB). For example, a child tag for which the proximity measure corresponds to an RSSI of 25 dB may be deemed to be within the proximity limit. As another example, a child tag for which the proximity measure corresponds to an RSSI of 18 dB may be deemed to not be within the proximity limit. One or more state variables (e.g., on the parent tag 410' or the activity component 304, or both) can store information reflecting the status of child tags (e.g., the child tags 412A'-D').

In response to activation of the control 5006, the user interface 500 can provide (FIG. 5X) a calibration initiation view 5008. The calibration initiation view 5008 can include a control 5010 to initiate the calibration.

In response to activation of the control 5010, proximity calibration can be performed. Proximity calibration can be performed to determine and/or define when a child tag should be deemed to be proximate to (e.g., within) a group, or when the child tag should be deemed to not be proximate to (e.g., outside) the group. In some implementations, not being proximate/within the group can be considered as being "lost," and this awareness can be held by the lost tag itself, the corresponding parent tag, the processing device, and/or other components in the system.

In some implementations, the calibration can alter the proximity limit 416 in one or more ways. For example, at least one parameter of the proximity limit 416 can be altered. FIG. 4G schematically shows that the proximity limit 416 is replaced by a proximity limit 416' that encompasses all of the child tags 412A'-D'. That is, the child tags 412C' and 412D' may now also be considered to be present within the group defined by the parent tag 410' based on the proximity limit 416'. The parent tag 410' (or another component in the system) can notify the processing device 502 that all of the child tags 412A'-D' are currently deemed to be within the proximity limit 416'.

In response to such notification, the calibration can be deemed to be successful, and the user interface 500 can provide (FIG. 5Y) an instruction view 5012. The instruction view 5012 can instruct the user to test the container 404. A control 5014 can be used to proceed. A control 5016 can be used to re-calibrate the group relating to the parent tag 410'. This can allow user-driven recalibration. For example, upon the parent tag 410' detecting a difference in the wireless signals 106A-C over time (which may be an indication that the container 404 is also holding additional items that may not have been present at the previous calibration, the system (e.g., by the processing device 108 in FIG. 1) can prompt whether the user wishes to re-calibrate. In some implementations, periodic calibration can also or instead be performed.

In some implementations, calibration may be requested by the system (e.g., set up or a standard periodic calibration), by the user (manual calibration), or by one or more tags themselves (e.g., driven by one or more sensors and/or one or more activities). In some implementations, calibration may occur outside of the example set up sequence. For example, the tag 408A can request a calibration process of the group at any time or according to an event (e.g., a calendar event requiring the group of items to be ready), a sensor data detection (e.g., when motion is detected by one or more tags or a temperature change is detected), at specific intervals (e.g. at 8 AM every day), upon presence or activity detected by the system via another tag, a processing device, or cloud (e.g., the user returns home, or the user approaches the group), etc.

In response to activation of the control 5014, the user interface 500 can provide (FIG. 5Z) a confirmation view 5018. The confirmation view 5018 can include a control 5020 to continue setting up any additional tags, parent tags, and/or child tags, that the user may have obtained. Such setup can be done is a similar way as described above. The confirmation view 5018 can include a control 5022 to not set up any more tags at the moment.

Any of the child tags 412A'-D' that becomes separated from the group of the parent tag 410' can send a beacon signal. In some implementations, the child tag 412A'-D' can periodically send a beacon signal (e.g., with an interval on the order of multiple seconds, minutes, or hours). The parent tag 410' can do scans (including, but not limited to, BLE scans) to look for signals (including, but not limited to, Bluetooth beacon signals) identifying child tags. In some implementations, the parent tag 410' can sense for missing group items periodically, upon the parent tag moving (e.g., based on the accelerometer 212 in FIG. 2), based on location (e.g., to enable and/or disable scans based on location), and/or as triggered by a user (e.g., by pressing a tag button or using a processing device). The separated tag can change its behavior in one or more ways in response to becoming separated. In some implementations, the tag can enter into a power conservation mode. For example, the separated tag can beacon more or less frequently.

Any tag (e.g., the tags 408A-E) can be capable of self-identification to a third-party device using the wireless signals 106A-C (FIG. 1). In some implementations, this can allow a lost child tag to indicate its lost status to devices that it senses nearby. For example, if a wallet is dropped on the ground in an outdoors area, the child tag of the wallet can send (e.g., transmit as a broadcast or unicast) an "I am lost" message that can be received by another wireless device. The "I am lost" message from the child tag can provide the user of the third-party device a set of information applicable to that state (e.g., "I am lost"), for example, one or more of the following: information that a reward may be available, instructions (e.g., a hyperlink included in the message) that the user can follow to report the "lost" device, a "snapshot" of current conditions (e.g., location data, motion data, environmental data, objects nearby data, battery level, etc.), a profile of the tag (e.g., owner contact information). Such information may be, to varying degrees, publicly viewable and/or protected via encryption. In some implementations, "bounty hotspots" can be set up at public locations (e.g., at locations of a chain restaurant or coffee shop) where found physical objects can be dropped off given that their tags are signaling a lost status. For example, a child tag detecting that it is lost from its parent tag can provide one or more of the above-exemplified types of information to the processing device (e.g., a smartphone or wearable device) of the person who finds the physical object to which the child tag is coupled. To protect privacy of the owner of the physical object as well as the finder, the location of the physical object can be reported to the owner only when the bounty hotspot detects the presence of the child tag. For example, the owner can then be notified that the physical object is available at the location, or a service for shipping the physical object to the owner can be offered. As another example, upon the physical object being deposited at the bounty hotspot, the finder can be notified that the reward is available to be collected. As another example, the child tag which has been separated from its parent tag can send an audio signal (e.g., using the speaker 220 in FIG. 2) upon detecting the finder's device. In some implementations, the parent tag 410' may not perform scheduled scans when each of the child tags 412A'-D' is proximate to the group. For example, only scanning based on movement may then be performed.

Scanning may occur in a group system for tags within the group to maintain an accurate understanding of presence of tags or occurring activities. In some implementations, it is important for a tag or group of tags to update their understanding of a situation when a meaningful change is detected by one or more tags. For example: scanning based on movement can vary between respective tag groups where a group can be classified as either a fixed group or a mobile group, to name just two examples. In some implementations, this classification can in part depend on the type of container to which a parent tag is coupled. For example, a drawer or a locker or a dedicated stand-alone device such as a hub (e.g., the processing device 108 in FIG. 1) can be considered a fixed group, in that it is unlikely that a user will relocate the group to another place. As another example, a bag (e.g., a purse, suitcase, and/or gym bag) can be considered a mobile group. In some implementations, a fixed group can scan for the presence of nearby tags or devices every time a closure (e.g., a door, lid, and/or drawer) is opened or closed. "Open/Close" movement may be detected, for example, by movement detected on the parent and/or child tags. The parent tag may determine open/close movement based on its own movement detection. Messages from the one or more child tags may confirm that movement is happening to the whole group and not just the parent tag. A time filter can be applied for a predetermined time (e.g., on the order of seconds). A timer can restart upon opening/closing, and when the timer expires, a scan can be made. In some implementations, a delayed scan (e.g., as described for the fixed group) can be used. As another example, the container may be scanned only when it is being moved from one location to another. For example, when the container has been constantly moving for at least a predetermined time, a scan can be made. For example, the accelerometer 212 in FIG. 2 can be read at regular intervals during a predetermined time. A filter can be applied during ongoing movement to account for situations when the container comes to rest for a short period of time. If the container moves before a timer expires then the movement can be considered to be part of the previous move.

A system of tag with at least one processing device (e.g., the system 100 in FIG. 1) can adapt its behavior based on observations of past behavior, or other observations. In some implementations, the cloud 112 (FIG. 1) can monitor multiple containers labeled with tags (e.g., multiple instances of the container 404 in FIGS. 4A-G having the tags 408A-E). For example, this can correspond to multiple gym bags used by one or more people, each gym bag having a corresponding instance of the tag 408A, and the same or a different number of instances of tags corresponding to the tags 408B-E. Over time, the system can observe that some tag systems generate too many or not enough alerts about physical objects being missing. For example, if a user often dismisses alerts of this type this may be an indication that too many alerts are being generated. As another example, if user-initiated calibrations are initiated, this may be an indication that the settings are not optimal and that the user believes the system should have alerted when it did not. Based on evaluating such observed behaviors, the system (e.g., the activity management module 116 in FIG. 1 or the organization module 300 in FIG. 3) can change the settings for at least one group of tags. For example, settings that have proven to be more successful can be applied to a group of tags whose settings may have proven less successful. Over time, a system can also observe how secondary and additional users interact with such systems to make recommendations. For example, over time the system may observe: the number of physical objects users typically group within a type of container (e.g., gym bag, work bag, sports bag, toolbox), what typical items are carried inside such containers (e.g., water bottle, sunscreen, hand tools, etc.), how they are typically used (e.g., based on time of day, fixed or mobile, type of data collected by sensors, etc.) to both adjust their internal acceptable behavior parameters, or aid the user in setup (e.g., recommended kit to purchase), recommending objects to add to their container (e.g., "other users also bring a water bottle, would you like to include one?", or adjust its period of scanning or its calibration.

Figure 6B:
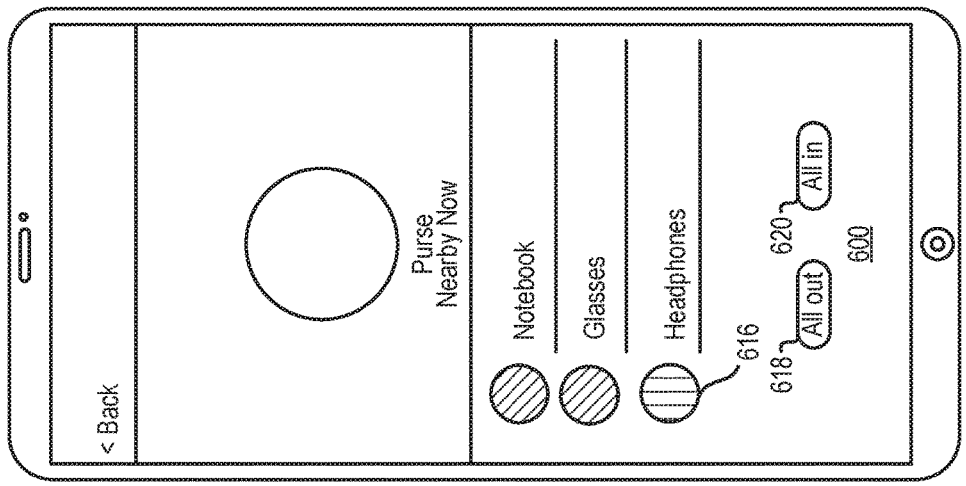
FIGS. 6A-B show examples of a user interface that can indicate presence or proximity to a group.
Figure 6A:
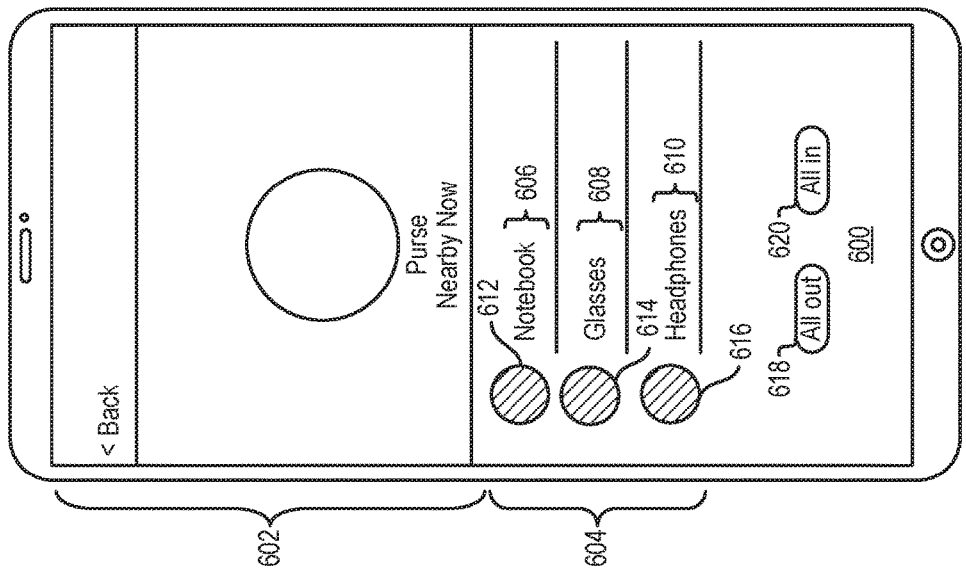

FIGS. 6A-B show examples of a user interface 600 that can indicate presence or proximity to a group. The user interface 600 can be used with one or more other examples described elsewhere herein. The user interface 600 can be implemented using one or more examples described with reference to FIG. 28.

The user interface 600 can include an information area 602 that identifies a parent tag of the group. For example, the parent tag can be identified using a name entered using the text entry control 528 (FIG. 5F). Here, the information area 602 indicates that the group corresponds to a purse.

Figure 5J:
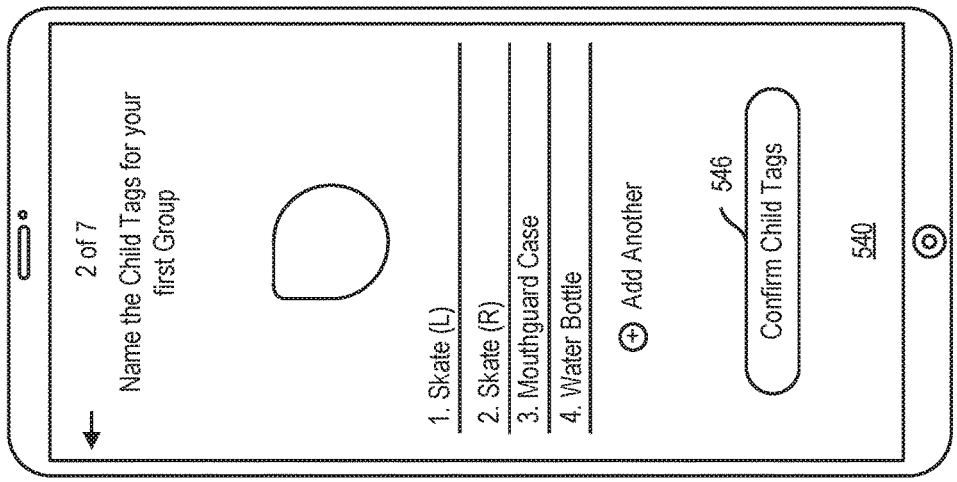
Figure 5I:
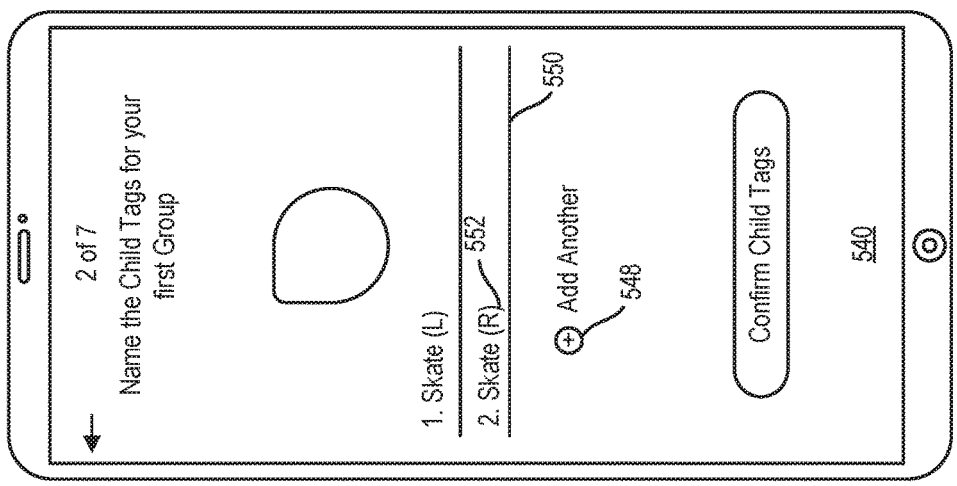
Figure 5O:
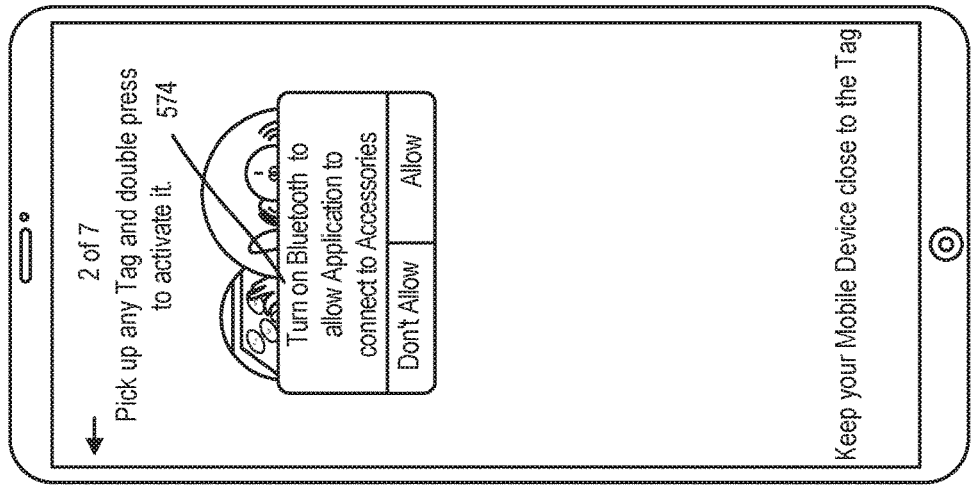
Figure 5N:
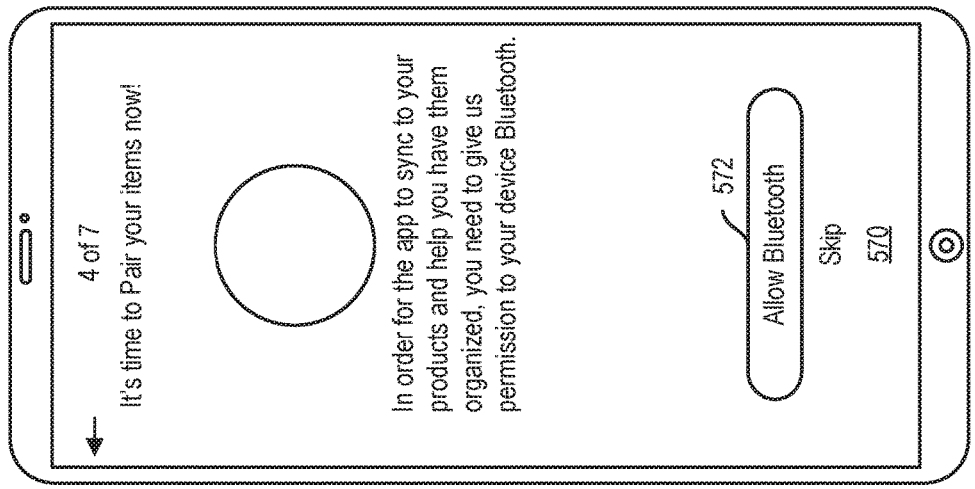

The user interface 600 can include a status area 604 that identifies a status of one or more child tags of the parent tag identified in the information area 602. For example, the child tags can be those defined using the text entry control 542 (FIGS. 5H-J). Here, the status area 604 includes at least item areas 606, 608, and 610 indicating that a notebook, glasses, and headphones have been paired with the parent tag corresponding to the purse. Accordingly, the group represented by the user interface 600 may have been created to track a purse containing at least a notebook, glasses, and headphones. Other items can be paired with the purse.

The status area 604 includes status indicators 612, 614, and 616 for the item areas 606, 608, and 610, respectively. The status indicators 612-616 indicate a status for the physical object represented by the respective item area 606-610. The status indicators 612-616 can be updated between two or more states in real time. Here, the status indicators 612-616 all have the same status, schematically indicated by diagonal lines. The diagonal lines can represent the color green. In some implementations, the color green can indicate that the physical object labeled with the child tag corresponding to the respective item area 606-610 is considered to be present in the group. For example, this can correspond to the physical object being deemed to be inside the purse. The status shown in the user interface 600 in FIG. 6A can appear when the notebook, glasses, and headphones are inside the purse, and are recognized to be so by the parent tag.

Assume that a user removes the headphones from the purse. The parent tag can recognize, based on a proximity measure, that the child tag of the headphones is no longer deemed to be within a proximity limit applicable to the group. The child tag can recognize that it is no longer within the proximity limit. The parent tag can generate a notification (e.g., a notification message transmitted over the wireless or wired interface, such as to the processing device 108 in FIG. 1) indicating that the child tag coupled to the headphones is no longer proximate to the group. Based on such notification (e.g., receiving the notification message over the wireless or wired interface), the user interface 600 can be updated as shown in FIG. 6B. Here, the status indicator 616 has changed to vertical lines. The vertical lines can represent the color red. In some implementations, the color red can correspond to the headphones being deemed to be outside the purse. The status shown in the user interface 600 in FIG. 6B can appear when the notebook and glasses are deemed to be inside the purse, and the headphones are deemed to be outside the purse, and this is recognized by the parent tag, for example as discussed above. If the headphones were placed inside the purse, the user interface 600 could assume the appearance as shown in FIG. 6A.

In some implementations, a user can make an input to trigger a new calibration or to adjust (e.g., override) an existing calibration. In this example, the user interface 600 includes a control 618 labeled "all out" which may be used to trigger the system to redo or adjust its calibration to reflect that all of the listed physical objects are currently outside the group. For example, actuating the control 618 in the situation shown in FIG. 6A may cause each of the status indicators 612, 614, and 616 to change to indicate that the corresponding object is outside the container (e.g., the notebook, glasses, and headphones would then all be labeled as not being within the purse, in this example). One or more calibration parameters may then be updated, based on one or more current proximity measures, so that the system recognizes all of the physical objects as not being within the group. In this example, the user interface 600 also includes a control 620 labeled "all in" which may be used to trigger the system to redo or adjust its calibration to reflect that all of the listed physical objects are currently within the group. For example, actuating the control 620 in the situation shown in FIG. 6B may cause the status indicator 616 to change to indicate that the corresponding object (headphones) is inside the container (e.g., the notebook, glasses, and headphones would then all be labeled as being within the purse, in this example). One or more calibration parameters may then be updated, based on one or more current proximity measures, so that the system recognizes all of the physical objects as being within the group.

FIGS. 7A-D show examples of a user interface 700 that can be used for calibrating one or more tags of a group. The user interface 700 can include an information area 702, a status area 704, item areas 706, 708, and 710, and status indicators 712, 714, and 716. For example, some or all of the information area 702, the status area 704, the item areas 706, 708, and 710, or the status indicators 712, 714, and 716 can perform the same or a similar function as corresponding features in the user interface 600 (FIGS. 6A-B).

The user interface can include a control 718 and a control 720. The control 718 can include a slider 722 adjustable along a track 724. The control 720 can include a slider 726 adjustable along a track 728. The sliders 722 and 726 will control parameters related to calibration.

Figure 7B:
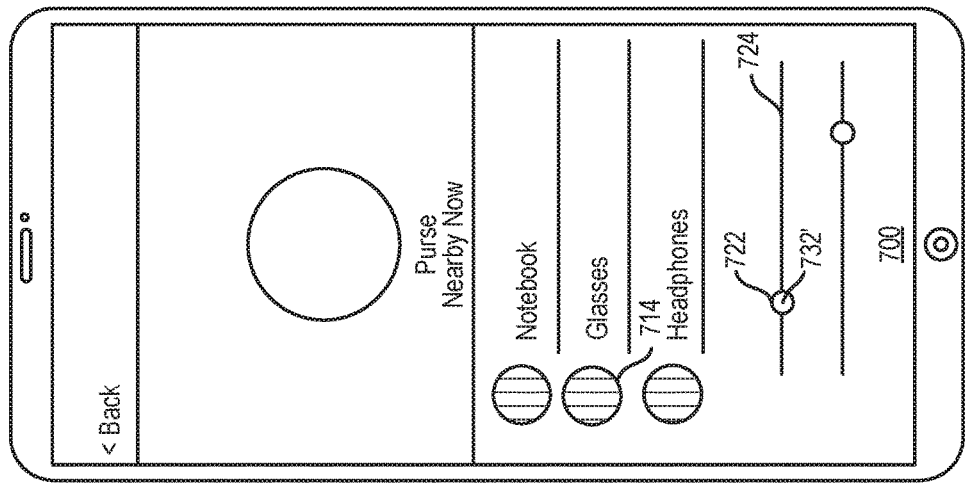
FIGS. 7A-D show examples of a user interface that can be used for calibrating one or more tags of a group.
Figure 7A:
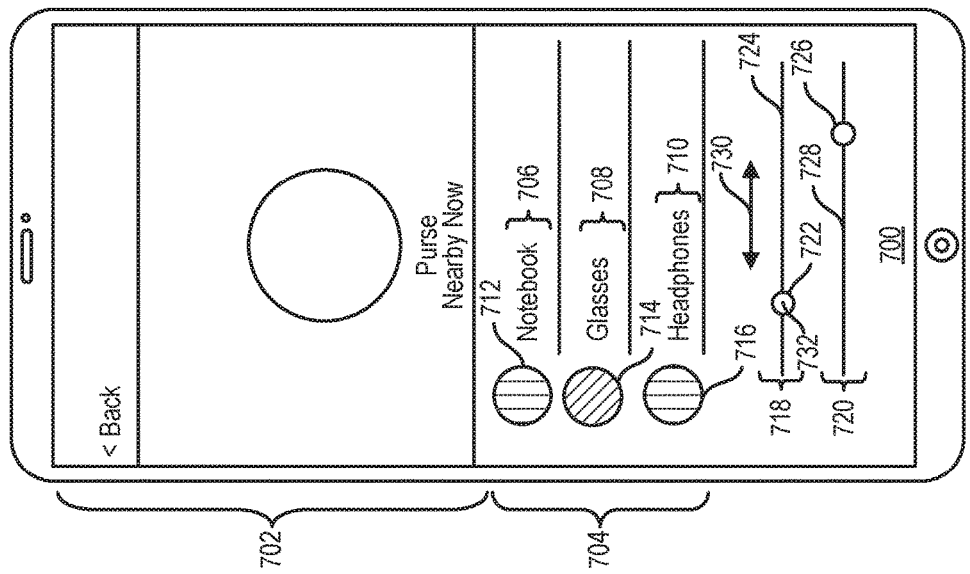

Assume that a user has placed the notebook, glasses, and headphones outside the purse, and that the user interface 700 has the appearance as shown in FIG. 7A. That is, the user interface 700 now correctly shows the notebook (by status indicator 712) and the headphones (by status indicator 716) as being outside the purse. However, the status indicator 714 here incorrectly shows the glasses as being inside the purse.

To attempt to improve the calibration, the user can move the slider 722, as schematically indicated by arrow 730, from a current position 732 to another position on the track 724. For example, the control 718 can correspond to a threshold for when an item is deemed to be outside the proximity of the group. This change can be made without moving the purse or any of its contents.

FIG. 7B shows that the user has moved the slider 722 to a position 732' along the track 724. This can change a parameter relating to the calibration of the group corresponding to the parent tag. When the parent tag (or another device such as a processing component) applies the new parameter value, the status indicator 714 can instead have vertical stripes. This can indicate that the system now deems also the glasses to be outside of the purse.

Figure 7D:
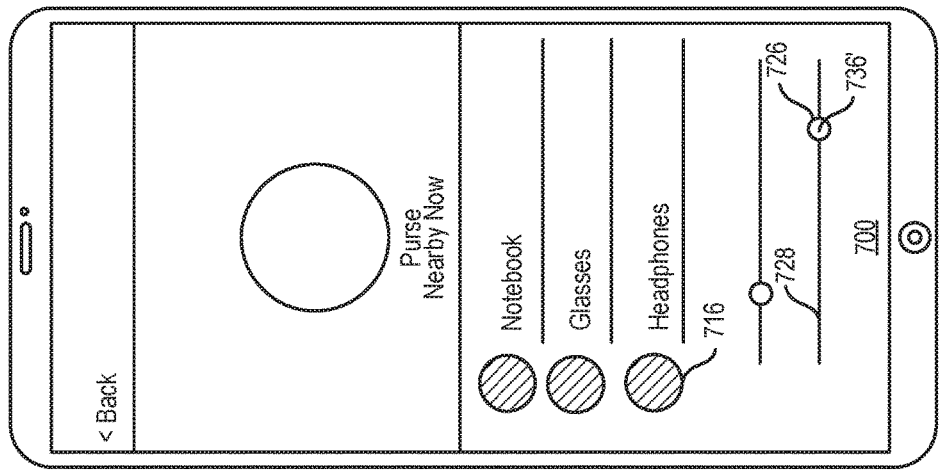
Figure 7C:
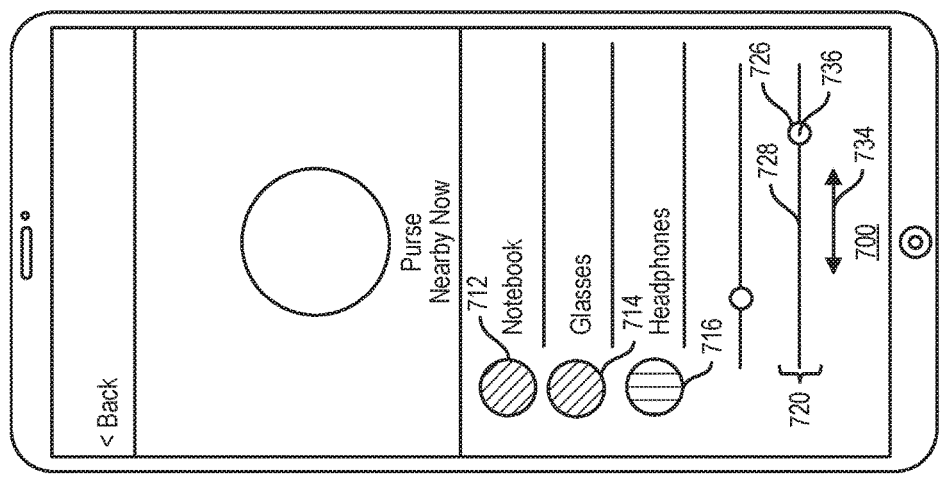

Assume now instead that the user places the notebook, glasses, and headphones inside the purse, and that the user interface 700 has the appearance as shown in FIG. 7C. That is, the user interface 700 now correctly shows the notebook (by status indicator 712) and the glasses (by status indicator 714) as being inside the purse. However, the status indicator 716 here incorrectly shows the headphones as being outside the purse.

To attempt to improve the calibration, the user can move the slider 726, as schematically indicated by arrow 734, from a current position 736 to another position on the track 728. For example, the control 720 can correspond to a threshold for when an item is deemed to be within the proximity of the group. This change can be made without moving the purse or any of its contents.

FIG. 7D shows that the user has moved the slider 726 to a position 736' along the track 728. This can change a parameter relating to the calibration of the group corresponding to the parent tag. When the parent tag (or another device such as a processing component) applies the new parameter value, the status indicator 716 can instead have diagonal stripes. This can indicate that the system now deems also the headphones to be inside the purse.

FIGS. 8A-H show examples of a user interface 800 that can be used for defining time-based notifications. The user interface 800 can be used with one or more other examples described elsewhere herein. The user interface 800 can be implemented using one or more examples described with reference to FIG. 28.

Figures 8A, 8B, 8C:
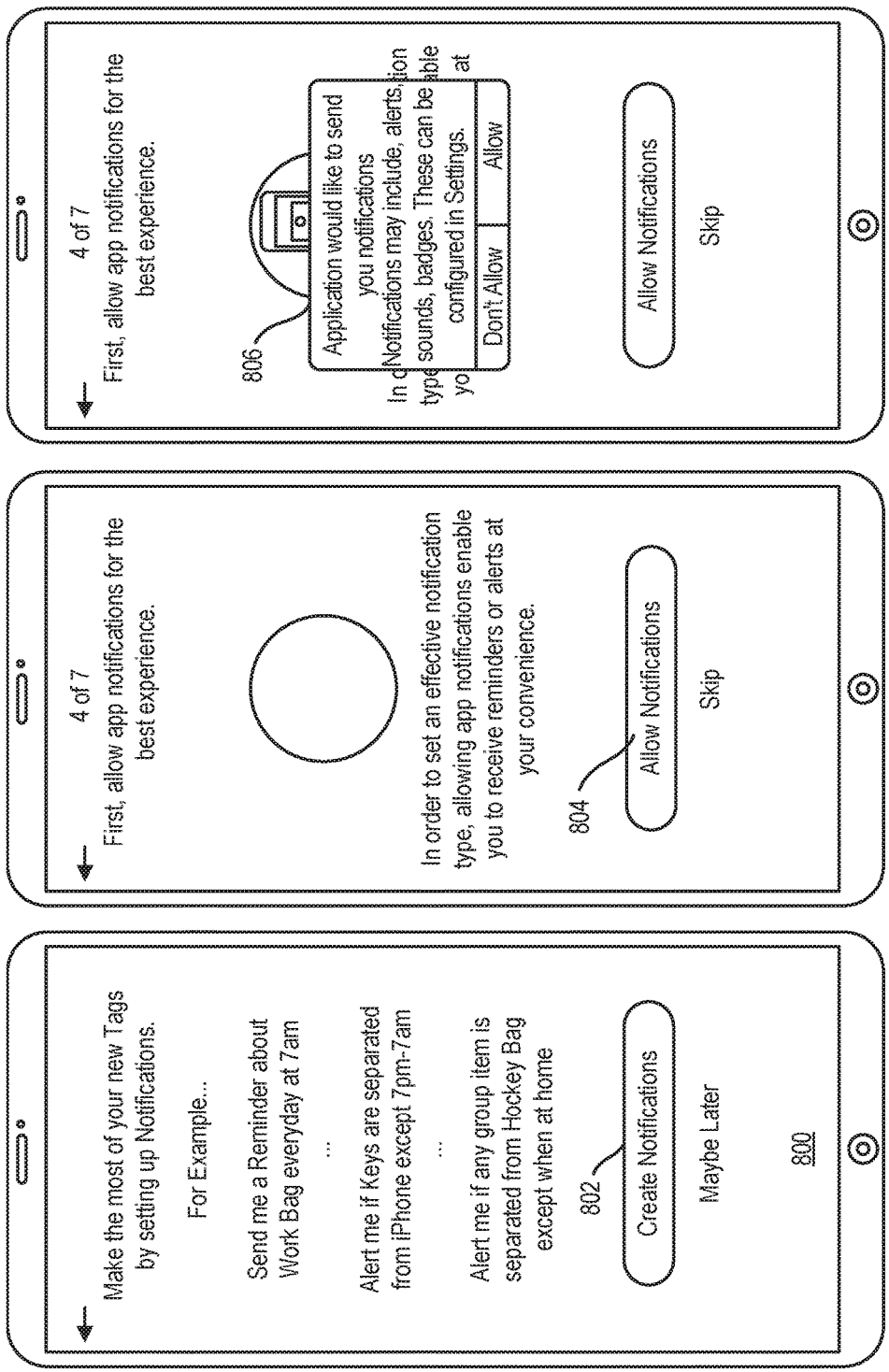
Figure 8E:
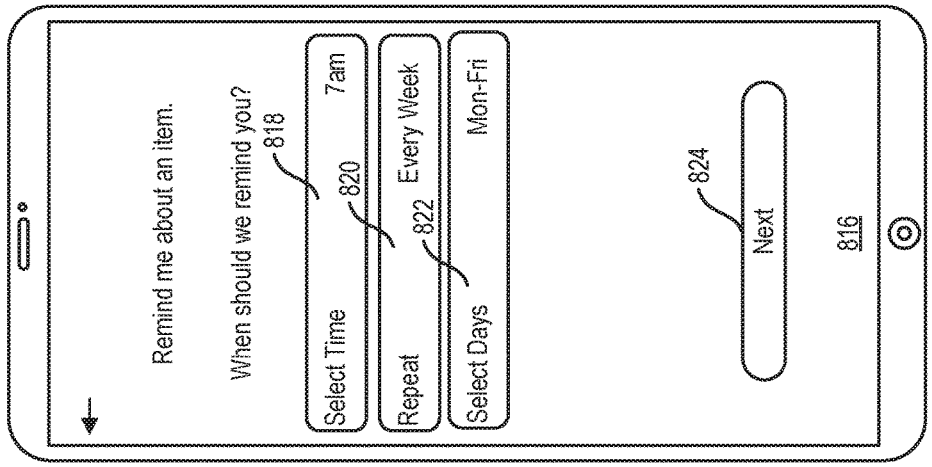
Figure 8D:
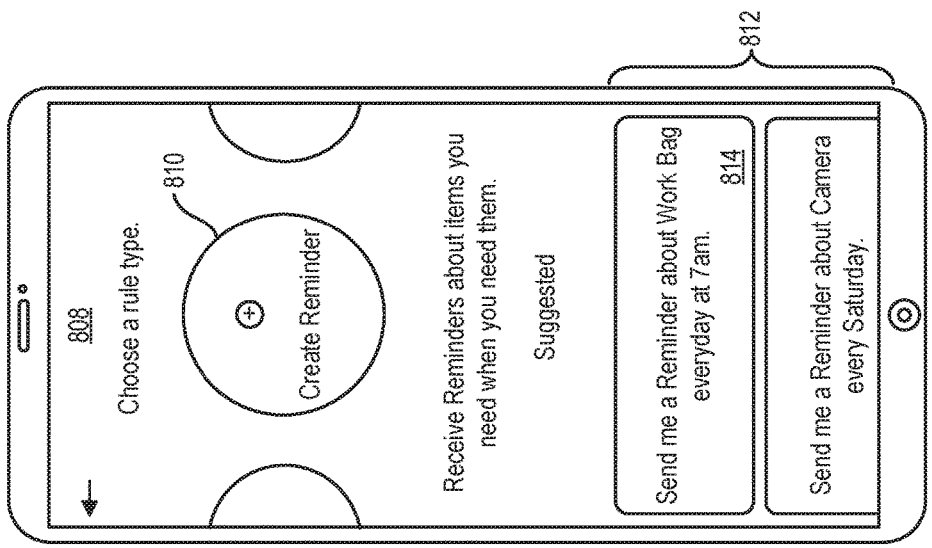
Figure 9E:
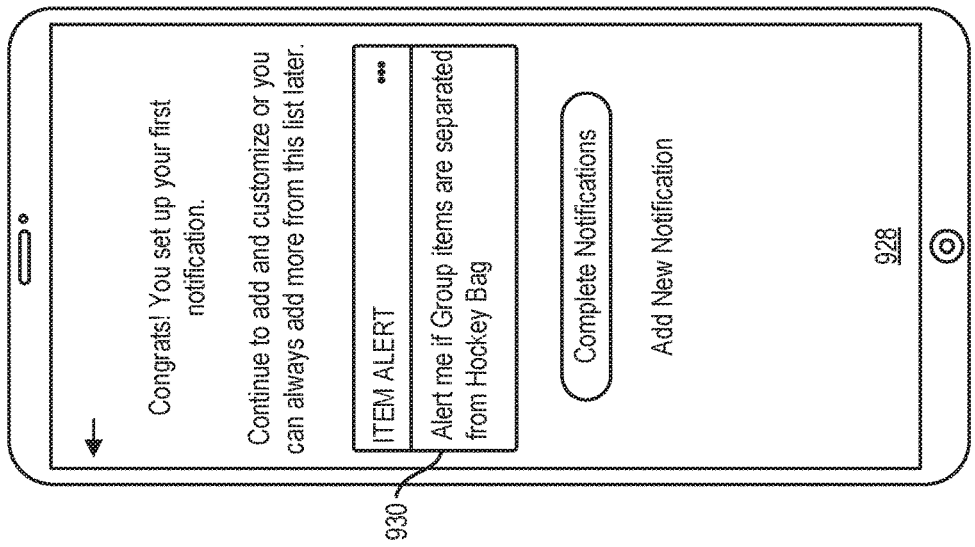
Figure 9D:
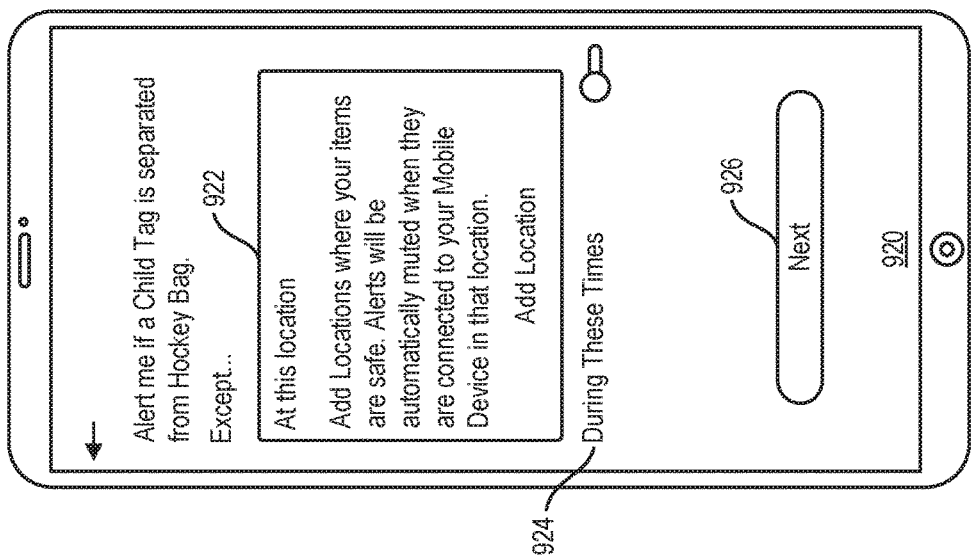

FIG. 8A shows that the user interface 800 can include a control 802 to initiate creation of one or more notifications. A notification can be created about one or more tagged physical objects. Here, the notification to be created relates to a work bag; that is, a bag that the user intends to bring along to work on a regular basis.

In response to user activation of the control 802, FIG. 8B shows that the user interface 800 can include a control 804 to initiate user authorization of notifications on the processing device (e.g., a smartphone or a tablet).

In response to user activation of the control 804, FIG. 8C shows that the user interface 800 can include a communication 806 (e.g., a modal dialog box) that requests permission to send notifications using the processing component.

In response to the user authorizing notifications, the user interface 800 can provide (FIG. 8D) a rule-type view 808 where the user can employ a control 810 to choose among multiple types of notification to be created. Here, the control 810 shows that a reminder is to be created. The user interface 800 can include a suggestions area 812 with one or more suggestions of notifications of the type selected using the control 810. For example, the suggestion(s) in the suggestions area 812 can be user selectable. Here, a suggestion 814 is presented in the suggestions area 812.

In response to the user selecting the suggestion 814, the user interface 800 can provide (FIG. 8E) a reminder view 816 that can be used to define the reminder. In the reminder view 816, a control 818 can be used to specify a time of the reminder (here, 7 a.m.), a control 820 can be used to specify whether the reminder should be repeated (here, the reminder should be repeated every week), and a control 822 can be used to specify the day(s) applicable to the reminder (here, the days of Monday through Friday). A control 824 can be used to proceed.

In response to the user activating the control 824, the user interface 800 can define the reminder according to the setting(s) made in the user interface 800, or else proceed to one or more other views, for example as described below. For example, the reminder can be generated at the specified time(s) on the specified day(s). The reminder can be subject to exceptions when it will not be generated. For example, if it is determined that the user is currently carrying the physical object to which the notification relates, the reminder can be inhibited. As another example, if it is determined that the user is not going to work on a particular day, the reminder can be inhibited.

Other and/or more specific information can be the basis of a notification. FIG. 8F shows an example of a user interface 826 that includes an item area 828 that can list the physical object(s) that the user has provided with tags (e.g., a parent tag or a child tag) for selection to be included in the reminder(s). Here an item 830 among multiple items is described as "hockey bag" and can be selected using a control 832. A control 834 can be used to proceed.

In response to the user activating the control 834, the user interface 800 can provide (FIG. 8G) a view 836 for defining the reminder(s). An area 838 presents options regarding how to perform the notification. Such options can include, but are not limited to, making a push notification (e.g., to a processing device such as a smartphone), playing a sound on a processing device, illuminating the tag (e.g., by an LED), or playing a sound on the tag. Here a control 840 for push notification, and a control 842 for tag light, have been selected in the area 838. A control 844 can be used to proceed.

In response to the user activating the control 844, the user interface 800 can provide (FIG. 8H) a view 846 that can include an information area 848 specifying the reminder(s) created. Here, the information area 848 indicates that a reminder will be generated at 7 a.m. on Monday through Friday, the reminder relating to the hockey bag, and the reminder will be made by push notification and by tag light. A control 850 can be used to create the defined reminder(s). In some implementations, the created reminder can include the specifics described with reference to FIGS. 8A-E.

FIGS. 9A-E show examples of a user interface 900 that can be used for defining separation-based notifications. The user interface 900 can be used with one or more other examples described elsewhere herein. The user interface 900 can be implemented using one or more examples described with reference to FIG. 28. In some implementations, the user interface 900 is generated using the processing device 108 in FIG. 1.

The user interface 900 can facilitate (FIG. 9A) user selection among multiple types of notification to be created, by way of a control 902. Here, the control 902 shows that a group alert is to be created. The user interface 900 can include a suggestions area 904 with one or more suggestions of notifications of the type selected using the control 902. For example, the suggestion(s) in the suggestions area 904 can be user selectable.

Upon the user proceeding, the user interface 900 can present a tag selection view 906 that can allow the user to make selections in an area 908. Here, an item 910 corresponding to "hockey bag" is selected.

Upon user selection of the item 910, the user interface 900 can provide (FIG. 9C) an area 912 that presents options regarding how to perform the notification. Such options can include, but are not limited to, making a push notification (e.g., to a processing device such as a smartphone), playing a sound on a processing device, illuminating the tag (e.g., by an LED), or playing a sound on the tag. Here a control 914 for push notification, and a control 916 for tag light, have been selected in the area 912. A control 918 can be used to proceed.

In response to the user activating the control 918, the user interface 900 can provide (FIG. 9D) a view relating to definition of exceptions. For example, an area 922 can be used for defining the location(s) for which the alert should be (or should not be) generated. As another example, An area 924 can be used for defining the time(s) during which the alert should be (or should not be) generated. A control 926 can be used to proceed.

In response to the user activating the control 926, the user interface 900 can provide (FIG. 9E) a view 928 that includes an alert definition 930 for the created alert. The definition of the generated alert can be stored by one or more tags and/or processing devices. For example, the parent tag of the child tag(s) covered by the alert (in this example, the parent tag is for the hockey bag) may store a definition of the alert and take action upon detecting the defined condition. As another example, a processing device to which the parent tag is assigned can also or instead store the definition of the alert; if the parent tag reports an absence of the child tag, the processing device can take action accordingly.

FIGS. 10A-C show examples of a user interface 1000 that can be used for calibrating separation-based notifications. The user interface 1000 includes an area 1002 listing one or more physical objects that have been provided with tags (e.g., parent tags and/or child tags). A selection in the area 1002 can correspond to creating of an alert indicating separation of the selected object(s) from, say, the user's phone. For example, a control 1004 can be used for selection of a camera for such an alert.

Upon the user proceeding, the user interface 1000 can provide (FIG. 10B) a view 1006 relating to specifying a distance of separation between (here) the camera and the phone. A symbol 1008 represents the item (here, the camera) and a symbol 1010 represents the phone. A control 1012 can be used for defining how far from (or close to) the phone the item should be in order for the alert to be generated (or not be generated). A slider 1014 can be used to increase or decrease the distance. A control 1016 can be used to proceed.

In response to the user activating the control 1016, the user interface 1000 can provide (FIG. 10C) a view 1018 that presents options regarding how to perform the alert. Such options can include, but are not limited to, making a push notification (e.g., to a processing device such as a smartphone), playing a sound on a processing device, illuminating the tag (e.g., by an LED), or playing a sound on the tag. Here a control 1020 for push notification, and a control 1022 for tag light, have been selected in the view 1018. Thus, the defined alert can be generated in the specified way upon determining that the camera becomes separated from the phone.

Figure 11:
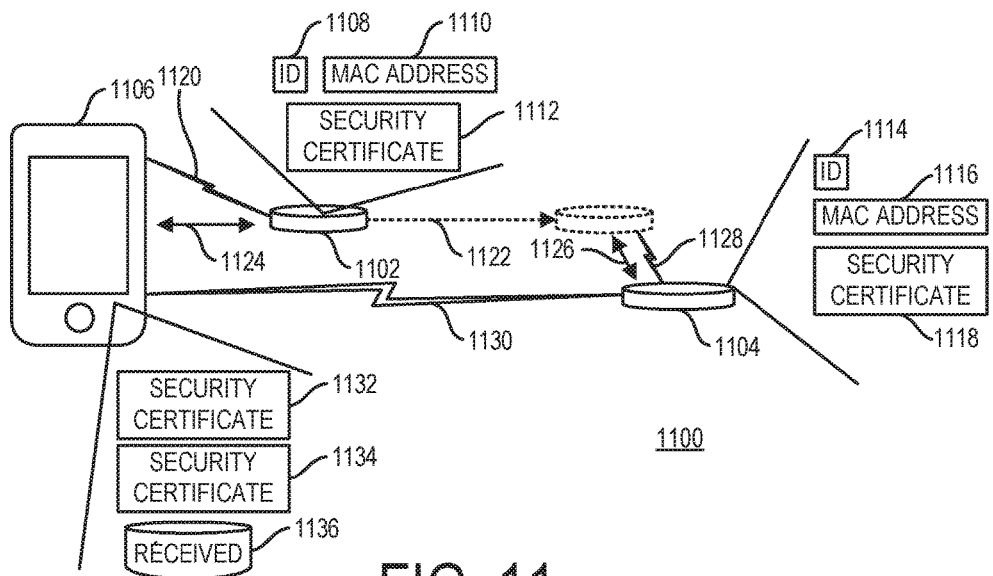
FIG. 11 schematically shows an example of pairing of tags with a processing device.

FIG. 11 schematically shows an example 1100 of pairing of tags 1102 and 1104 with a processing device 1106. The example 1100 can be used with one or more other examples described elsewhere herein. The processing device 1106 can be implemented using one or more examples described with reference to FIG. 28.

The tag 1102 will here serve as a parent tag, and the tag 1104 will here serve as a child tag. With reference briefly to the examples illustrated in FIGS. 4A-G and 5A-Z, the tag 1102 can perform substantially the same functions as the tag 408A, and the tag 1104 can perform substantially the same functions as any of the tags 408B-E. The present example relates to pairing the tags 1102 and 1104 with each other and having the pairing recognized by the processing device 1106.

During a manufacturing process, the tag 1102 may have been provided with an identifier (ID) 1108, a media access control (MAC) address 1110, and a security certificate 1112. The tag 1104, which can have a hardware configuration identical to or different from the tag 1102, can have been provided with an ID 1114, a MAC address 1116, and a security certificate 1118. For example, the security certificates 1112 and 1118 can be the respective public keys of corresponding public-private key pairs generated at the manufacturing stage, the private keys held by the processing device 1106.

The user can set up the tag 1102 to be a parent tag. For example, the user can give the tag 1102 a name and subsequently double press on the physical tag (e.g., on any one of multiple candidates to be the parent tag) to activate that physical tag and select it to be the parent tag. This can involve wireless signals 1120 between the tag 1102 and the processing device 1106. For example, the ID 1108, MAC address 1110, and security certificate 1112 from the tag 1102 can be provided to the processing device 1106.

The user can set up the tag 1104 to be a child tag. For example, the user can create a name to be assigned to the tag 1104 and subsequently double press on the physical tag (e.g., one of multiple candidates to be the child tag) to activate that physical tag and select it to be the child tag. This can place the child tag in a pairing mode. The tag 1104 may send one or more beacon signals in response to being activated.

The user can press and hold a button (e.g., the tactile switch 216 in FIG. 2) to place the tag 1102 in a pairing mode. In some implementations, this can be considered or referred to as a group mode in that the mode facilitates pairing of at least two tags to form a group. The user can bring, as schematically indicated by dashed arrow 1122, the tag 1102 into proximity with the tag 1104. A proximity 1124 between the processing device 1106 and the tag 1102 can be defined. When a proximity 1126 between the tag 1102 and the tag 1104 meets a standard (e.g., a proximity measure satisfies a criterion), the pairing process can occur, assuming that the proximity 1124 between the tag 1102 and the processing device 1106 does not exceed a threshold value (e.g., the tag 1102 must be within range of the processing device 1106). In the pairing process, wireless signals 1128 between the tags 1102 and 1104 can be transmitted. For example, the tag 1102 can obtain the ID 1114, MAC address 1116, and security certificate 1118 from the tag 1104 and provide them to the processing device 1106 by way of the wireless signals 1120.

As part of the pairing process, the tag 1104 can also engage in wireless signals 1130 directly with the processing device 1106, which can identify the tag 1104 as a legitimate child tag using the information received from the tag 1102. In some implementations, the processing device 1106 can have a security certificate 1132 relating to the tag 1102, and a security certificate 1134 relating to the tag 1104. For example, the security certificate 1132 can be the private key relating to the public key represented by the security certificate 1112, and the security certificate 1134 can be the private key relating to the public key represented by the security certificate 1118. The processing device 1106 may have received information 1136, such as the identifiers and/or security certificates received from the tags 1102 and/or 1104. For example, the communication by way of the wireless signals 1130 between the tag 1104 and the processing device 1106 at the time of the pairing process can later allow the processing device 1106 to directly send a software update (e.g., new or updated firmware code) to the tag 1104. That is, the pairing process between the tags 1102 and 1104 as a parent-child pair of tags, can directly establish the communication channel represented by the wireless signals 1130 that can allow a third-party device (e.g., the processing device 1106) to deliver software updates directly to the tag 1104.

Figure 12:
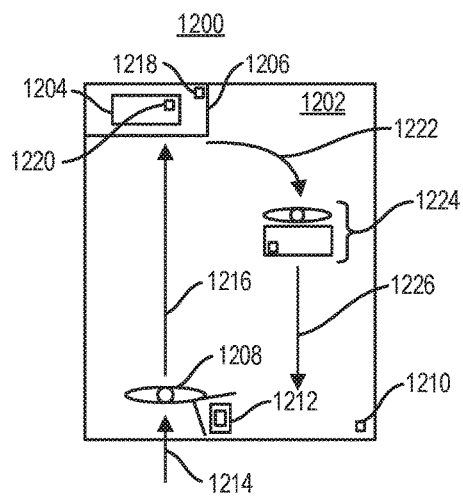
FIG. 12 schematically shows an example of managing custody of a physical object.

FIG. 12 schematically shows an example 1200 of managing custody of a physical object. The example 1200 can be used with one or more other examples described elsewhere herein. The example 1200 can be implemented using one or more examples described with reference to FIG. 28.

Here, a physical location 1202 has been established and is shown from above in the present illustration. In some implementations, the physical location 1202 is a separate indoor space, such as a room. For example, the physical location 1202 can be a laboratory.

A physical object 1204 is currently present within the physical location 1202. In some implementations, the physical object 1204 can be a machine, apparatus, or other form of equipment. For example, the physical object 1204 can be a microscope.

The physical object 1204 is here placed within a structure 1206 in the physical location 1202. In some implementations, the structure 1206 can provide one or more shelves for holding the physical object 1204. For example, the structure 1206 can be a storage locker.

A person 1208 is here shown within the physical location 1202, which may be provided with a processing device 1210 (e.g., the organization module 300 in FIG. 3). The processing device 1210 can keep track of one or more wireless devices in or near the physical location 1202. In some implementations, the person 1208 can carry a processing device 1212 (e.g., a smartphone or wearable device) that can serve as a proxy for the person 1208 and be recognized by the processing device 1210. In some implementations, the processing device 1212 or a tag (e.g., the tag 102 or one of the tags 104A-C in FIG. 1) can serve as a proxy for the person 1208.

The processing device 1210 can perform access management to the physical location 1202 to register who or what enters or leaves the physical location 1202. When the person 1208 approached the physical location 1202, as schematically indicated by an arrow 1214 outside the physical location 1202, the processing device 1210 may have detected the processing device 1212, performed an access permission check, and determined that the person 1208 was authorized to enter the physical location 1202. For example, the person 1208 can be a lab technician that is permitted to enter a particular laboratory.

The person 1208 has entered the physical location 1202 and can approach the structure 1206, as schematically indicated by an arrow 1216, which can be detected by the processing device 1210, and/or by a tag 1218 dedicated to the structure 1206. The physical object 1204 may have been provided with a tag 1220. In some implementations, the physical object 1204 may have been paired with the structure 1206 to ensure the proper placement of the physical object 1204 within the structure 1206. For example, the tag 1218 of the structure 1206 can be defined as the parent tag of the tag 1220 of the physical object 1204.

The person 1208, while at the structure 1206, can remove the physical object 1204 from its location, as schematically indicated by an arrow 1222. This removal can result in the person 1208 and the physical object 1204 being considered to currently be a group 1224. The group 1224 can reflect establishment of a relationship (e.g., a parent-child relationship) where the person 1208 and the physical object 1204 communicate with each other, and wherein either or both of them can perform one or more actions based on the circumstance(s) (e.g., based on presence at a location, proximity to some object, movement, and/or sensor input).

The tag 1218 can detect that the tag 1220 is no longer proximate to the structure 1206. The tag 1218 can therefore notify the processing device 1210, or the processing component can itself detect, that the physical object 1204 is now part of the group 1224 that is distancing itself from the structure 1206. The processing device 1210 can determine that the person 1208 has the authority to move the physical object 1204 at least within the physical location 1202. The processing device 1210 can therefore send a message to the processing device 1212 of the person 1208, such message relating to custody of the physical object 1204. For example, the message can notify the processing device 1212 that the tag 1220 (the proxy for the physical object 1204) is presently being assigned to the processing device 1212. As another example, the processing device 1210 can ask the processing device 1212 for a verification that the person 1208 should be assigned custody of the physical object 1204.

The group 1224 of the person 1208 and the physical object 1204 can proceed towards an exit of the physical location 1202, as schematically indicated by an arrow 1226, which can be detected by the processing device 1210. The processing device 1210 can determine whether the person 1208 has the authority to move the physical object 1204 outside the physical location 1202. For example, such authority can be based on who the person 1208 is (e.g., if some, but not all employees of the laboratory have such permission) and/or on what the physical object 1204 is (e.g., if the physical object 1204 is permitted to be brought outside the physical location 1202 under any, and if so which, circumstances).

In the present example and/or other implementations, motion-based interpretation of activity occurring can be performed. In some implementations, a tag and/or a processing device may detect the transition between proximate and non-proximate regarding objects, persons, and physical spaces. For example, the tag 1218 may first detect the person 1208 as being non-proximate to the structure 1206 (e.g., as the person 1208 enters the physical location 1202), and may later detect the person 1208 as being proximate to the structure 1206 (e.g., when the person 1208 is within reaching distance of the structure 1206). As another example, the tag 1218 may first detect the physical object 1204 as being proximate to the structure 1206 (e.g., before the person 1208 enters the physical location 1202), and may later detect the physical object 1204 as being non-proximate to the structure 1206 (e.g., when the physical object 1204 is beyond a predefined distance of the structure 1206). When the physical object is moved (based on sensor/accelerometer data), or a door/cabinet is opened, a check of permission can be performed. As objects and persons continue to move relative to each other and the physical space (based on proximity measure between tags and processing devices), one or more additional rules, permissions, access can be checked to confirm whether this is permissible or not.

The above example illustrates that systems and/or techniques can facilitate setup and management of relationships between physical objects using identifiable radio signals to create complex rules, groupings, hierarchies, permissions, or controls to enable users to customize behaviors of intelligent environments. For example, such systems can include, or such techniques can make use of, identifiable items, devices, sub-systems, or locations. In some implementations, smart group systems and/or sub-systems can be created that are aware of identifiable contents (e.g., users, items, location, and/or sub-systems) within the system. It can be determined what is missing from the system, what is entering or leaving the system, a relative position within the system, or relative motion or direction of motion of one or more users, items, groups, or sub-systems, by way of a radio-based proximity geofence. For example, a house system can be aware of who enters the house, where they are relative to the places and items within the house, which room (e.g., sub-system) they are in, if an item is being moved, or any specific sensor information relative to any object (e.g., a lunchbox was taken out of the refrigerator, and the temperature reading from the lunchbox experienced a change from 5 degrees C. to 23 degrees C.). As another example, a garage system can be aware whether an identifiable vehicle is parked within it; the vehicle, in turn, can be aware of identifiable contents that are within the vehicle. As another example, a cabinet system in a kitchen can be aware when contents (e.g., a drawer or cupboard) have been accessed; the system may be able to identify the person who made the access.

In some implementations, a dedicated stand-alone processing component (e.g., a hub) in a house can cooperate with a portable processing component (e.g., a smartphone or a wearable device). For example, when the hub senses that the portable processing component is within the house, the hub can take over responsibility for some or all tags within the house, whereas if the portable processing component leaves the house (and is no longer proximate or does not sense the hub) with any number of tags, the portable processing component takes over responsibility for the tags that left with the portable processing component. As another example, the portable processing component can pass over responsibility to the hub, or another dedicated stand-alone processing component (e.g., a connected vehicle) under some circumstances.

Figure 13:
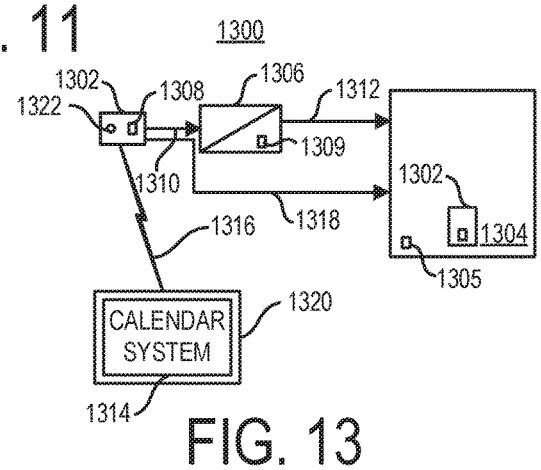
FIG. 13 schematically shows an example of managing preparation of a physical object before use.

FIG. 13 schematically shows an example 1300 of managing preparation of a physical object 1302 before use. The example 1300 can be used with one or more other examples described elsewhere herein. The example 1300 can be implemented using one or more examples described with reference to FIG. 28.

Here, a physical location 1304 has been established and is shown from above in the present illustration. In some implementations, the physical location 1304 is a separate indoor space, such as a room. For example, the physical location 1304 can be an operating room. In some implementations, the physical location 1304 is managed at least in part using a processing device 1305 (e.g., the processing device 108 in FIG. 1). For example, the processing device 1305 monitors the presence, proximity, and/or movement of tags in relation to the physical location 1304.

The physical object 1302 can be related to the physical location 1304. In some implementations, the physical object 1302 can be a piece of equipment for use within the physical location 1304. For example, the physical object 1302 can be a surgical tool.

An apparatus 1306 can be used for preparation of the physical object 1302. In some implementations, the apparatus 1306 performs a procedure on the physical object 1302 that is required or preferable before use of the physical object 1302 at the physical location 1304. For example, the apparatus 1306 can be an autoclave to perform a sterilization process on the physical object 1302 in preparation for surgery.

The physical object 1302 can include a tag 1308 (e.g., the tag 200 in FIG. 2). The tag 1308 can have at least one sensor (e.g., the sensor(s) 210) to monitor an environment or other surroundings of the tag 1308. In some implementations, the tag 1308 can detect temperature. For example, the tag 1308 can detect whether it has been subjected to steam of a sufficient temperature for sterilization, over a period of time necessary for the sterilization process. Over time, and repeated instances of subjecting the physical object 1302 to such a process, the tag 1308 can identify the elevated temperature of the sterilization process and the time it usually lasts, as a recognizable event. In some implementations, the tag 1308 stores the data in memory and may determine a recognizable event using software executed on the processor, for example as described in the following.

The tag 1308 and/or a processing component to which the tag 1308 reports, can identify patterns regarding such sensor detections by the tag 1308. In some implementations, it can be recognized that the physical object 1302 is brought inside the apparatus 1306 (e.g., as reflected by a proximity measure determined by either or both of the tag 1308 or a tag 1309 of the apparatus 1306), as indicated by an arrow 1310, before the physical object 1302 is brought inside the physical location 1304 (e.g., as reflected by a proximity measure determined by either or both of the tag 1308 or the processing device 1305), as indicated by an arrow 1312. As such, the system can learn, by observing such behavior, that the elevated temperature over a period of time should precede entry of the physical object 1302 into the physical location 1304.

The system can also observe that when the physical object 1302 is brought into the physical location 1304, this corresponds to an entry for a specific type of proceeding (e.g., a surgery) in a calendar system 1314. The calendar system 1314 can be implemented based on examples described with reference to FIG. 28. For example, the calendar system 1314 can have an entry specifying that a surgery is to be performed at the physical location 1304. Moreover, the system can detect and register the correlation between the presence of such an entry and the action of bringing the physical object 1302 into the physical location.

Based on the awareness described above, the tag 1308 can take one or more preemptive actions. In some implementations, the tag 1308 can recognize, by wireless signals 1316, that a surgery is scheduled for the physical location 1304. Assume now that the physical object 1302 is brought toward the physical location 1304 without use of the apparatus 1306, as schematically illustrated using an arrow 1318. For example, due to an oversight no sterilization of the physical object 1302 is performed. The tag 1308 can determine that no sterilization has been performed within the appropriate time window before the surgery, and can take one or more actions. For example, the tag 1308 can send, by way of the wireless signals 1316, an alert to a processing component 1320 that contains, or is otherwise connected to, the calendar system 1314. As another example, the tag 1308 can send the alert to the processing device 1305. Such alert can indicate that the physical object 1302 has not presently been subjected to the preparatory process of the apparatus 1306. As another example, the tag can send an alert using an output device 1322 on the physical object 1302 or on the tag 1308 itself (e.g., the LED 218 in FIG. 2). Such alert can involve a blinking red light and/or an alarm sound, to name just two examples.

Figure 14:
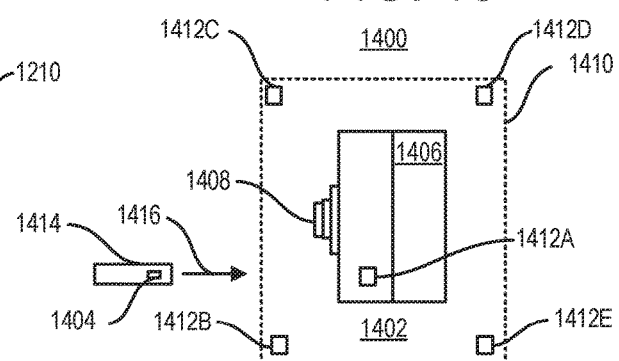
FIG. 14 schematically shows an example of controlling access to a geographic area using a tag.

FIG. 14 schematically shows an example 1400 of controlling access to a geographic area 1402 using a tag 1404. The example 1400 can be used with one or more other examples described elsewhere herein. The example 1400 can be implemented using one or more examples described with reference to FIG. 28. The geographic area 1402 is here shown from above and can include a building 1406 having at least one entrance 1408. A geofence 1410 can be established around some or all of the building 1406. For example, the geofence 1410 can be established using one or more of processing devices 1412A-E on or around the building 1406.

A physical object 1414 is here provided with the tag 1404. In some implementations, the tag 1404 includes intelligence (e.g., the activity component 304 in FIG. 3) and may carry metadata that identifies the physical object 1414 by way of its type, name, ownership, value, or unique identifier. For example, the physical object 1414 can be a firearm or other equipment that is not permitted inside the geofence 1410. The tag 1404 can be affixed on or otherwise coupled to the physical object 1414 during a manufacturing process.

When the physical object 1414 is brought into or near the geofence 1410 of the building 1406, as determined by one or more of the processing components 1412A-E, an alert can be sent. For example, the entrance 1408 can automatically be locked against outside entry in response to such a determination. As another example, a notification to law enforcement or other authorities can be generated. As another example, the tag 1404 can emit a perceptible alert (e.g., by light or sound), to inform the person bringing the physical object 1414 of the restriction of the geofence 1410.

Figure 15A:
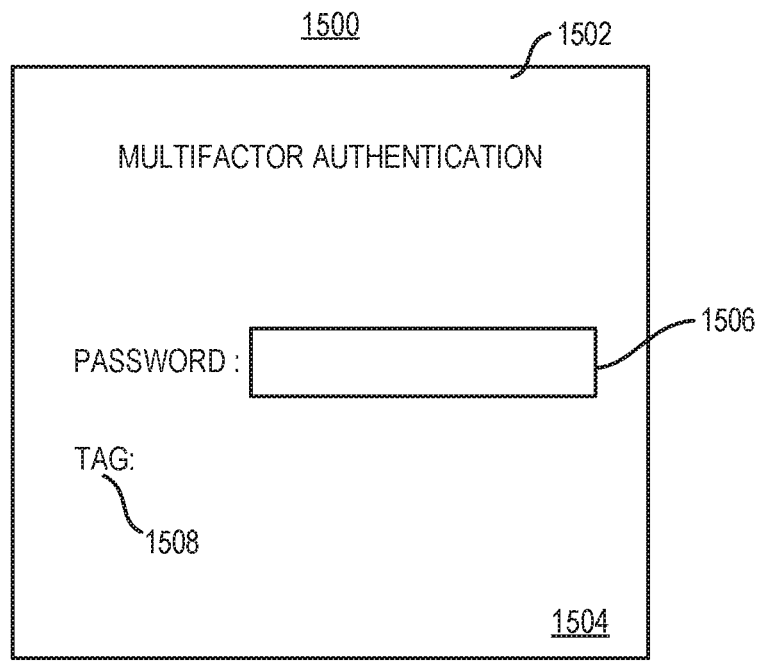
FIGS. 15A-B shows an example of using a tag as part of a multifactor authentication.
Figure 15B:
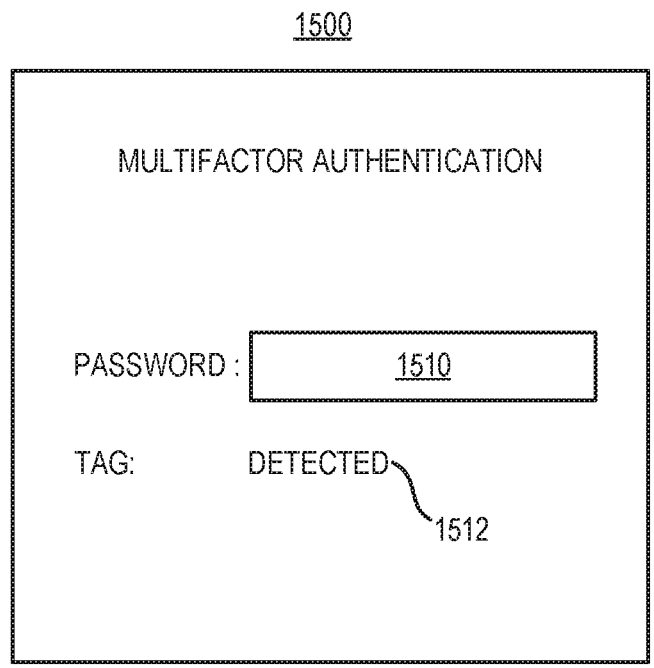

FIGS. 15A-B shows an example 1500 of using a tag (e.g., one or more of the tags 102 or 104A-C in FIG. 1) as part of a multifactor authentication. The example 1500 can be used with one or more other examples described elsewhere herein. The example 1500 can be implemented using one or more examples described with reference to FIG. 28.

A display device 1502 (e.g., on a computer device such as a laptop or a desktop computer) can present a graphical user interface 1504 that can facilitate user login into the computer device. In some implementations, the graphical user interface 1504 can be based on multifactor authentication. For example, the graphical user interface 1504 can require entry of a password 1506 and also detection 1508 of a tag as being proximate to the computer device.

FIG. 15B shows that the user has entered a password 1510, and that the detection 1508 has the status "detected" based on sensing a tag as proximate to the computer device For example, one or more of the tags 102 or 104A-C in FIG. 1 can be detected by the processing device 108 as being proximate to the processing device 108. The tag 102 or 104A-C can be a tag that the user routinely carries (e.g., attached to a keychain) and that therefore increases the possibility that the person entering the password 1510 is the same person who carries the detected tag.

The above examples illustrate that systems and/or techniques can facilitate use of wirelessly beaconing tag (including the use of, but not limited to, Bluetooth signals) for at least physical-presence authentication in a multifactor authentication process. This can be used for computer login, web access, application access, and/or in an electronic lock in combination with a lock keypad code. In some implementations, a proximity beacon (e.g., one or more of the tags 102 or 140A-C in FIG. 1), which is normally placed in a keychain for location assistance, can also or instead be used for proximity authentication with the user's laptop or desktop computer. The beacon can use highly secure rotating authentication keys with continuous handshaking between the tag and the computer (e.g., by an internal wireless component, or a wireless fob connected to the computer device. Such an approach for multifactor authentication can be more secure than, say, dual factor authentication which may be susceptible to a man-in-the-middle attack. In some implementations, a rules-based artificial intelligence algorithm can be used to enable authentication based on the user's anticipated schedule to further increase security. For example, unauthorized access during times when not anticipated by the system can trigger an alert to be generated to the user.

The above examples illustrate that systems and/or techniques can allow multifactor authentication of items, people, systems, sub-systems, locations, and/or system states through recognition of multiple radio signals that share relationship-based characteristics. For example, the radio signatures of a user's phone and those of the tags coupled to the user's keys, wallet, and purse (e.g., a smart bag), can provide four distinct data points that together can help validate the user's identity. As another example, the radio signature of a device attached to a dog that is leaving the house (or yard) by itself can be interpreted as the dog escaping if there are no other identifiable objects to validate its safe state. If an identifiable object such as a leash or a caretaker is detected, this can validate the state of the system as being safe.

FIGS. 16A-D show an example of an onboarding interaction 1600. The onboarding interaction 1600 can be used with one or more other examples described elsewhere herein. The onboarding interaction 1600 can be implemented using one or more examples described with reference to FIG. 28. The onboarding interaction 1600 here may involve a back end process 1602. In some implementations, the back end process 1602 can be implemented on an instance of the processing device 108 in FIG. 1 (e.g., on a server). The onboarding interaction 1600 also includes an application 1604 (e.g., an application being executed on a mobile device). In some implementations, the application 1604 can be implemented on another instance of the processing device 108 in FIG. 1. The onboarding interaction 1600 here includes a main process ("proc") 1606, a group process 1608, a scan process 1610, and a button process 1612. In some implementations, the main process 1606, group process 1608, scan process 1610, and button process 1612 are performed on a tag (e.g., the tag 102 in FIG. 1). The onboarding interaction 1600 here includes a child tag 1614. In some implementations, one or more of the tags 104A-C in FIG. 1 can be used as the child tag 1614.

At 1616, the application 1604 initiates a scanning function. In some implementations, the scanning function is used to detect whether any tag in the vicinity of the processing device (e.g., a smartphone) has been activated to initiate an onboarding process. The scanning function may include detecting data messages over a wireless interface.

At 1618, the button process 1612 communicates a button press to the main process 1606. In some implementations, the button process 1612 is triggered by a user activating (e.g., via a button press) the tactile switch 216 (FIG. 2) on the tag. For example, the user can double press on a button associated with the tactile switch 216.

At 1620, the main process 1606 can send a message over a wired or wireless signal to the application 1604 implemented on a processing device in response to the button press at 1618 on the tag. In some implementations, the message can include one or more identifiers associated with the tag. For example, the message transmitted over the wireless signal can be characterized as advertising by the tag.

At 1622, the application 1604 on the processing device can send a connection request message over a wired or wireless signal to the main process 1606 on a tag in response to the message at 1620. At 1624, the application 1604 on the processing device can send a command message over a wired or wireless signal to the main process 1606 on the tag. For example, the command message can include an "onboard tag" message.

At 1626, the application 1604 on the processing device can send a command message over a wired or wireless signal to the group process 1608 on a tag. In some implementations, the command message can trigger the tag to enter a group mode. For example, the application 1604 on the processing device can inform the tag about the child tag(s) that the user defined in the child-tag naming view 540 (FIG. 5J).

At 1628, the group process 1608 on the tag can read, in response to the command message at 1626 received from the processing device), a confirmed table (e.g., from flash memory). At 1630, the group process 1608 on the tag can connect to the child tag(s) in the group.

At 1632, the application 1604 on the processing device can send a request message to read a group item table from the group process 1608 on the tag. For example, the group item table may include information about the child tag(s) to which the tag has connected.

At 1634, the group process 1608 on the tag can send at least part of the group item table to the application 1604 on the processing device, in response to the request message from the processing device at 1632. In some implementations, each item in the table may be classified as either of: empty, pending confirm (e.g., items that need to be deleted), or confirmed.

At 1636, a loop of one or more operations can be performed by the processing device and two or more tags. In some implementations, the loop is performed for each child tag classified as "pending confirm" in the group item table. At 1638, the application 1604 on the processing device can send a command message over a wired or wireless signal to the group process 1608 on the tag. In some implementations, the command message may include a delete instruction for the child tag(s) at issue. For example, the command message may prompt the group process 1608 on the tag to update the group item table regarding the child tag(s). At 1640, the group process 1608 on the tag can perform at least one of multiple alternative operations. In some implementations, at least one particular operation is performed if the tag is already connected to the child tag to be deleted. For example, at 1642 the group process 1608 on the tag can send a command message over a wired or wireless signal to the child tag, thereby offboarding the child tag from the parent-child relationship with the tag. In some implementations, at least one particular operation is performed if the tag is not currently connected to the child tag to be deleted. For example, at 1644 the group process 1608 on the tag can move the entry for the child tag to a pending deletion table on the tag. In some implementations, the loop at 1636 may terminate after the alternative operation(s) at 1640.

At 1646, the group process 1608 on the tag can perform at least one of multiple alternative operations. In some implementations, at least one alternative operation is performed if the pending deletion table is not empty. For example, at 1648 the group process 1608 on the tag can save the pending deletion table (e.g., to a flash memory).

Figure 5R:
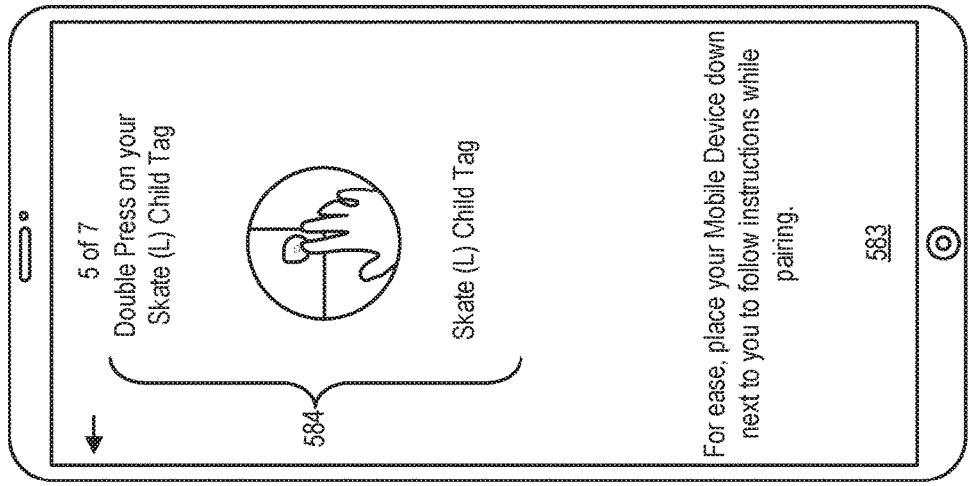
Figure 5Q:
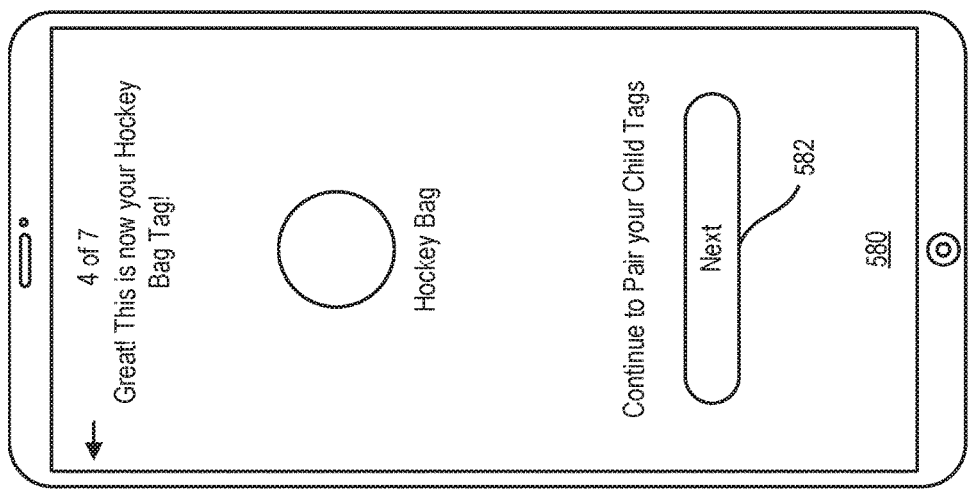
Figure 5P:
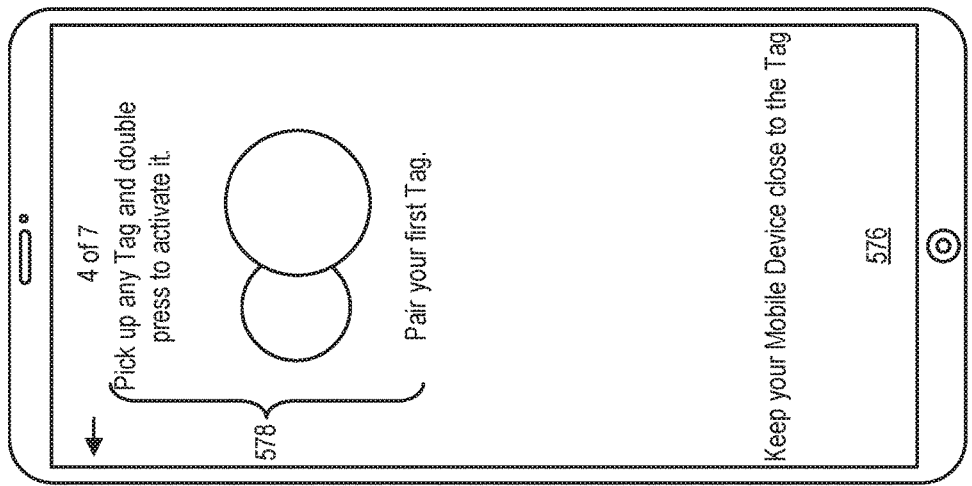
Figure 5T:
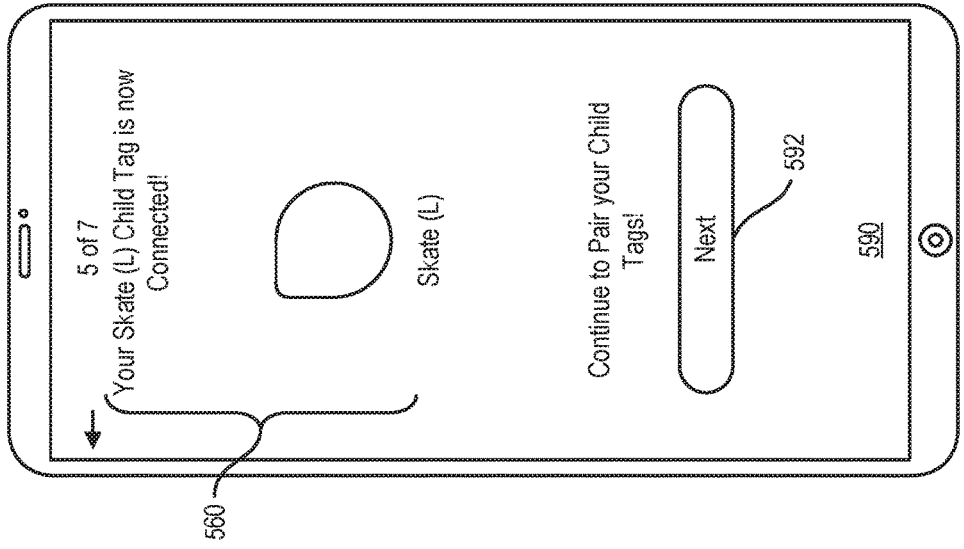
Figure 5S:
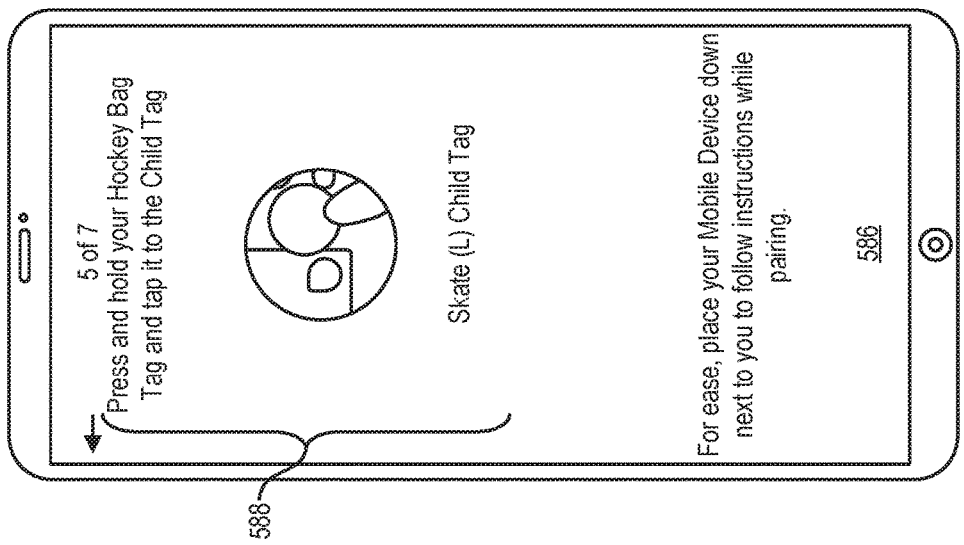

At 1650, a loop of one or more operations can be performed. In some implementations, the operation(s) can be performed for each child tag. At 1652, a button press can be performed on the child tag 1614. In some implementations, the user double presses on the tactile switch 216 (FIG. 2) on the child tag. For example, the user can be prompted to (double) press the button associated with the tactile switch 216 by the information 584 in FIG. 5R presented on a processing device.

In response to the button press, the child tag 1614 can perform one or more actions. In some implementations, the child tag 1614 at 1654 sends a message over a wired or wireless signal to the group process 1608 on the tag. In some implementations, the child tag 1614 at 1656 sends a message over a wired or wireless signal to the application 1604 on the processing device. For example, either or both of the signals can be considered an advertising message (e.g., a beacon) by the child tag 1614.

At 1658, the button process 1612 on the tag communicates a button press to the group process 1608 on the tag. In some implementations, the button process 1612 on the tag is triggered by a user activating the tactile switch 216 (FIG. 2) on the tag. For example, the user can press and hold on the button associated with the tactile switch 216. In response to the button press at 1658, the group process 1608 on the tag at 1660 can contact the scan process 1610 on the tag with an instruction to start an onboard scan. In response to the instruction at 1660, the scan process 1610 at 1662 can perform an onboard scan on the tag. In some implementations, the onboard scan can involve the tag applying a proximity measure to determine which child tag to pair with. For example, the proximity measure can depend on one or more of RSSI, C, L, PER, PL, ΔRSSI, ΔC, ΔL, ΔPER, or ΔPL. At 1664, the scan process 1610 on the tag can send a communication to the group process 1608 on the tag. In some implementations, the communication message can indicate a success or failure of the onboard scan. For example, the group process 1608 on the tag in response can save, at 1666, an entry for the child tag in a temporary ("temp") table. As another example, the group process 1608 on the tag in response can set a status for the child tag as "found".

At 1670, the group process 1608 on the tag can send a message over a wired or wireless signal with one or more commands to the child tag 1614. In some implementations, the command(s) can instruct the child tag 1614 to start the onboarding process. For example, at 1672 the child tag 1614 in response can enter a state of "onboarding started".

At 1674, the group process 1608 on the tag can send a message over a wired or wireless signal to the application 1604 on the processing device. In some implementations, the message can indicate an event to the application 1604 on the processing device. For example, the event can relate to the addition of a group table item for the child tag having a status of "found".

At 1676, the application 1604 on the processing device in response to the message from the tag can send a command message over a wired or wireless signal to the group process 1608 on the tag. In some implementations, the application 1604 on the processing device can instruct the group process 1608 on the tag to update the group item table for the child tag. For example, the group process 1608 on the tag can be instructed to give the child tag a status of "pending confirm" and may do so at 1678. When the above operations have been performed for each child tag, the operations of the loop at 1650 can terminate.

At 1680, the application 1604 on the processing device can send a message regarding the tag to the back end process 1602 on a processing device (e.g., by a wired or wireless communication). For example, the message can indicate that the tag has been onboarded.

At 1682, the application 1604 on the processing device can send a message to the main process 1606 on the tag. For example, the message can seek confirmation of the onboarding interaction from the tag. In response, the main process 1606 on the tag at 1684 can send a confirmation message response to the application 1604 on the processing device.

At 1686, at least one operation can be performed. In some implementations, the alternative operation(s) can be performed regarding offboarding of a tag. At 1688 the application 1604 can send a message to the back end process 1602 that the tag is offboarding. At 1690, the application 1604 on the processing device can disconnect from the tag. At 1692, the application 1604 on the processing device can send a disconnect instruction message over a wired or wireless signal to the group process 1608 on the tag. In response, the group process 1608 on the tag at 1694 can initiate a disconnect process from the child tag(s) 1614.

At 1696, the application 1604 on the processing device can send a request message to the tag requesting a confirmation message from the group process 1608. In some implementations, the group process 1608 on the tag at 1698 can move an entry for the child tag 1614 to a confirmed table. At 1699-1, the group process 1608 on the tag can erase the temporary table. At 1699-2, the group process 1608 on the tag can save the confirmed table (e.g., to a flash memory).

At 1699-3, a loop of one or more operations can be performed. In some implementations, the operation(s) may be performed for each "pending confirm" child tag. At 1699-4, the group process 1608 on the tag can send a command to the child tag 1614. In some implementations, the command sends a message to the child tag 1614 informing the child tag 1614 that its onboarding is confirmed. For example, at 1699-5 the child tag 1614 can set its state to "onboarding confirmed," and at 1699-6 the child tag 1614 can send a confirmation message to the group process 1608 on the tag. At 1699-7, the group process 1608 on the tag can exit the loop upon an unsuccessful response. For example, this can terminate the loop begun at 1699-3.

At 1699-8, zero or more alternative operations can be performed. In some implementations, the operation(s) can be performed when all child tags were successfully onboarded. For example, at 1699-9 the group process 1608 on the tag can do nothing.

In some implementations, the operation(s) can be performed when one or more child tags were not onboarded. At 1699-10, a loop of one or more operations can be performed. In some implementations, the operation(s) can be performed for each "pending confirm" child tag. At 1699-11, one or more alternative operations can be performed. In some implementations, the operation(s) can be performed when the tag is connected to the child tag 1614. For example, at 1699-12 the group process 1608 on the tag can send a command to the child tag 1614 (e.g., instructing it to set its status to offboarded), and at 1699-13 the child tag 1614 can set its state to offboarded. In some implementations, the operation(s) can be performed when the tag is not connected to the child tag 1614. For example, at 1699-14 the group process 1608 on the tag can move an entry for the child tag to a pending deletion table. The above operation(s) may terminate the loop begun at 1699-10.

At 1699-15, one or more alternative operations can be performed. In some implementations, the operation(s) can be performed when the pending deletion table is not empty. For example, at 1699-16 the group process 1608 on the tag can save the pending deletion table (e.g., to a flash memory). This may terminate the alternate operation(s) begun at 1699-15. At 1699-17, the group process 1608 on the tag can remove the child tag (s) 1614 from the confirmed table. At 1699-18, the group process 1608 on the tag can save the confirmed table (e.g., to a flash memory). For example, this can terminate the alternative operation(s) begun at 1699-8.

At 1699-19, the group process 1608 on the tag can send an event message to the application 1604 on the processing device. In some implementations, the event message can be a response to the successful grouping with the child tag(s) 1614. For example, the response message at 1699-19 can be a response to the request message from the application 1604 on the processing device at 1696.

At 1699-20, zero or more alternative operations can be performed. In some implementations, the operation(s) can be performed upon a successful onboarding of the child tag(s) 1614. For example, at 1699-21 the application 1604 on the processing device can instruct the back end process 1602 to set the child tag(s) 1614 as onboarded.

At 1699-22, a loop of one or more operations can be performed. In some implementations, the operation(s) can be performed for all child tag(s) 1614. For example, at 1699-23 the application 1604 on the processing device can send a command message to the group process 1608 on the tag to set the status of the child tag(s) 1614 as confirmed in the group item table, and at 1699-24 the group process 1608 on the tag can set the status of the child tag(s) 1614 as confirmed in the group item table. This can terminate the operation(s) begun at 1699-22. For example, at 1699-25 the group process 1608 on the tag can save the confirmed table (e.g., to a flash memory).

In some implementations, the alternative operation(s) at 1699-20 can relate to an unsuccessful onboarding of the child tag(s) 1614. For example, this can involve the application 1604 doing nothing at 1699-26. This can terminate the alternative operation(s) begun at 1699-20.

Figure 17:
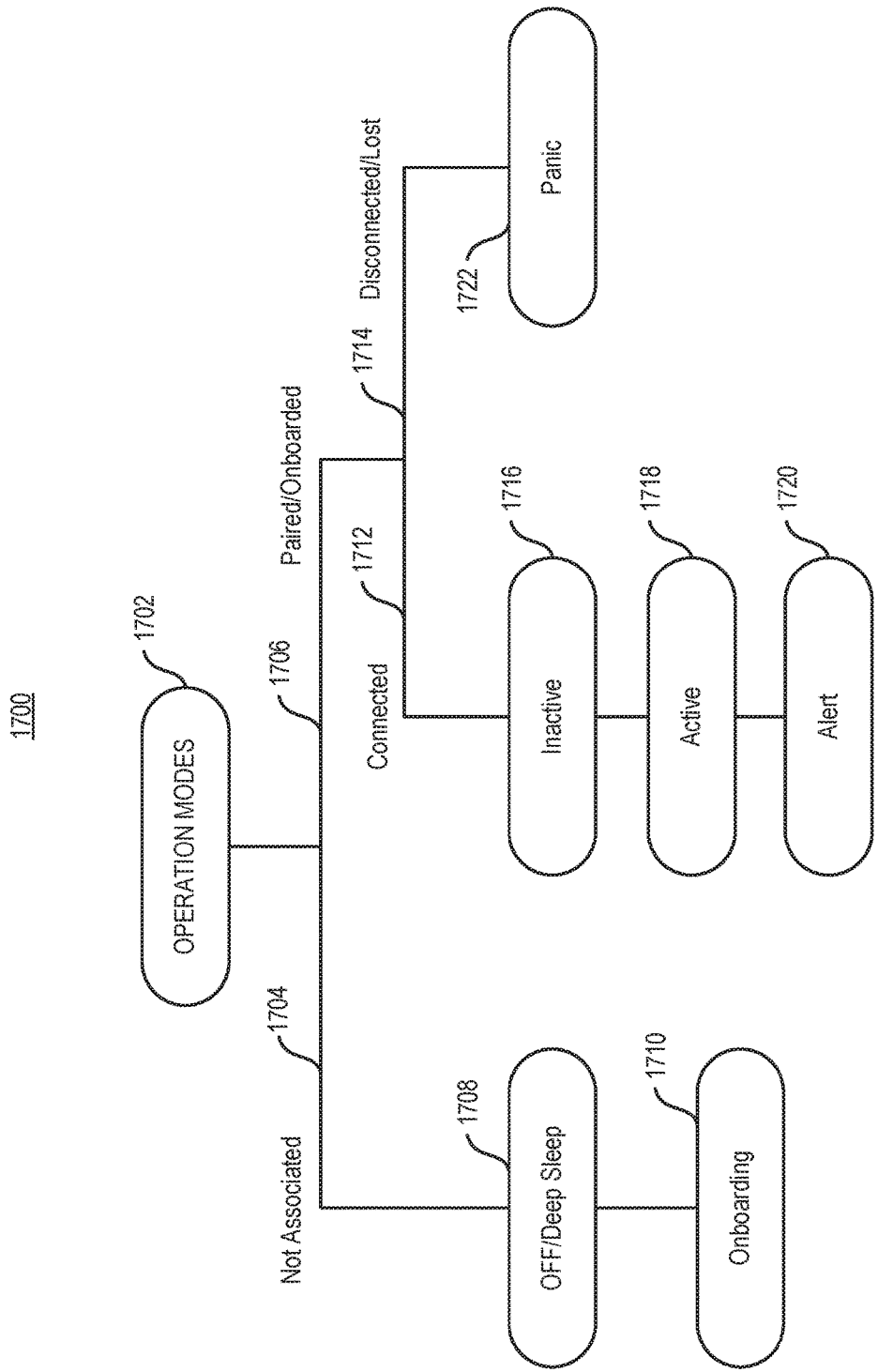
FIG. 17 shows examples of modes of a tag.

FIG. 17 shows examples of modes 1700 of a tag. The modes 1700 can be used with one or more other examples described elsewhere herein. The modes 1700 can be implemented using one or more examples described with reference to FIG. 28. The modes 1700 can be used with one or more types of tag, including, but not limited to, a parent tag and/or a child tag.

The modes 1700 can include a root mode 1702. One or more other modes can be arranged under the root mode 1702. In some implementations, the modes can be organized in a "not associated" branch 1704 or in a "paired/onboarded" branch 1706. Some or all of the modes 1700 can apply to a parent tag and/or to a child tag, for example as indicated below.

The not associated branch 1704 can include an off/deep sleep mode 1708. For example, the off/deep sleep mode

1708 can occur when the tag is out from production until it begins the onboarding/pairing process. The not associated branch 1704 can include an onboarding mode 1710. The onboarding mode 1710 can occur when the tag is about to be associated with another device (e.g., a smartphone), or when a child tag is about to be associated with a parent tag. For example, this can involve setting up (or transferring) a group.

The paired/onboarded branch 1706 can be organized in a connected branch 1712 and a disconnected/lost branch 1714. The connected branch 1712 can include an inactive mode 1716. The inactive mode 1716 can occur when there is no activity by the user for a specific time, such as when the user is asleep, except that a child tag can have an active mode timeout. A child tag can enter the inactive mode 1716 when the parent tag enters an inactive state. For example, one or more child tags of a group can then also be placed in inactive mode. The connected branch 1712 can include an active mode 1718. The active mode 1718 can occur when the tag is actively connected, and can be considered a stable state. For example, the active mode 1718 can occur when the tag is anticipating a trigger coming up or is moved, or the user launches the application before the occurrence of a scheduled event, or in a child tag when the parent tag anticipates a trigger coming up or is moved. As another example, the active mode 1718 can occur when the user disables/snoozes/dismisses an alert/panic mode notification. The connected branch 1712 can include an alert mode 1720. The alert mode 1720 can occur when the user attempts to find a tagged item (or its container item), or when a group item is lost or disconnected, or when a tagged item is subjected to a sudden impact/shock or detects a system malfunction.

The disconnected/lost branch 1714 can include a panic mode 1722. The panic mode 1722 can occur when the tagged item is lost or disconnected.

The following examples relate to use cases for a group of two or more tags. The examples involve:

Betty, 33, who is Andy's mother, and who recently bought a pack of smart tags and has set up three groups.

Group#1: Betty's work bag (contains laptop and three other items).

Group#2: Andy's school bag (contains seven items)

Group#3: Andy's baseball kit (contains twelve items)

Andy, 9, goes to school Monday through Friday and attends baseball practice on Thursdays at 7 p.m. (a scheduled event).

The following description contains 19 examples occurring during 24 hours in Betty's life on a Thursday. The examples are presented in chronological order, but need not occur in such an order. Each example is first given an identifier (ID), and is characterized as to the time of day (TOD) and situation description (SD), if any, that applies to the example. Then, the example describes group behavior in terms of planned events and/or unplanned events, if any, that apply to the example. If neither a planned event nor an unplanned event applies to the example, nothing is mentioned in this regard. Finally, a table of operation modes for the work bag, school bag, and baseball kit, respectively, is presented in each example. Time durations (e.g., as measured in a number of seconds) mentioned in the following are given for illustrative purposes only.

ID: 0 TOD: Before 7:00 AM E: n/a SD: Nighttime

| Operation Modes | | |
|---|---|---|
| Work Bag | School Bag | Baseball Kit |
| The Work Bag (Container) is in Inactive mode making the response time the most sluggish; max 30s | Inactive The SchoolBag (Container) is in Sleep mode making the response time the most sluggish; max 30s | Baseball Kit: Inactive The BaseballKit is in Sleep mode making the response time the most sluggish; max 30s |

Here, the Work Bag learns Betty's wake up schedule and reacts accordingly by waking up the system when she is awake.

Here, the School Bag learns Betty's wake up schedule and reacts accordingly by waking up the system when she is awake.

Here, the Baseball Kit learns Betty's wake up schedule and reacts accordingly by waking up the system when she is awake.

ID: 1 TOD: 7:00 AM E: Wake up SD: Betty wakes up; sets herself up for daily chores

| Operation modes | | |
|---|---|---|
| Work Bag | School Bag | Baseball Kit |
| Work Bag: Inactive -> Active Response time is max 10s | All Containers: Inactive -> Active | All Containers: Inactive -> Active |

The Baseball Kit learns from the app that there is no scheduled event coming up for the next several hours. Since all the items in the Kit are in place, and the Kit has been stationary for more than 15 mins, it switches to Inactive state until further triggers such as movement or app trigger.

ID: 2 TOD: 8:00 AM E: Get the children ready SD: Betty is ready; wakes up Andy

| Operation modes | | |
|---|---|---|
| Work Bag | School Bag | Baseball Kit |
| Active | Active | Inactive |

ID: 3 TOD: 8:15 AM E: Pack school bags SD: As Betty starts to set up Andy's School Bag, the School Bag displays a green light on the app. Betty heaves a sigh of relief as she is all set to leave with Andy for school.

Planned events: Container is alerted at 8:15 before a scheduled event (School) is about to start.

| Operation modes | | |
|---|---|---|
| Work Bag | School Bag | Baseball Kit |
| Active | Active -> Alert | Inactive |

ID: 4 TOD: 8:30 AM E: Drop off the children SD:

Planned events: As Andy reaches school, the container enters a safe state

| Operation modes | | |
| --- | --- | --- |
| Work Bag | School Bag | Baseball Kit |
| Active | Alert -> Active | Inactive |

As Betty comes home, the system wakes up from inactive state to reduce the response time from 30 s to 10 s. It waits for the next 15 min timeout to go back to inactive state.

ID: 5 TOD: 8:45 AM E: Get back home SD:

| Operation modes | | |
| --- | --- | --- |
| Work Bag | School Bag | Baseball Kit |
| Active | Active | Active |

Just when Betty is required to leave for work, the system does a quick check on the Work Bag to find out that it is missing the laptop. This is indicated by the status LED on the Work Bag smart tag and provides a timely feedback to Betty so that she can trace the missing laptop ahead of time. Here, the feedback is provided from the Work Bag by means of a push notification on the app.

The Baseball Kit does not detect any movement/triggers and eventually switches to the inactive state.

ID: 6 TOD: 9:00 AM E: Get ready for work SD: Betty frowns as her Work Bag is flashing red. Quickly she opens the notification she just received on her phone saying that she is missing her laptop. She remembers working on her laptop last night; she looks at the last location and notices that it's in her bedroom. She runs upstairs to get her laptop and puts it in her Work Bag. Betty now sees the green light on her phone against the Work Bag Planned events: Work Bag is alerted.

| Operation modes | | |
| --- | --- | --- |
| Work Bag | School Bag | Baseball Kit |
| Work Bag: Active -> Alert Response time max 1s; Any activity on the Work Bag is reported to the phone within the desired response time; Any trigger from the phone makes the Work Bag respond within 1s | Active | Inactive |

ID: 7 TOD: 9:15 AM E: Leave for work SD:

| Operation modes | | |
| --- | --- | --- |
| Work Bag | School Bag | Baseball Kit |
| The Work Bag acknowledges Betty's movements such as walking, driving and continues to remain in the Prepared state until stationary or in a safe-zone. In this case, the Container is in active state, except that the response time now is max 5s | Active | Inactive |

Just when Betty reaches her office, the Work Bag acknowledges a Safe Zone and puts the system back from Alert to Active mode, thereby, having an increased response time to conserve power.

ID: 8 TOD: 9:30 AM E: Arrive at work SD:

Planned events: Work Bag enters safe mode

| Operation modes | | |
| --- | --- | --- |
| Work Bag | School Bag | Baseball Kit |
| Work Bag: Alert -> Active Response time is max 10s | Active | Inactive |

ID: 9 TOD: 11:00 AM E: Attend meetings SD: Betty is away but the phone remains connected

| Operation modes | | |
| --- | --- | --- |
| Work Bag | School Bag | Baseball Kit |
| Active | Active | Inactive |

Betty has an unplanned lunch even coming up for which she leaves her Work Bag at her office and is away for lunch. As the Work Bag remains stationary and it loses connectivity from the phone, it switches up the response time to a Prepared mode. At this point, since the Work Bag is a critical group, Betty immediately receives a push notification about her Work Bag. Here, any suspicious activity such as the movement detected by the bag in Betty's absence will trigger an alert state and the Work Bag would indicate a distress state.

During the course of the day at school, Andy keeps removing and putting back items multiple times from his School Bag making the system to be in Prepared mode each time an item is removed.

ID: 10 TOD: 12:30 PM E: Lunch SD: Betty has to be at the cafeteria for lunch at the adjacent building.

Unplanned events: Work Bag is disconnected from the phone

| Operation modes | | |
| --- | --- | --- |
| Work Bag | School Bag | Baseball Kit |
| Prepared mode | Here, the School Bag enters Prepared mode when Andy removes his lunchbox from the School Bag container. | Inactive |

As soon as the Work Bag reconnects to Betty's phone when she's back, the Work Bag syncs with the phone to update any past activity and enters Active mode, until the next event/trigger.

As the item is placed back into the School Bag, it acknowledges that all items are in the container. The system enters Active state.

ID: 11 TOD: 3:00 PM E: Coffee break SD: A colleague grabs Betty for a quick coffee chat.

Unplanned events: Work Bag is disconnected from the phone

| Operation modes | | |
| --- | --- | --- |
| Work Bag | School Bag | Baseball Kit |
| Active | Active | Inactive |

Work Bag resumes Active mode as soon as the app is closed or no activity is detected for a specific time.

ID: 12 TOD: 6:00 PM E: Leave work SD: It was a long day and Betty glances at the green light on her Work Bag and leaves.

Planned events: Work Bag is alerted 15 mins prior to the leaving time.

| Operation modes | | |
| --- | --- | --- |
| Work Bag | School Bag | Baseball Kit |
| Work Bag: Active -> Alert Response time is max 1s | Active | Inactive |

As Betty leaves to pick up Andy, the SchoolBag waits in the Active state until further triggers/events.

ID: 13 TOD: 6:15 PM E: Pick up children SD: Andy joins his mother on her way back home.

| Operation modes | | |
| --- | --- | --- |
| Work Bag | School Bag | Baseball Kit |
| Work Bag acknowledges walking and driving and switches to a Prepared state until stationary or in a safe-zone | School Bag: Active -> Alert As Andy moves his SchoolBag and as Betty arrives, the system switches to alerts state | Inactive |

ID: 14 TOD: 6:30 PM E: Arrive home SD: Both arrive home

| Operation modes | | |
| --- | --- | --- |
| Work Bag | School Bag | Baseball Kit |
| Work: Alert ->Active Response time is max 10s | School Bag: Alert ->Active | Active |

As Betty comes home, the system wakes up from inactive state to reduce the response time from 30 s to 10 s. It waits for the next 15-min. timeout to go back to inactive state.

ID: 15 TOD: 7:00 PM E: Dress up Andy for baseball practice SD: Its Thursday and looking at the green light on Andy's Baseball Kit, Betty is all set to take Andy for his baseball practice.

Planned events: Baseball Kit is alerted 15 mins ahead of the practice

| Operation modes | | |
| --- | --- | --- |
| Work Bag | School Bag | Baseball Kit |
| | | Baseball Kit: Active -> Alert It's Thursday and the Baseball practice event is up in the next 15 mins. The system jumps into an alert state to be responsive in under 1s. The Baseball Kit shows a green LED to indicate that Betty is all set to leave with Andy for the Baseball practice with his Kit. |

ID: 16 TOD: 8:00 PM E: Return home SD: Both arrive home

Planned events: All containers enter inactive mode

| Operation modes | | |
| --- | --- | --- |
| Work Bag | School Bag | Baseball Kit |
| | | The Baseball Kit is in Prepared state as Betty drives to the baseball ground. The response time here is 5s max. The Kit remains in the Prepared state until the game ends and the Kit is in a safe zone (home) |

As Betty returns home, the Baseball Kit notifies Betty that the Helmet is missing on the app. Betty looks up the last known location to find out that the helmet was last seen at the baseball center. She immediately calls up the baseball center staff to find out that they have it secured. Betty acknowledged the notification and the system resumes normal operation.

ID: 17 TOD: 8:15 PM E: Prepare dinner SD:

| Operation modes | | |
| --- | --- | --- |
| Work Bag | School Bag | Baseball Kit |
| | | Baseball Kit: Alert -> Active System switches over to active state as it detects home (safe zone) |

The Work Bag learns Betty's sleep time when the system is rarely used. It switches to the inactive mode until-wake up or any trigger received by its movement or from the phone.

The School Bag learns Betty's sleep time when the system is rarely used. It switches to the Inactive mode until-wake up or any trigger received by its movement or from the phone.

The Baseball Kit learns Betty's sleep time when the system is rarely used. It switches to the inactive mode until-wake up or any trigger received by its movement or from the phone.

ID: 18 TOD: 10:00 PM E: Bedtime, all systems go to sleep SD:

| Operation modes | | |
| --- | --- | --- |
| Work Bag | School Bag | Baseball Kit |
| WorkBag: Active -> Inactive Response time is max 30s | All Containers: Active -> Inactive Response time is max 30s | All Containers: Active -> Inactive Response time max 30s |

Figure 18:
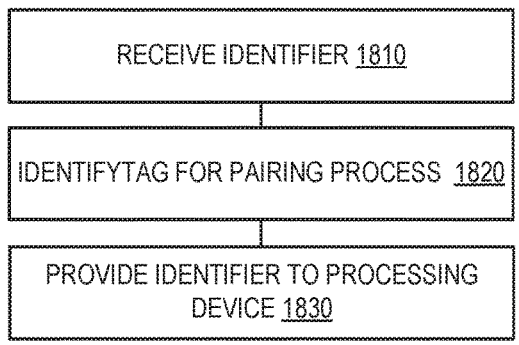
FIG. 18 shows an example of a method that can be performed by a tag in a pairing process.

FIG. 18 shows an example of a method 1800 that can be performed by a tag in a pairing process. The method 1800 can be used with one or more other examples described elsewhere herein. The method 1800 can be performed using one or more examples described with reference to FIG. 28. More or fewer operations than shown can be performed. Two or more operations can be performed in another order unless otherwise indicated.

At 1810, a first tag receives a message from a second tag, the message including an identifier. The first and second tags may be configured for coupling to respective first and second physical objects to organize activities. In some implementations, the tag 1102 (FIG. 11) receives the ID 1114 and the MAC address 1116 from the tag 1104 at 1654 in FIG. 16B.

At 1820, the first tag identifies the second tag, based on a proximity measure, for a pairing process to register the second tag as a child tag of the first tag. In some implementations, the first tag applies a proximity measure at 1660-1664 in FIG. 16B to identify the child tag that the first tag is being held in proximity of (e.g., when a user acts according to the information 588 in FIG. 5S). For example, a user can press and hold the button on the first tag and hold the first tag near (or tap it to) the second tag so that the first tag can identify the second tag based on the proximity measure.

At 1830, the first tag sends a message with the identifier to a processing device configured to register the second tag as the child tag of the first tag. In some implementations, the tag 1102 (FIG. 11) provides the ID 1114 and the MAC address 1116 of the tag 1102 in a message to the application 1604 (FIG. 16B) on the processing device at 1674.

Figure 19:
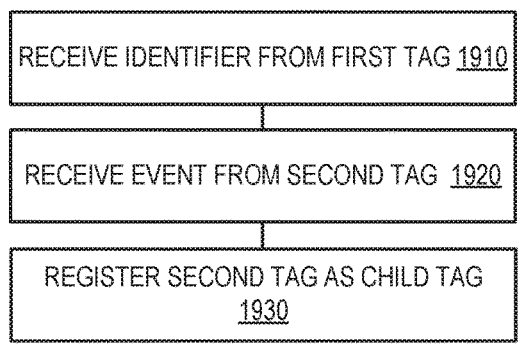
FIG. 19 shows an example of a method that can be performed by a processing device in a pairing process.

FIG. 19 shows an example of a method 1900 that can be performed by a processing device in a pairing process. The method 1900 can be used with one or more other examples described elsewhere herein. The method 1900 can be performed using one or more examples described with reference to FIG. 28. More or fewer operations than shown can be performed. Two or more operations can be performed in another order unless otherwise indicated.

At 1910, a processing device receives a message with an identifier from a first tag. In some implementations, the application 1604 (FIG. 16A) on the processing device receives the ID 1114 and the MAC address 1116 (FIG. 11) from the child tag 1614 (FIG. 16B) at 1656.

At 1920, the processing device receives an event message from a second tag that the second tag is a parent tag of the first tag. In some implementations, the application 1604 (FIG. 16A) on the processing device receives an event message regarding a group item added from the group process 1608 (FIG. 16B) on the tag at 1674.

At 1930, the processing device registers the first tag as a child tag of the second tag. In some implementations, the application 1604 (FIG. 16A) on the processing device instructs the group process 1608 on the tag to define an entry in a group item table at 1676.

Figure 20:
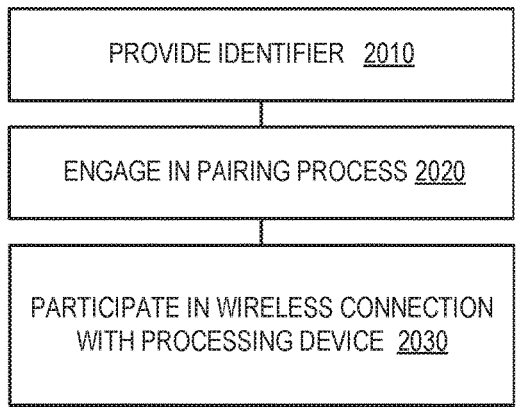
FIG. 20 shows an example of a method that can be performed by a child tag in a pairing process.

FIG. 20 shows an example of a method 2000 that can be performed by a child tag in a pairing process. The method 2000 can be used with one or more other examples described elsewhere herein. The method 2000 can be performed using one or more examples described with reference to FIG. 28. More or fewer operations than shown can be performed. Two or more operations can be performed in another order unless otherwise indicated.

Figure 16A:
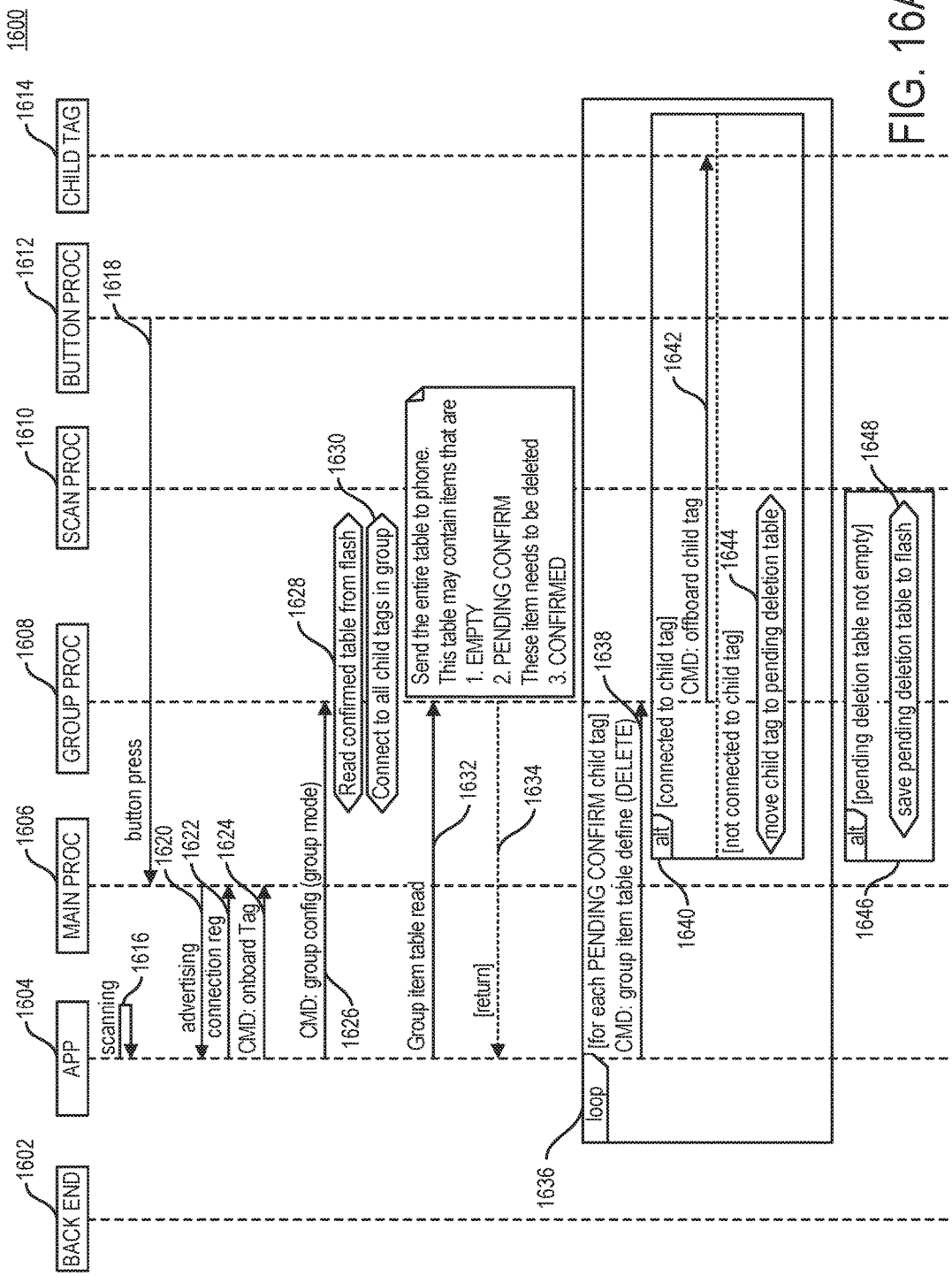
FIGS. 16A-D show an example of an onboarding interaction.
Figure 16B:
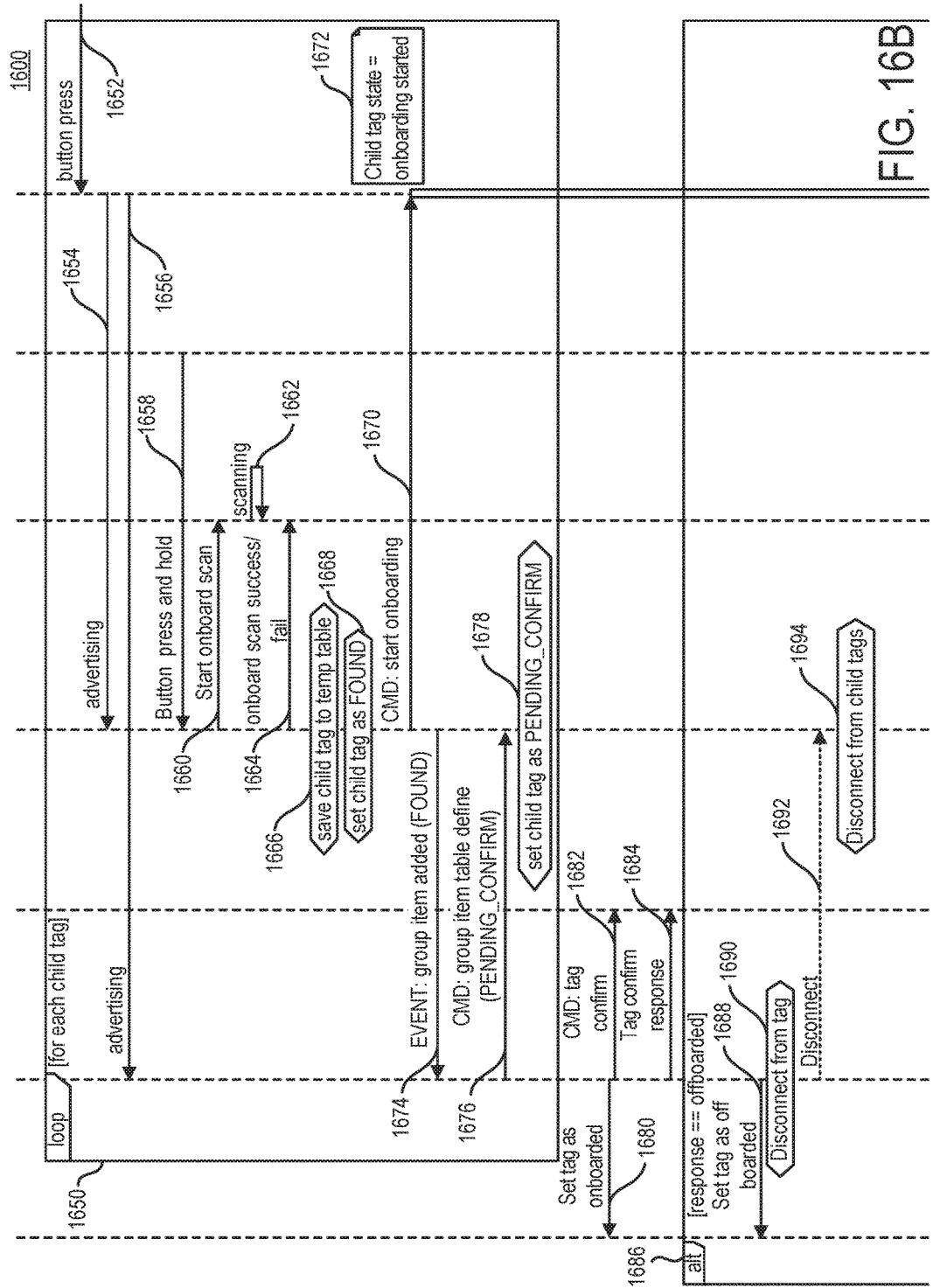
Figure 16C:
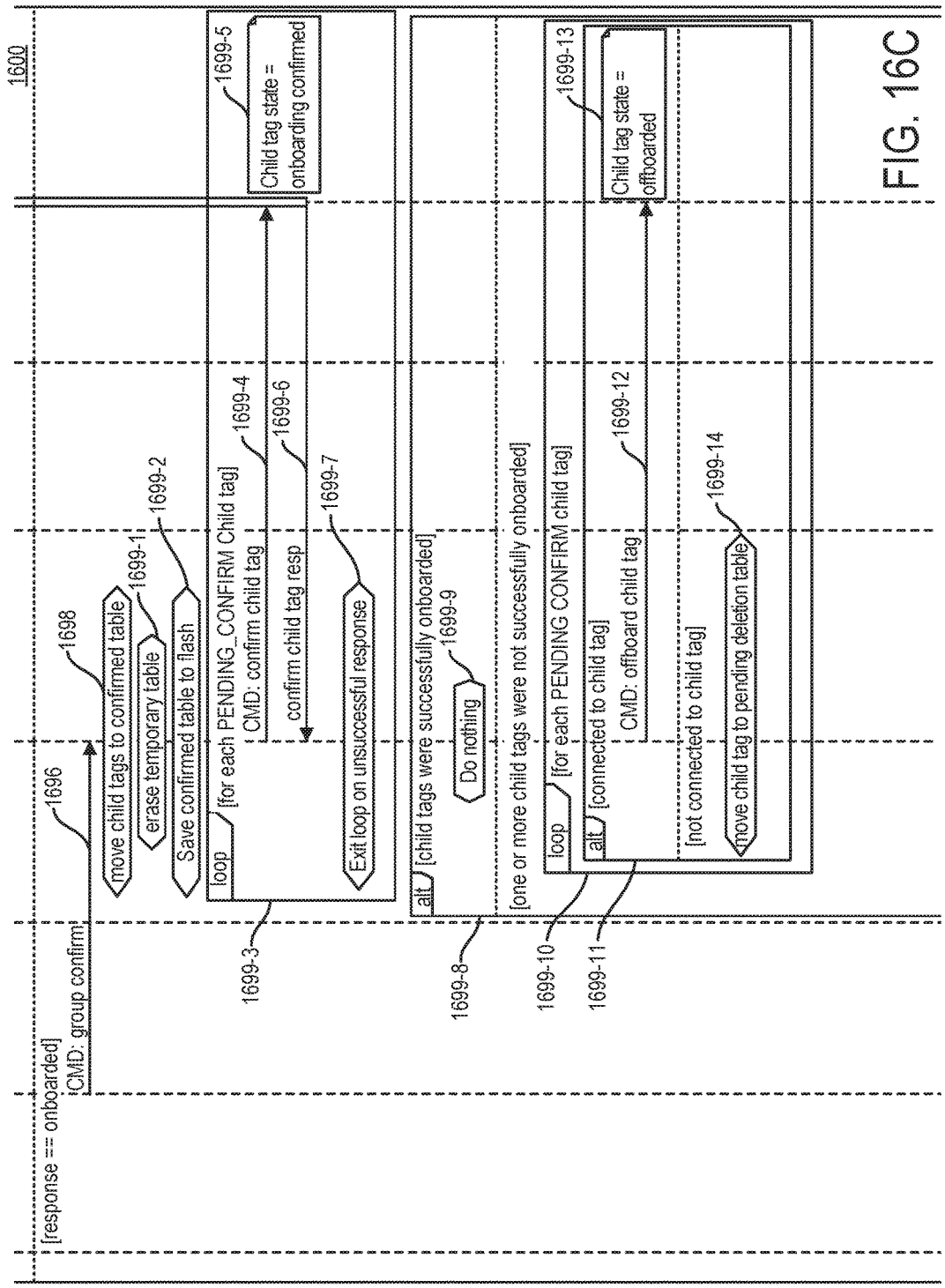
Figure 16D:
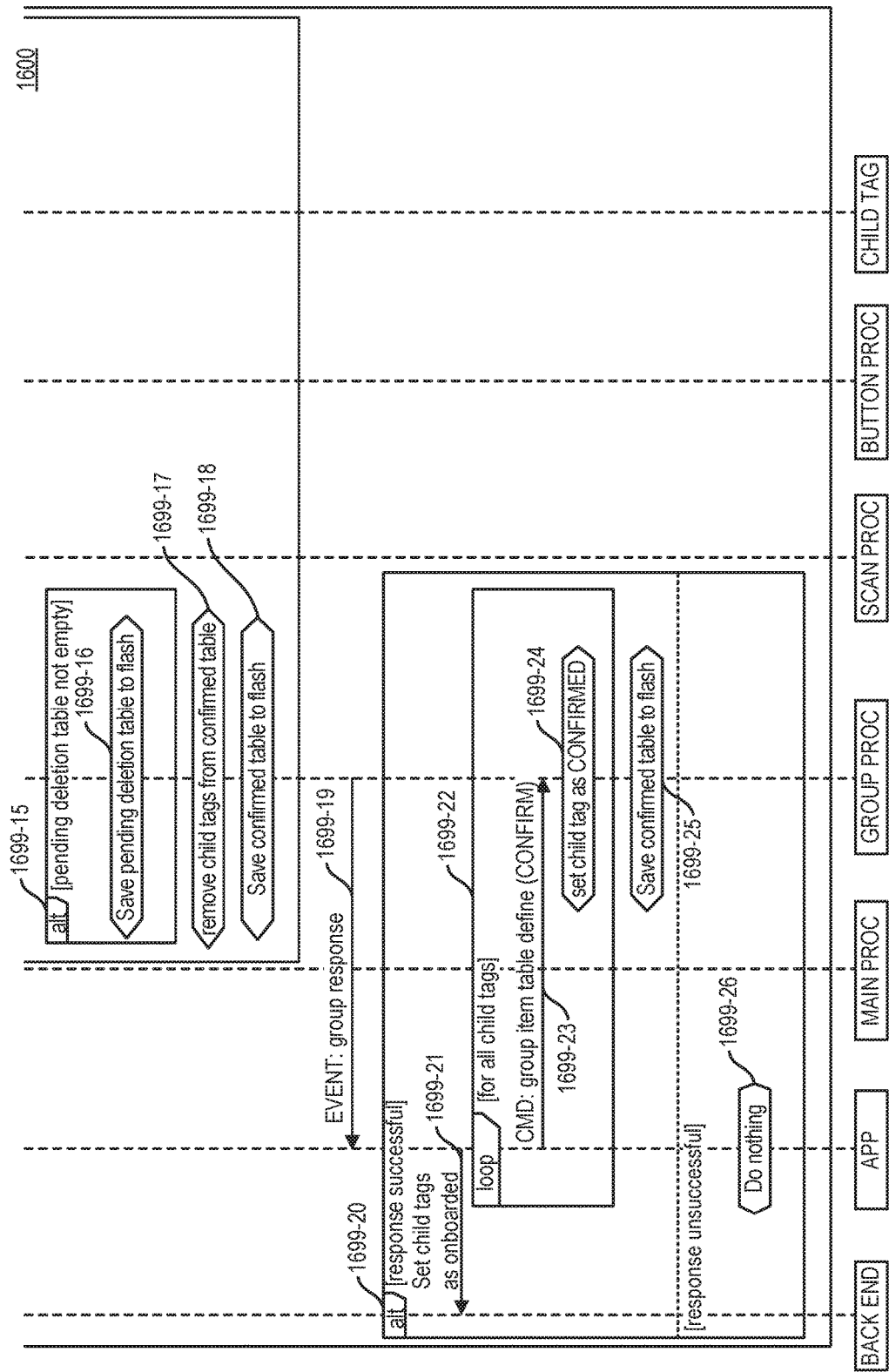

At 2010, a child tag can provide a message with an identifier to another tag and/or to a processing device. In some implementations, the tag 1104 in FIG. 11 provides the ID 1114 and/or the MAC address 1116 at 1654 and/or at 1656 (FIG. 16B).

At 2020, the child tag can engage in a pairing process. In some implementations, the tag 1104 in FIG. 11, or one or more of the tags 104A-C in FIG. 1, can engage in a pairing process with a parent tag (or a to-be parent tag). For example, the child tag can be primed for engaging in the pairing process by activating (e.g., double-pressing on) an input device on the tag (e.g., a button).

At 2030, the child tag can participate in a wireless connection with a processing device. In some implementations, the wireless connection can involve the wireless signals 1130 in FIG. 11. For example, the wireless connection can be made with the processing device 1106 in FIG. 11 and/or with the processing device 108 in FIG. 1.

Figure 21:
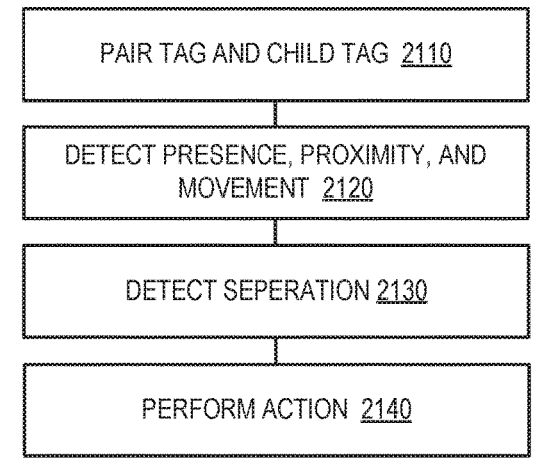
FIG. 21 shows an example of a method relating to detection of separation between a child tag and its parent tag.

FIG. 21 shows an example of a method 2100 relating to detection of separation between a child tag and its parent tag. The method 2100 can be used with one or more other examples described elsewhere herein. The method 2100 can be performed using one or more examples described with reference to FIG. 28. More or fewer operations than shown can be performed. Two or more operations can be performed in another order unless otherwise indicated.

At 2110, a tag and a child tag can be paired with each other. In some implementations, the tag 1102 (FIG. 11) can be paired with the tag 1104, and/or the tag 102 (FIG. 1) can be paired with one or more of the tags 104A-C. For example, the pairing can be based on a proximity measure and triggered by a button press.

At 2120, at least presence, proximity, and movement of the child tag can be detected. In some implementations, the detection can be made by the parent tag. For example, the organization module 300 (FIG. 3) can be used.

At 2130, a separation between the child tag and the parent tag can be detected. In some implementations, the parent tag can detect that the child tag is no longer within a predefined proximity limit relative to the parent tag. In some implementations, the child tag can detect that it is no longer proximate to the parent tag.

At 2140, one or more actions can be performed in response to detecting the separation. In some implementations, the action can be performed by the child tag, the parent tag, and/or by a processing device to which the parent tag is coupled. For example, the child tag and/or the parent tag can emit output (e.g., light and/or sound) based on the detected separation. The action can relate to changing a pattern of behavior of the child tag, parent tag, and/or processing device compared to before detecting the separation. For example, a beaconing pattern of the child tag can be intensified or de-intensified. As another example, the parent tag can increase how often it performs scanning. As another example, the processing device can provide an alert to a user.

FIG. 22 shows an example of a method 2200 that relates to calibration of a group that includes a parent tag and a child tag. The method 2200 can be used with one or more other examples described elsewhere herein. The method 2200 can be performed using one or more examples described with reference to FIG. 28. More or fewer operations than shown can be performed. Two or more operations can be performed in another order unless otherwise indicated.

At 2210, a child tag can be attached to a physical object. In some implementations, the tag 408B in FIG. 4B can be attached to the physical object 406A. For example, the attachment can be done by way of adhesive or a connection structure such as a carabiner.

At 2220, a pairing process between the child tag and a parent tag can be performed. In some implementations, the pairing process can be performed substantially as described with reference to FIGS. 16A-D.

At 2230, a tag can be attached to a container. In some implementations, the tag 408A in FIG. 4E can be attached to the container 404. For example, the attachment can be done by way of adhesive or a connection structure such as a carabiner.

At 2240, a graphical user interface can be presented. In some implementations, the user interface 500 as described with reference to at least some of FIGS. 5A-Z can be presented. For example, the instruction view 5002 in FIG. 5W can prompt the user to place the physical object in the container.

At 2250, the physical object can be placed within the container. For example, the physical object can be placed within a bag, trunk, vehicle, storage compartment, and/or locker.

At 2260, a first parameter can be adjusted under guidance of the graphical user interface. In some implementations, the user interface 700 can provide the control 718 in FIG. 7A. For example, the user can actuate the control 718 until the corresponding one of the status indicators 712, 714, and 716 correctly indicates that the physical object is inside the container.

At 2270, the physical object can be placed outside the container. For example, the user can place the physical object relatively close to the container in an effort to provide a calibration that can detect the physical object being nearby, yet outside, the container.

At 2280, a second parameter can be adjusted under guidance of the graphical user interface. In some implementations, the user interface 700 can provide the control 720 in FIG. 7C. For example, the user can actuate the control 720 until the corresponding one of the status indicators 712, 714, and 716 correctly indicates that the physical object is outside the container.

FIG. 23 shows an example of a method 2300 that relates to organization of physical items for travel. The method 2300 can be used with one or more other examples described elsewhere herein. The method 2300 can be performed using one or more examples described with reference to FIG. 28. More or fewer operations than shown can be performed. Two or more operations can be performed in another order unless otherwise indicated.

At 2310, an input regarding travel can be received. In some implementations, the processing device 108 in FIG. 1 is a digital personal assistant responsive to voice commands from a user. For example, the user can instruct the digital personal assistant to "organize my trip to Tahoe for June 18."

At 2320, physical items from a previous trip can be identified. In some implementations, the processing device can access an electronic calendar of the user and determine when the last trip to the same location occurred. Based on this information, the processing device can identify, in history organizational records, what physical items the user brought on the most recent trip.

At 2330, the present location of one or more of the identified physical items can be determined. In some implementations, a tag (e.g., a parent tag or a child tag) attached to the physical item can be detected. For example, the processing device can make the connection directly if the physical item is within range. As another example, the processing device can send an inquiry to one or more other devices for information about the location of the physical item.

At 2340, an output to the user can be generated. In some implementations, the output can name the identified physical items and optionally announce their respective locations. For example, the processing device can issue the following a written or verbal message "On your last trip, you brought your skis, snow gear, jacket, and boots. Everything is at home, except for your jacket, which is at your office."

Thereafter, a shorter or longer period of time can pass, as schematically indicated at 2350.

At 2360, it can be determined that travel is imminent. In some implementations, the processing device can access the user's electronic calendar, showing that the trip for which input was originally received (at 2310) is occurring today or the next day. As another example, the user can make an input into a digital personal assistant announcing that the trip is imminent.

At 2370, the present location of one or more of the identified physical items can be determined. In some implementations, this operation can be performed substantially in the same way as at 2330 above. For example, the processing device can update its previous search and see if any locations have changed.

At 2380, an output to the user can be generated. In some implementations, the output can be verbal and/or written. For example, the processing device can generate the following message: "Everything is packed away in your car. Don't forget your keys and goggles. Your keys are in the kitchen drawer.

The output can include one or more status updates. In some implementations, the status update can relate to actions to be performed during the period when the user will be away. For example, the processing device can generate the following message: "While you are away, I will enable all alarms and monitor activity within your home."

FIG. 24 shows an example of a method 2400 that relates to improving calibration based on evaluated performance of multiple groups. The method 2400 can be used with one or more other examples described elsewhere herein. The method 2400 can be performed using one or more examples described with reference to FIG. 28. More or fewer operations than shown can be performed. Two or more operations can be performed in another order unless otherwise indicated.

At 2410, a pairing process of at least one group can be performed, the group including at least one parent tag associated with a container and at least one child tag coupled to the parent tag. In some implementations, the pairing process can be performed substantially as described with reference to FIGS. 16A-D. For example, the parent tag can represent a bag and the child tag(s) can correspond to the physical object(s) of the bag. The pairing process may have been performed separately for each of the respective multiple groups mentioned above. As relevant to the present example, each of the other multiple groups can relate to a corresponding container (e.g., an identical or similar bag).

At 2420, a calibration of the group can be performed. In some implementations, the calibration can be performed substantially as described with reference to FIG. 22 and/or FIGS. 5W-Y. For example, the calibration can seek to ensure that no alerts are generated upon the physical object(s) being within the container (i.e., the absence of false positives), and that an alert is generated upon the physical object(s) not being within the container (i.e., the absence of false negatives).

Thereafter, a shorter or longer period of time can pass, as schematically indicated at 2430. During this time, the container and the physical object(s) can be used, and the system can recognize the behavior of the system (e.g., whether alerts are generated and the user's response to them). Similarly, the system can recognize the behavior of other At 2440, performance of the multiple groups can be evaluated. In some implementations, the processing device can determine whether any of the multiple groups appear to have the relatively best calibration. For example, this can be evaluated in terms of which groups appear to have the fewest false positives and/or false negatives.

At 2450, the calibration of the group can be updated based on the evaluation. In some implementations, this can be done as a software/firmware update to one or more tags. For example, this update can be done to allow the system of multiple groups to learn from its observed behavior and improve its performance over time.

FIG. 25 shows an example of a method 2500 that relates to managing custody of a physical object. The method 2500 can be used with one or more other examples described elsewhere herein. The method 2500 can be performed using one or more examples described with reference to FIG. 28. More or fewer operations than shown can be performed. Two or more operations can be performed in another order unless otherwise indicated.

At 2510, a pairing process between at least two tags relating to a physical object can be performed. In some implementations, the pairing process can relate to the physical object 1204 in FIG. 12 and to the physical location 1202. For example, the tag 1220 in FIG. 12 (e.g., on the physical object 1204) can be paired with the tag 1218.

At 2520, a presence of the physical object can be detected. In some implementations, the tag 1218 in FIG. 12 and/or the processing device 1210 can detect the presence of the physical object 1204 within the structure 1206.

Thereafter, a shorter or longer period of time can pass, as schematically indicated at 2530.

At 2540, a proximity of a tag or processing device can be detected. In some implementations, the tag/processing device can be a proxy for a person (e.g., a smartphone or other device carried or worn by the person). For example, the processing device 1212 of the person 1208 entering the physical location 1202, and approaching the tag 1218, can be detected.

At 2550, a separation of the physical device from its location can be detected. In some implementations, the detection can reflect that the processing device whose proximity was detected is separating in a substantially similar manner. For example, this detection of substantially similar separation can be an indication that the person 1208 is removing the physical object 1204 from the structure 1206.

At 2560, one or more actions can be performed. In some implementations, an alert, alarm and/or notification can be performed. For example, the system can perform an authorization check and determine that the user 1208 has the right to move the physical object 1204. As another example, the processing device 1212 can be prompted to allow the person 1208 to acknowledge that he or she is taking custody of the physical object 1204. As another example, the system can record an observation that the physical object 1204 is currently being moved.

FIG. 26 shows an example of a method 2600 that relates to managing preparation of a physical object before use. The method 2600 can be used with one or more other examples described elsewhere herein. The method 2600 can be performed using one or more examples described with reference to FIG. 28. More or fewer operations than shown can be performed. Two or more operations can be performed in another order unless otherwise indicated.

At 2610, a pairing process involving a tag of a physical object can be performed. In some implementations, the pairing process can be performed substantially as described with reference to FIGS. 16A-D.

At 2620, a preparation procedure can be performed. In some implementations, this can be the basis for a tag learning that its physical object is usually subjected to a certain procedure under specific circumstances. For example, the tag 1308 in FIG. 13 can learn over time that it is always subjected to the treatment in the apparatus 1306 (e.g., involving an elevated temperature that is detected using a sensor on the tag) before entering the physical location 1304.

Thereafter, a shorter or longer period of time can pass, as schematically indicated at 2630.

At 2640, an event can be planned. In some implementations, this event contemplates the use of the physical object whose tag was paired at 2610. For example, the calendar system 1314 in FIG. 13 can have an appointment recorded therein corresponding to performance of a procedure at the physical location 1304.

At 2650, presence, proximity, and/or movement of the tag can be detected. In some implementations, the detection can be made by the tag itself. For example, the tag 1308 in FIG. 13 can detect that it is brought toward the physical location 1304 as schematically illustrated using the arrow 1318. The tag (or another device) can recognize that this is not in conformity with the pattern of behavior that has been observed in the past, because no use of the apparatus 1306 (e.g., no elevated temperature) has been detected in the near past.

At 2660, one or more actions can be performed based on the detection at 2650. In some implementations, the action can be performed by a child tag, a parent tag, and/or by a processing device to which the parent tag is coupled. For example, an alert, alarm and/or notification can be performed.

FIG. 27 shows an example of a method 2700 that relates to controlling access to a geographic area using a tag. The method 2700 can be used with one or more other examples described elsewhere herein. The method 2700 can be performed using one or more examples described with reference to FIG. 28. More or fewer operations than shown can be performed. Two or more operations can be performed in another order unless otherwise indicated.

At 2710, metadata can be provided to a tag. In some implementations, the tag 200 in FIG. 2 can receive metadata for storage in the memory 206. The metadata can pertain to, describe, define, and/or otherwise relate to, the physical object to which the tag is coupled. For example, the metadata can indicate the name, identity, type, age, value, ownership, physical status, and/or legal status of the physical object.

At 2720, a geofence definition can be established. In some implementations, the geofence 1410 in FIG. 14 can be established. For example, the geofence 1410 can be designed to prevent one or more physical items (or types of physical items) from entering and/or leaving the building 1406.

At 2730, a presence of a tag relative to the geofence definition can be detected. In some implementations, the detection can be triggered by the physical object 1414 being brought into the vicinity of the building 1406. For example, one or more processing devices and/or tags can perform the detection.

At 2740, one or more actions can be performed based on the detection at 2730. In some implementations, the action can be performed by a child tag, a parent tag, and/or by a processing device to which the parent tag is coupled. For example, an alert, alarm and/or notification can be performed.

Some exemplary implementations are described herein. Other implementations are within the scope of the present disclosure, including, but not limited to, systems and/or techniques relating to laboratory management, home security, workplace security, public security, school security, shipping, and/or logistics management.

Systems and/or techniques described herein can operate in accordance with one or more of the following. A system and/or process can use connected devices to create collaborative, modular, scalable, and more contextually aware, intelligent environments (systems and subsystems) across connected device space, IoT device space, and/or a smart home device space. In some implementations, a system and/or process can interpret ambient radio signals from connected devices (frequency, RSSI, beaconing frequency, packet loss, etc. and/or the changes of each over time) to determine identity, presence, location, motion, proximity, and/or directionality. For example, a system and/or process can determine presence or absence of identifiable items, sub-systems, and/or people within specified location parameters or relative proximity parameters. As another example, a system and/or process can determine location and/or proximity of identifiable items, sub-systems, and/or people relative to other identifiable items, sub-systems, people, and/or locations using calculations based on radio signal characteristics such as RSSI strengths, radio frequencies, and the triangulation of data, correlated with changes in values over time. As another example, a system and/or process can determine relative motion and directionality of position and motion of identifiable items, sub-systems, or people relative to other identifiable items, sub-systems, people, and/or locations.

In some implementations, a system and/or process can setup and manage relationships between identifiable radio signals (comprising identifiable items, devices, systems, sub-systems, and/or locations) to create complex rules, groupings, hierarchies, permissions, and controls to enable users to customize behaviors of intelligent environments. For example, a system and/or process can create smart container systems and/or nested sub-systems that are aware of identifiable contents (comprising users, items, locations, and/or sub-systems) within the system, what is missing from the system, and/or what is entering or leaving the system by setting up a radio-based proximity geofence. As another example, a house system can be aware of who is entering the house, where they are relative to the places and items within the house, and/or which room (sub-system) they are in. As another example, a garage sub-system can be aware if an identifiable vehicle is parked within it; the vehicle can be aware of the identifiable contents within the vehicle. As another example, a cabinet sub-system within the kitchen of the house can be aware when contents within have been accessed and identify what person has accessed it. As another example, a system and/or process can allow multi-factor authentication of items, people, systems, subsystems, locations, and/or system states through recognition of multiple radio signals that share relationship-based characteristics. As another example, a system and/or process can recognize radio signatures of a user's phone, with their keys, wallet, and smart bag which provide multiple distinct points of data that, together, validates user identity. As another example, a system and/or process can recognize a radio signature of a device attached to a dog that is leaving the house by itself and interpret it as a running off because there are no other identifiable objects to validate its safe state. As another example, a system and/or process can recognize the same radio signature of a device attached to a dog that leaves the house with an identifiable leash and/or caretaker indicates that the dog is being walked and validates the state of the system as safe.

A system and/or process can integrate device sensor data to detect real-world conditions (location, connectivity, time, temperature, acceleration, and/or humidity, etc.) to add contextual awareness to enable user initiated and/or automated responses within intelligent environments.

A system and/or process can enable connected devices to change behaviors based on context or application within an intelligent environment. In some implementations, a system and/or process can adjust communications cadence within a system or specific subsystem(s) according to context and/or application. A system and/or process can change communications frequency if a purse sub-system is at rest with all of its contents accounted for. For example, the system and/or process can lower its radio beaconing frequency to conserve power. As another example, if the purse sub-system were to experience movement, it can increase its radio beaconing frequency for a duration of time to immediately check on its contents until the sub-system experiences another change in status. A system and/or process can change its communications method if a purse sub-system were deemed lost (e.g., user initiated or self-determined). For example, a system and/or process can switch from a near-field communications protocol such as Bluetooth to a longer range communications protocol such as Bluetooth LoRa to communicate its state to the owner.

A system and/or process can request a response from another connected device within the intelligent environment. For example, if a bicycle moves in the garage sub-system during the middle of the night without the owner's presence detected, the bicycle can request the garage light to turn on.

A system and/or process can alter access permissions or accessibility of device data under varying environmental conditions or status. For example, in a house/home system, a luggage sub-system is at rest with all broadcasted information secure and private. When the luggage sub-system enters an airport, it can share certain portions of its identifiable radio signature with an airline for tracking purposes. When the luggage sub-system arrives at the destination and is retrieved by the owner, the radio signature can return to a private and secure state. As another example, when a personal backpack system is with its owner, all broadcasted information can be secure and private. If the backpack were deemed lost (e.g., initiated by the user, or self-determined), the radio broadcast can change to include a variety of additional information for nearby devices or users. For example, additional information can include, but is not limited to, lost state, reward amount if found, and/or owner contact information. As another example, a system and/or process can switch communications methods based on varying environmental conditions or status.

A system and/or process can use radio wave characteristics of wireless transmissions to create user interactions and experiences. For example, system and/or process can use high RSSI between a device and a phone to perform pairing interactions and/or to bring up a specific device screens within a mobile app. As another example, a system and/or process can measure and calculate radio wave characteristics (RSSI, packet loss, movement, etc.) to dynamically adjust grouping boundaries.

A system and/or process can use hierarchal access permissions of varying users to identify or interact with them or tagged items. Crowd location can be performed. For example, a message identifying a tag can be broadcast to the devices of multiple users, prompting them to respond if the devices have detected the tag.

Figure 28:
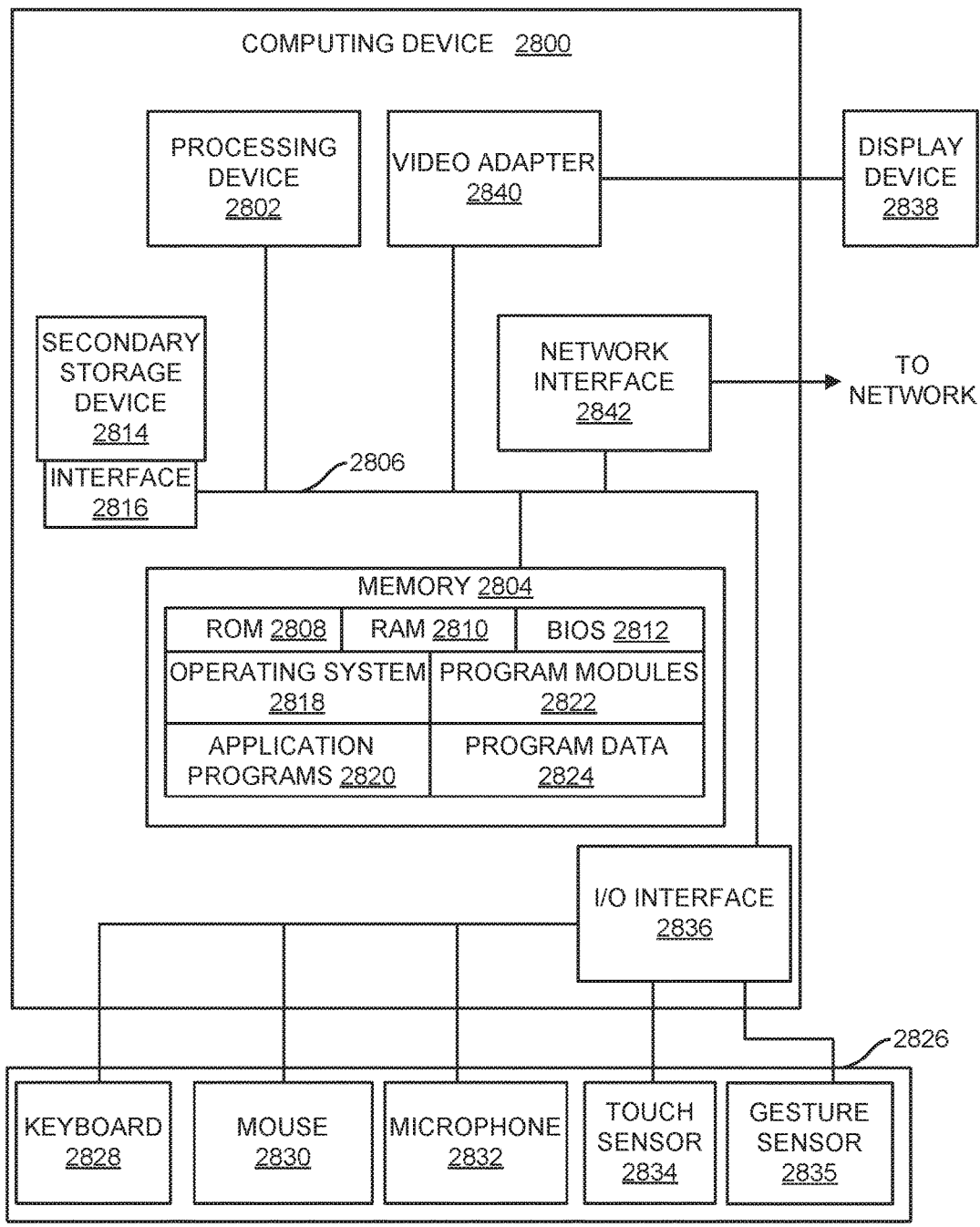
FIG. 28 shows an example of a computer device that can be used to implement the techniques described here.

FIG. 28 illustrates an example architecture of a computing device 2800 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 28 can be used to execute the operating system, application programs, and/or software modules (including the software engines) described herein.

The computing device 2800 includes, in some embodiments, at least one processing device 2802 (e.g., a processor), such as a central processing unit (CPU). A variety of processing devices are available from a variety of manufacturers, for example, Intel or Advanced Micro Devices. In this example, the computing device 2800 also includes a system memory 2804, and a system bus 2806 that couples various system components including the system memory 2804 to the processing device 2802. The system bus 2806 is one of any number of types of bus structures that can be used, including, but not limited to, a memory bus, or memory controller; a peripheral bus; and a local bus using any of a variety of bus architectures.

Examples of computing devices that can be implemented using the computing device 2800 include a desktop computer, a laptop computer, a tablet computer, a mobile computing device (such as a smart phone, a touchpad mobile digital device, or other mobile devices), or other devices configured to process digital instructions.

The system memory 2804 includes read only memory 2808 and random access memory 2810. A basic input/output system 2812 containing the basic routines that act to transfer information within computing device 2800, such as during start up, can be stored in the read only memory 2808.

The computing device 2800 also includes a secondary storage device 2814 in some embodiments, such as a hard disk drive, for storing digital data. The secondary storage device 2814 is connected to the system bus 2806 by a secondary storage interface 2816. The secondary storage device 2814 and its associated computer readable media provide nonvolatile and non-transitory storage of computer readable instructions (including application programs and program modules), data structures, and other data for the computing device 2800.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 2814 and/or system memory 2804, including an operating system 2818, one or more application programs 2820, other program modules 2822 (such as the software engines described herein), and program data 2824. The computing device 2800 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 2800 through one or more input devices 2826. Examples of input devices 2826 include a keyboard 2828, mouse 2830, microphone 2832 (e.g., for voice and/or other audio input), touch sensor 2834 (such as a touchpad or touch sensitive display), and gesture sensor 2835 (e.g., for gestural input. In some implementations, the input device(s) 2826 provide detection based on presence, proximity, and/or motion. In some implementations, a user may walk into their home, and this may trigger an input into a processing device. For example, the input device(s) 2826 may then facilitate an automated experience for the user. Other embodiments include other input devices 2826. The input devices can be connected to the processing device 2802 through an input/output interface 2836 that is coupled to the system bus 2806. These input devices 2826 can be connected by any number of input/output interfaces, such as a parallel port, serial port, game port, or a universal serial bus. Wireless communication between input devices 2826 and the input/output interface 2836 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 2838, such as a monitor, liquid crystal display device, projector, or touch sensitive display device, is also connected to the system bus 2806 via an interface, such as a video adapter 2840. In addition to the display device 2838, the computing device 2800 can include various other peripheral devices (not shown), such as speakers or a printer.

The computing device 2800 can be connected to one or more networks through a network interface 2842. The network interface 2842 can provide for wired and/or wireless communication. In some implementations, the network interface 2842 can include one or more antennas for transmitting and/or receiving wireless signals. When used in a local area networking environment or a wide area networking environment (such as the Internet), the network interface 2842 can include an Ethernet interface. Other possible embodiments use other communication devices. For example, some embodiments of the computing device 2800 include a modem for communicating across the network.

The computing device 2800 can include at least some form of computer readable media. Computer readable media includes any available media that can be accessed by the computing device 2800. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 2800.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 28 is also an example of programmable electronics, which may include one or more such computing devices, and when multiple computing devices are included, such computing devices can be coupled together with a suitable data communication network so as to collectively perform the various functions, methods, or operations disclosed herein.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
   receiving, by a first tag and from a second tag, a first message including an identifier of the second tag, the first and second tags configured for coupling to respective first and second physical objects to organize activities;
   identifying, by the first tag and based on a proximity measure, the second tag for a pairing process to register the second tag as a child tag of the first tag; and
   providing, by the first tag, a second message with the identifier to a processing device configured to register the second tag as the child tag of the first tag.

2. The method of claim 1, further comprising performing a proximity calibration between the first and second tags.

3. The method of claim 2, wherein the first physical object of the first tag is a container capable of containing the second physical object of the second tag, and wherein performing the proximity calibration includes calibrating a first parameter while the second tag is contained in the container, and calibrating a second parameter while the second tag is not contained in the container.

4. The method of claim 3, further comprising presenting, on a graphical user interface of the processing device, a first control for the first parameter, and a second control for the second parameter, the first and second controls operable by a user.

5. The method of claim 1, wherein the proximity measure between the first and second tags depends on one or more of a received signal strength indicator (RSSI), a connectivity, a latency, a packet error rate, a packet loss, a change in RSSI, a change in connectivity, a change in latency, a change in packet error rate, or a change in packet loss.

6. The method of claim 1, further comprising determining, by the first tag, that the second tag has been separated from the first tag, and performing an action in response to the determination.

7. The method of claim 6, wherein performing the action comprises providing a notification to the processing device.

8. The method of claim 6, wherein performing the action comprises generating an output from the first tag.

9. A tag comprising:
   a processor;
   a wireless communication component coupled to the processor; and
   a non-transitory storage medium coupled to the processor and having stored therein instructions that when executed cause the processor to perform operations comprising:
      receiving, from another tag, a first message including an identifier of the other tag, the tag and the other tag configured for coupling to respective first and second physical objects to organize activities;
      identifying, based on a proximity measure, the other tag for a pairing process to register the other tag as a child tag of the tag; and
      providing a second message with the identifier to a processing device configured to register the other tag as the child tag of the tag.

10. The tag of claim 9, wherein the operations further comprise determining that the other tag becomes separated from the tag, and performing an action in response to the determination.

11. The tag of claim 10, further comprising at least one of a speaker or a light, wherein performing the action includes generating an output using at least one of the speaker or the light.

12. A non-transitory storage medium having stored therein instructions that when executed cause a processor to generate a graphical user interface comprising:
   a tag naming view configured for a user to enter a first name to be associated with a first tag as a parent tag;
   a child-tag naming view configured for the user to enter a second name to be associated with a second tag as a child tag of the first tag, the first and second tags configured for attachment to respective first and second physical objects to organize activities; and
   a first instruction view for initiation of a pairing process between the first and second tags, wherein in the pairing process the first name is associated with the first tag, and the second name is associated with the second tag.

13. The non-transitory storage medium of claim 12, further comprising a scan view configured for scanning a code associated with the first and second tags.

14. The non-transitory storage medium of claim 12, wherein the child-tag naming view is presented after presentation of the tag naming view.

15. The non-transitory storage medium of claim 14, further comprising a second instruction view for attaching the second tag to the second physical object before attaching the first tag to the first physical object.

16. The non-transitory storage medium of claim 15, wherein the first instruction view instructs the user to bring the first tag into proximity of the second tag to initiate the pairing process.

17. The non-transitory storage medium of claim 16, further comprising a third instruction view for attaching the first tag to the first physical object after the pairing process.

18. The non-transitory storage medium of claim 12, wherein the first tag is paired with multiple second tags, each of the second tags being a child tag of the first tag, the graphical user interface further comprising a status area with respective status indicators for each of the second tags, the status indicators indicating, for the corresponding second tag, whether the second tag is within proximity of the first tag.

19. The non-transitory storage medium of claim 12, the graphical user interface further comprising a control to initiate calibration between the first and second tags, wherein the first physical object is a container capable of containing the second physical object, and wherein the calibration includes calibrating a first parameter while the second tag is contained in the container, and calibrating a second parameter while the second tag is not contained in the container.

20. The non-transitory storage medium of claim 19, the graphical user interface further comprising a first control for the first parameter, and a second control for the second parameter, the first and second controls operable by the user.

\* \* \* \* \*